(12) United States Patent
Tomei et al.

(10) Patent No.: US 12,514,696 B2
(45) Date of Patent: Jan. 6, 2026

(54) CONFORMAL COATING OF CELLS FOR IMMUNOISOLATION

(71) Applicant: University of Miami, Miami, FL (US)

(72) Inventors: Alice A. Tomei, Miami, FL (US); Aaron Stock, Miami, FL (US); Michael Lupp, Miami, FL (US)

(73) Assignee: University of Miami, Miami, FL (US)

( * ) Notice: Subject to any disclaimer, the term of this patent is extended or adjusted under 35 U.S.C. 154(b) by 520 days.

(21) Appl. No.: 17/921,888

(22) PCT Filed: Apr. 28, 2021

(86) PCT No.: PCT/US2021/029744
§ 371 (c)(1),
(2) Date: Oct. 27, 2022

(87) PCT Pub. No.: WO2021/222469
PCT Pub. Date: Nov. 4, 2021

(65) Prior Publication Data
US 2023/0165669 A1 Jun. 1, 2023

(51) Int. Cl.
*A61F 2/02* (2006.01)
*A61K 35/39* (2015.01)
*A61L 27/34* (2006.01)
*A61L 27/38* (2006.01)

(52) U.S. Cl.
CPC .............. *A61F 2/022* (2013.01); *A61K 35/39* (2013.01); *A61L 27/34* (2013.01); *A61L 27/38* (2013.01); *A61L 27/3804* (2013.01); *A61L 2300/64* (2013.01); *A61L 2420/02* (2013.01)

(58) Field of Classification Search
None
See application file for complete search history.

(56) References Cited

U.S. PATENT DOCUMENTS

| | | |
|---|---|---|
| 6,558,665 B1 | 5/2003 | Cohen |
| 6,716,246 B1 | 4/2004 | Gonzalez |
| 6,911,227 B2 | 6/2005 | Hubbell |
| 10,653,816 B2 | 5/2020 | Hubbell |
| 10,660,987 B2 | 5/2020 | Hubbell |

(Continued)

FOREIGN PATENT DOCUMENTS

| | | |
|---|---|---|
| WO | WO1993021266 | 10/1993 |
| WO | WO1997016176 | 5/1997 |

(Continued)

OTHER PUBLICATIONS

Anna et al., "Formation of Dispersions Using 'Flow Focusing' in Microchannels," Applied Physics Letters, 82(3):364-366 (2003).

(Continued)

*Primary Examiner* — David W Berke-Schlessel
(74) *Attorney, Agent, or Firm* — Meunier Carlin & Curfman LLC

(57) ABSTRACT

Hydrodynamic methods for conformally coating non-uniform size cells and cell clusters with biomaterials for implantation, thus preventing immune rejection or inflammation or autoimmune destruction while preserving cell functionality, are disclosed. Further disclosed are reagents, apparatus, and methods for conformally coating cells and cell clusters with hydrogels that are biocompatible, mechanically and chemically stable and porous, with an appropriate pore cut-off size.

20 Claims, 33 Drawing Sheets
(13 of 33 Drawing Sheet(s) Filed in Color)

(56) References Cited

U.S. PATENT DOCUMENTS

| | | | |
|---|---|---|---|
| 11,207,444 | B2 | 12/2021 | Hubbell |
| 11,623,021 | B2 | 4/2023 | Hubbell et al. |
| 2004/0195710 | A1 | 10/2004 | Hubbell |
| 2006/0024276 | A1 | 2/2006 | Ricordi |
| 2009/0014360 | A1 | 1/2009 | Toner |
| 2009/0175927 | A1 | 7/2009 | Gammelstaeter |
| 2011/0165219 | A1 | 7/2011 | Barkai |
| 2011/0285042 | A1 | 11/2011 | Viovy |
| 2014/0147483 | A1 | 5/2014 | Hubbell |
| 2015/0071997 | A1 | 3/2015 | Garcia |
| 2017/0216489 | A1 | 8/2017 | Hubbell |
| 2021/0030922 | A1 | 2/2021 | Hubbell |

FOREIGN PATENT DOCUMENTS

| | | |
|---|---|---|
| WO | WO2005103106 | 11/2005 |
| WO | WO2012149496 | 11/2012 |

OTHER PUBLICATIONS

Barrero et al., "Micro- and Nanoparticles via Capillary Flows," Annual Review of Fluid Mechanics, 39(1):89-106 (2007).

Beck et al., "Islet encapsulation: Strategies to Enhance Islet Cell Functions," Tissue Engineering, 13(3):1-11 (2007).

Buchwald et al., "Glucose-stimulated insulin release: Parallel perifusion studies of free and hydrogel encapsulated human pancreatic islets," Biotechnol. Bioeng, 115(1):232-245 (2018).

Buchwald et al., "Experimental evaluation and computational modeling of the effects of encapsulation on the time-profile of glucose-stimulated insulin release of pancreatic islets," Biomed. Engineer. Online 14: 28 (2015).

Cellesi "New fully synthetic materials for cell encapsulation," Doctoral Thesis, ETH Zurich [online], 2003 [Retrieved on Jul. 2, 2012], pp. 1-130.

Chabert et al., "Microfluidic high-throughput encapsulation and hydrodynamic self-sorting of single cells," PNAS, 105:3191-3196 (2008).

Chang et al., "The in vivo delivery of heterologous proteins by microencapsulated recombinant cells," Trends in Biotechnology, 17:78-83 (1999).

Cohen et al., "Using selective withdrawal to coat microparticles," Science, 292:265-267 (2001).

De Groot et al., "Causes of limited survival of microencapsulated pancreatic islet grafts," Journal of Surgical Research, 121:141-150 (2004).

Desai et al., "Advances in islet encapsulation technologies," Nat Rev Drug Discov 16: 338-350 (2017).

De Vos et al., "Treatment of diabetes with encapsulated islets," Advances in Experimental Medicine and Biology, 670:3853 (2010).

Eggleton et al., "Tip streaming from a drop in the presence of surfactants," Physical Review Letters, 87:048302 (2001).

Foster et al., "Improved Health-Related Quality of Life in a Phase 3 Islet Transplantation Trial in Type 1 Diabetes Complicated by Severe Hypoglycemia," Diabetes Care, 41:1001-1008 (2018).

Hering et al., "Phase 3 Trial of Transplantation of Human Islets in Type 1 Diabetes Complicated by Severe Hypoglycemia," Diabetes Care, 39:1230-1240 (2016).

Kim et al., "Synthesis and Characterization of Injectable Poly(N-isopropylacrylamide-co-acrylic acid) Hydrogels with Proteolytically Degradable Cross-Links," Biomacromolecules, 4(5):1214-1223 (2003).

Korsgren, "Islet Encapsulation: Physiological Possibilities and Limitations," Diabetes, 66:1748-1754 (2017).

LaBlanche et al., "Islet transplantation versus insulin therapy in patients with type 1 diabetes with severe hypoglycaemia or poorly controlled glycaemia after kidney transplantation (TRIMECO): a multicentre, randomised controlled trial," Lancet Diabetes Endocrinol. 6:527-537 (2018).

Loscertales et al., "Micro/nano encapsulation via electrified coaxial liquid jets," Science, 295:1695-1698 (2002).

Manzoli et al., "Immunoisolation of murine islet allografts in vascularized sites through conformal coating with polyethylene glycol," Am. J. Transplant, 18(3):590-603 (2018).

Minguez-Castellanos et al., "Carotid body autotransplantation in Parkinson disease: a clinical and positron emission tomography study," Journal of Neurology, Neurosurgery, and Psychiatry, 78(8):825831 (2007).

Pepper et al., "Clinical islet transplantation: is the future finally now?," Curr. Opin. Organ Transplant, 23:428-439 (2018).

Rabanel et al., "Progress technology in microencapsulation methods for cell therapy," Biotechnology Progress, 25:946-963 (2009).

Rickels et al., "Pancreatic Islet Transplantation in Humans: Recent Progress and Future Directions," Endocrin. Rev. 40:631-668 (2019).

Rinsch et al., "Delivery of erythropoietin by encapsulated myoblasts in a genetic model of severe anemia," Kidney Intern, 62:1395-1401 (2002).

Robertson, "Update on transplanting beta cells for reversing type 1 diabetes," Endocrinology and Metabolism Clinics of North America, 39:655-667 (2010).

Shapiro et al., "Clinical pancreatic islet transplantation," Nat. Rev. Endocrinol., 13: 268-277 (2017).

Smink et al., "Polymer scaffolds for pancreatic islet transplantation—Progress and challenges," Am J. Tranplant 18: 2113-2118 (2018).

Stock et al., "Conformal Coating of Stem Cell-Derived Islets for β Cell Replacement in Type I Diabetes," Stem Cell Reports 14: 91-104 (2020).

Teramura et al., "Bioartificial pancreas-Microencapsulation and conformal coating of islet of Langerhans," Advanced Drug Delivery Reviews, 62:827-840 (2010).

Tomei et al., "Device design and materials optimization of conformal coating for islets of Langerhans," Proc. Nat. Acad. Sci. USA, 111:10514-10519 (2014).

Tomei et al., "Development of an Encapsulated Stem Cell-Based Therapy for Diabetes," Expert. Opin. Biol. Ther. 15: 1321-1326 (2015).

Utada et al., "Absolute instability of a liquid jet in a coflowing stream,"Physical Review Letters, 100:014502 (2008).

Vaithilingam et al., "Encapsulated Islet Transportation: Where Do We Stand?," Rev Diabetes Stud 14: 51-78 (2017).

Villa et al., "Effects of Composition of Alginate-Polyethylene Glycol Microcapsules and Transplant Site on Encapsulated Islet Graft Outcomes in Mice," Transplantation, 101(5):1025-1035 (2017).

Wyman et al., "Immunoisolating pancreatic islets by encapsulation with selective withdrawal," Small, 3:683-690 (2007).

(i).

Figure 1A
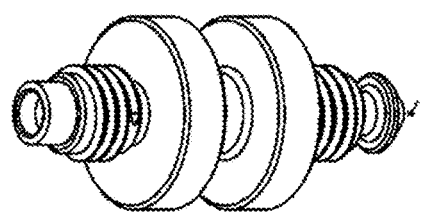
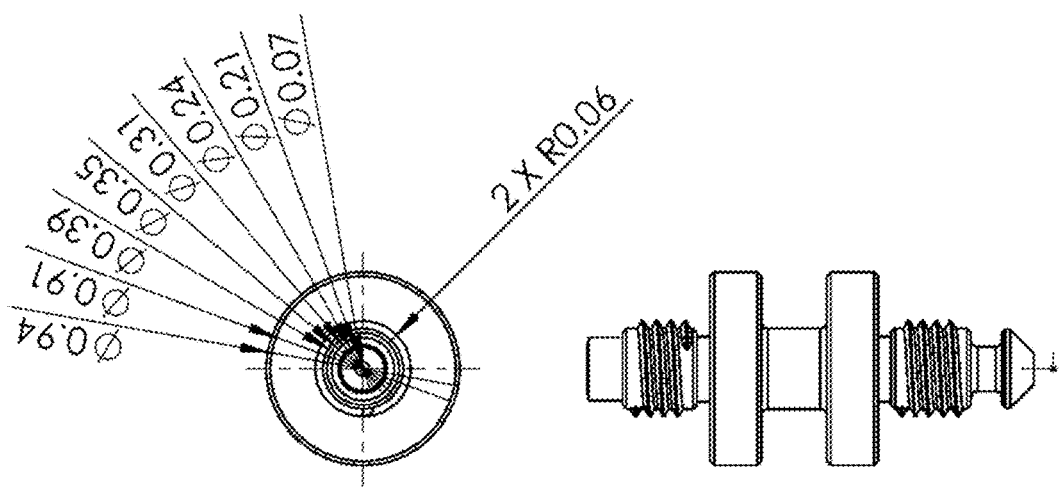
(ii).

Figure 1A
(iii).
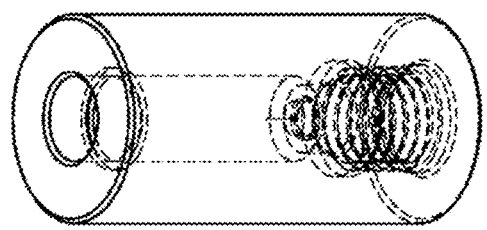
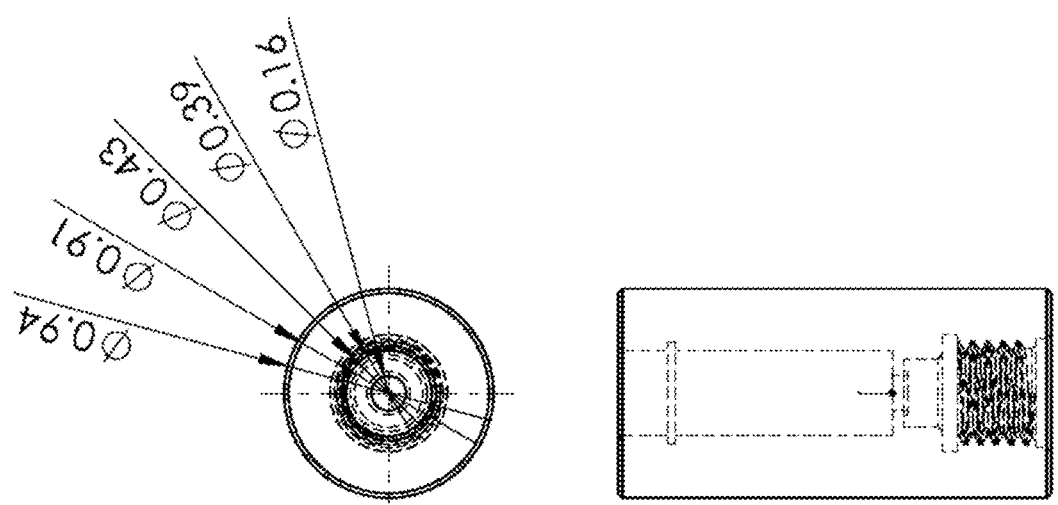

(v).

| a | b | c | d | e | f |
|---|---|---|---|---|---|
| a | (a-0.2)*5 | catheter rests at (f+0.5) | arctan ((b-a/2)/f) | f*c/2 | b/1.5 |
| 1.20 | 5.00 | 2.88 | 52.90° | 4.78 | 3.33 | i) Peristaltic pump
ii) Syringe pump
iii) Conformal coating device
iv) Emulsion apparatus
v) Catheter with islets/PEG solution

A.

C. Control vs Encapsulated, Insulin released

Figure 2
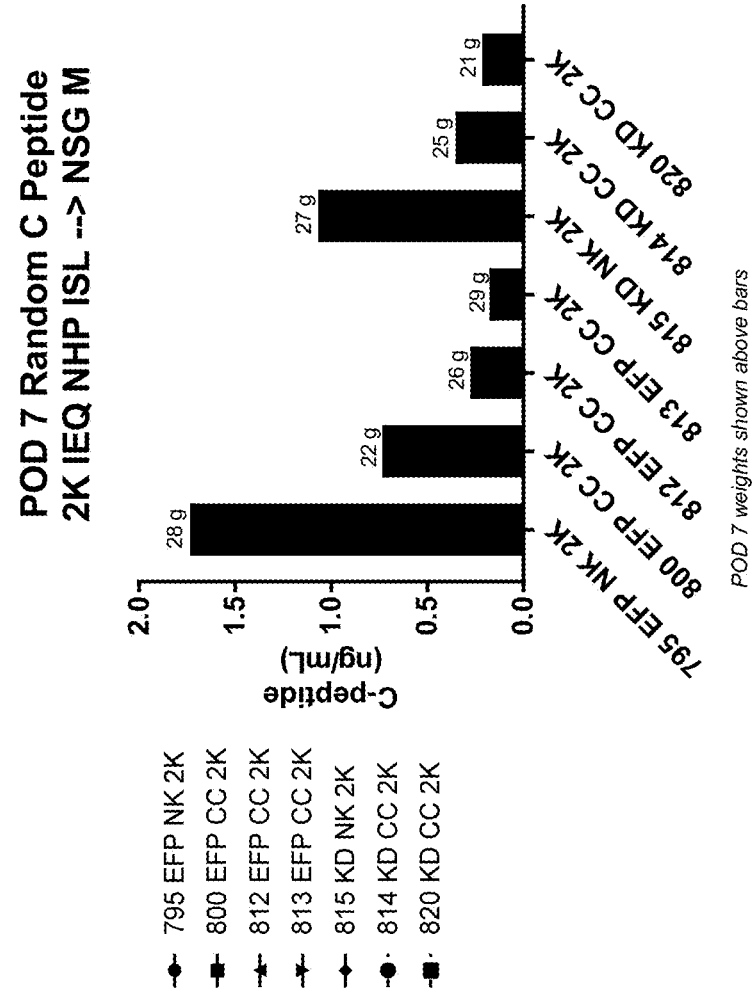
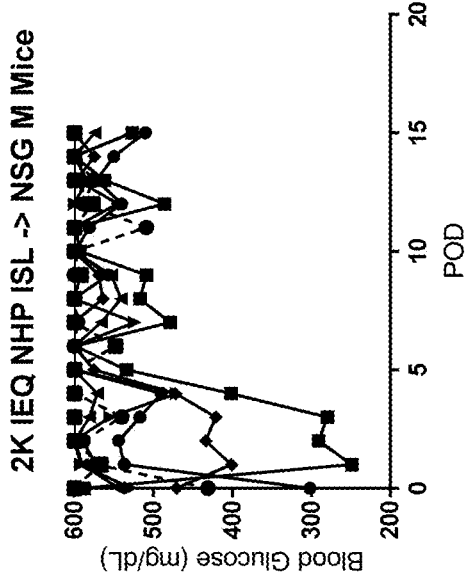

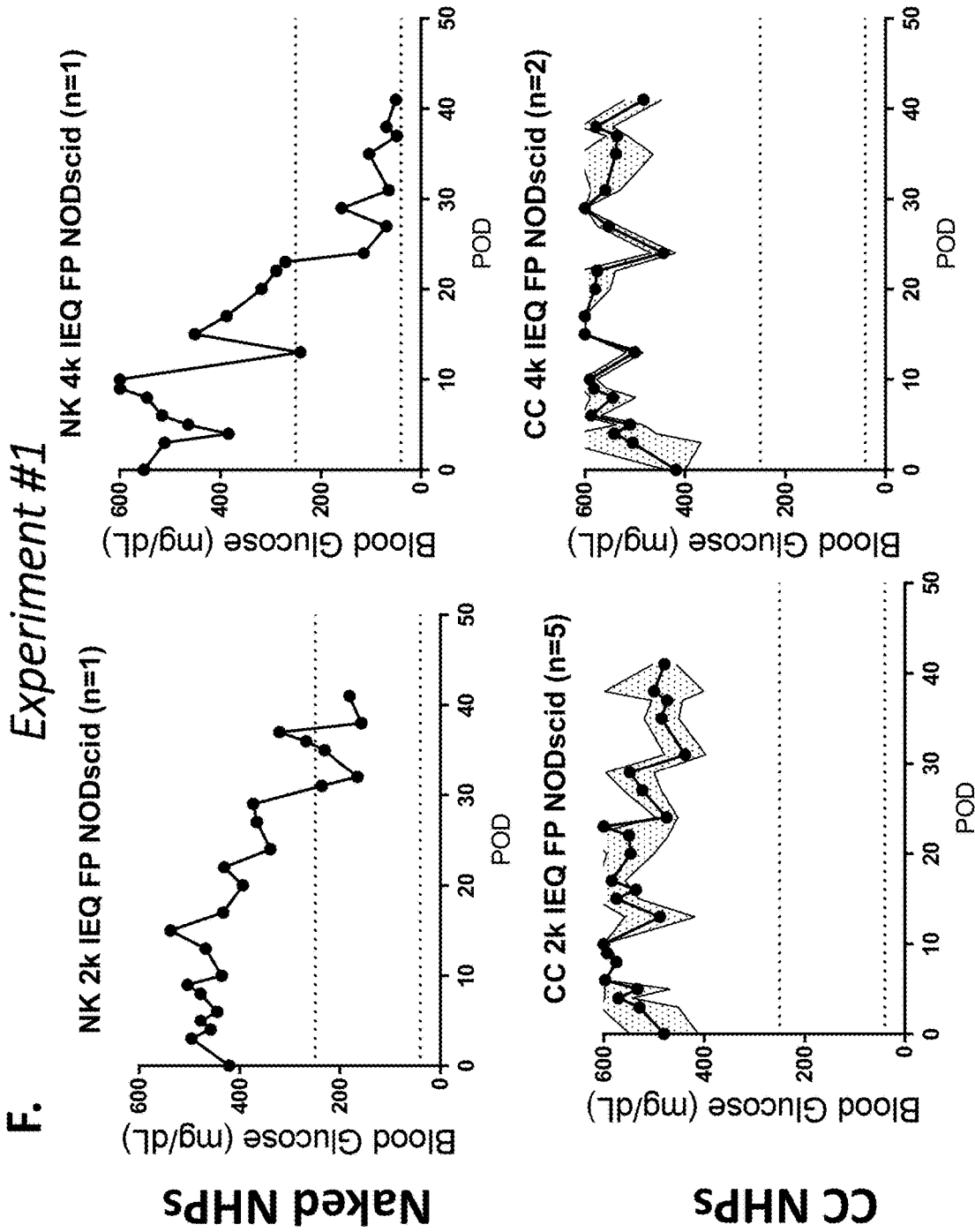

| | FBG (mg/dL) | PPG (mg/dL) | EIR (IU/kg/day) |
|---|---|---|---|
| 26 days pre-Tx | 117.1 ± 38.3 | 139.1 ± 49.8 | 3.60 ± 0.22 |
| POD 28-53 | 89.9 ± 42.5 | 95.3 ± 39.1 | 3.63 ± 0.14 |

Figure 6
D.
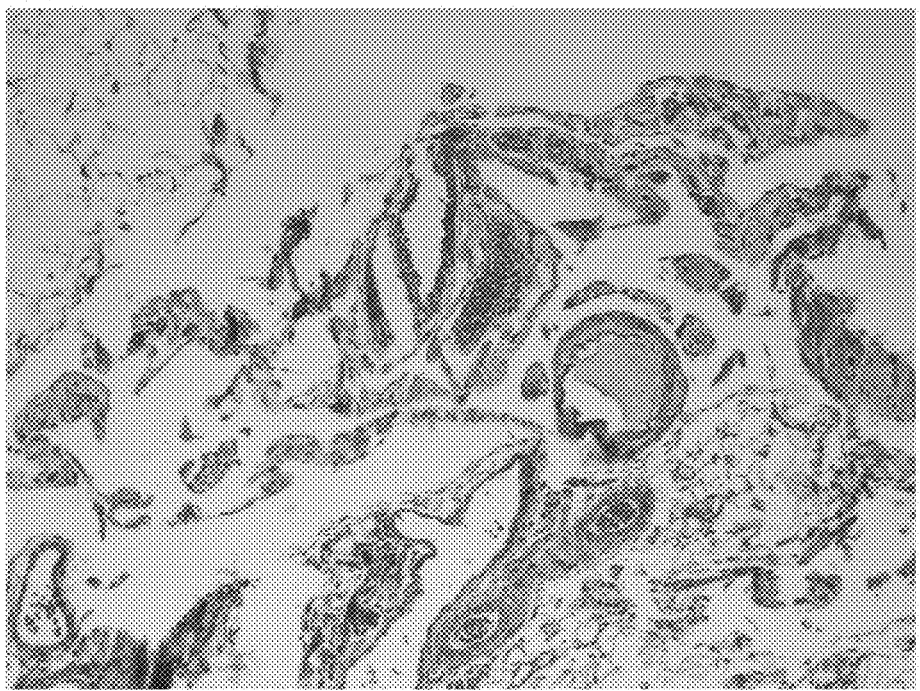
E.
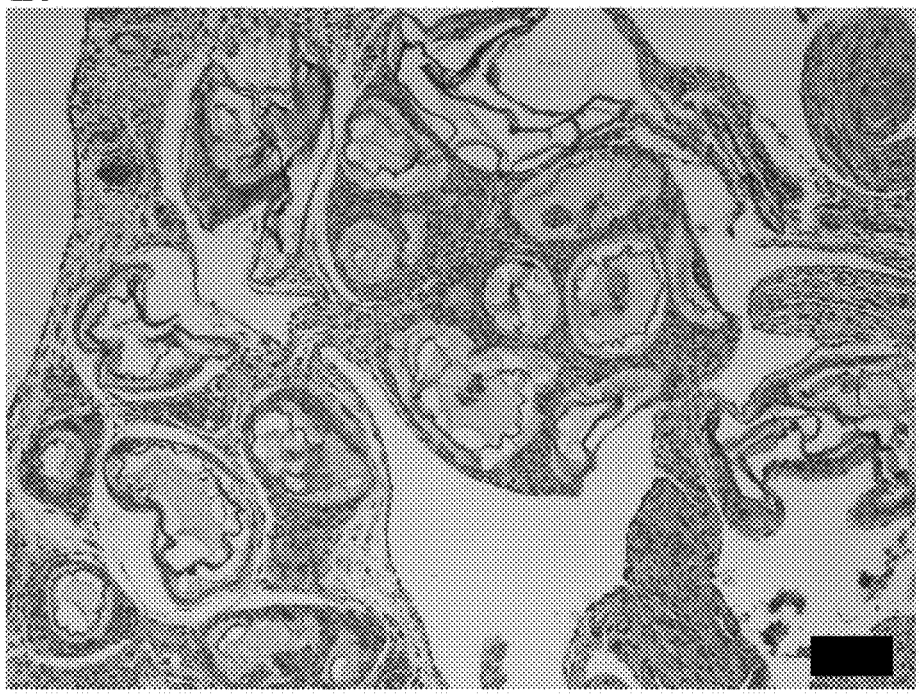

F.

A. Phase Contrast Images: Naked and Conformal Coated Min6 Clusters

E.

CONFORMAL COATING OF CELLS FOR IMMUNOISOLATION

STATEMENT REGARDING FEDERALLY SPONSORED RESEARCH

This disclosure was supported by a grant from the National Institutes of Health, No. R01 DK109929. The government has certain rights in this invention.

This application is a United States National Phase Application filed under 35 U.S.C. § 371 of International Patent Application No. PCT/US2021/029744, filed on Apr. 28, 2021, which claims benefit from U.S. Provisional Patent Application No. 63/016,787, filed Apr. 28, 2020, the disclosure of which is hereby incorporated by reference herein in their entirety.

This application is related to U.S. patent application Ser. No. 15/478,320, filed Apr. 4, 2017, now U.S. Pat. No. 10,653,816, which is a divisional application claiming priority to U.S. patent application Ser. No. 14/114,690, filed Feb. 12, 2014, now U.S. Pat. No. 10,660,987, which is a national stage application under 35 U.S.C. § 371 of International Patent Application No. PCT/US2012/035696, filed on Apr. 28, 2012, which claims the benefit of U.S. Provisional Patent Application No. 61/480,513, filed on Apr. 29, 2011, the disclosures of each of these applications are hereby incorporated by reference in their entireties.

FIELD OF THE INVENTION

This disclosure relates to the field of cell transplantation and provides reagents and methods for facilitating cell transplantation into a human or an animal with minimal immunological reactions or transplant rejection. This disclosure more specifically provides biomaterials including cells for transplantation that have been conformally coated at neutral pH with a coating mixture that minimally interferes with viability, metabolism, or bioactivity of such cells or other biomaterials, and reagents, apparatus, and methods for producing and using said conformally coated biomaterials and particularly cells. In specific embodiments, conformally coated cells and/or cell clusters comprise insulin-producing cells (e.g., beta cell-containing Islets of Langerhans), differentiated from stem cells or isolated from the pancreata of an animal, more particularly a mammal and most particularly a human. Methods for using the conformally coated biomaterials, particularly cells and/or cell clusters, produced using the reagents and apparatus and by the methods herein are particularly provided.

BACKGROUND

Cell encapsulation is a promising strategy for immunoisolating single cells and cell clusters and thus preventing any immune response that would compromise the functionality of the cells upon implantation. Bio-encapsulation has been extensively employed for novel therapeutic trials in the fields of diabetes, hemophilia, cancer and renal failure. However, most trials have not been fully successful for a combination of reasons:
lack of reproducibility in encapsulation and cell isolation methods;
lack of suitable encapsulation materials which should be biocompatible, mechanically and chemically stable, and have an appropriate pore cut-off size to allow nutrient and by-product flow in and out of the capsule while protecting encapsulated biomaterial from immune system effects;
production of non-uniform or non-conformally coated capsules (affecting (i) oxygen and nutrient diffusion through the capsule and (ii) cell secretion of bioactive molecules, and therefore encapsulated cell viability, functionality as therapeutic molecule delivery vehicle and overall encapsulated graft volume);
inability to scale up the encapsulation process from small animal studies to pre-clinical non-human primate studies; and
choices of unfavorable transplantation sites.

Such challenges to encapsulation technology may be seen in the context of work in one of the most promising therapeutic fields for cell encapsulation: diabetes.

Diabetes results from autoimmune destruction of pancreatic beta cells, one of the several cell types that make up the Islets of Langerhans. Over the course of their lifetimes, diabetic patients must frequently monitor and control blood glucose levels and administer insulin when they experience hyperglycemia, which has many collateral effects, including suboptimal metabolic control, higher risks of hypoglycemia and reduced quality of life. Islet allo-transplantation is a very promising therapy to treat diabetic patients but requires a lifetime of systemic immunosuppression to avoid allograft rejection. See, Robertson, 2010, Endocrinol Metab Clin North Am 39, 655-667; Herring et al., 2016, Diabetes Care 39: 1230-1240; Shapiro et al., 2017, Nat. Rev. Endocrinol. 13: 268-277; Pepper et al., 2018, Curr. Opin Organ Transplant. 23: 428-439; LaBlanche et al., 2018, Lancet Diabetes Endocrinol. 6: 527-537; Foster et al., 2018, Diabetes Care 41: 1001-1008; Rickels & Robertson, 2019, Endocrin. Rev. 40: 631-668.

To avoid administration of immunosuppressive drugs at the systemic level, islet allografts can be immunoprotected by coating the cells for transplantation with a semi-permeable polymeric capsule that allows diffusion of oxygen, glucose and insulin while preventing cell-cell contact and diffusion of cytotoxic molecules, which otherwise would trigger the immune response against the graft and its ultimate rejection by the host. de Vos et al., 2010, Adv Exp Med Biol 670, 38-53; Desai & Shea, 2017, Nat Rev Drug Discov 16: 338-350; Vairhilingham et al., 2017, Rev Diabetes Stud 14: 51-78; Krosgren, 2017, Diabetes 66: 1748-1754; Smink et al., 2018, Am J. Tranplant 18: 2113-2118. Islets have a non-uniform size that varies from about 50 to 300 µm in diameter. Most coating procedures known in the art do not allow conformal coating of islets; capsule diameter is generally constant and independent of islet size, and is thus normally larger than 300 µm to guarantee coating of larger islets. Teramura & Iwata, 2010, Adv Drug Deliv Rev 62, 827-840. Because of the excess of cell-free coating material, the total volume of the islet implant is greatly increased such that the only appropriately sized grafting site is the poorly oxygenized abdominal cavity, which contributes to hypoxia of the encapsulated cells. Further, the thickness of the capsule increases the diffusion barrier to oxygen through the coating, also aggravating cell hypoxia, and delays glucose sensing and thus responsiveness of insulin secretion de Groot et al., 2004, J Surg Res 121, 141-150; Buchwald et al., 2015, Biomed. Engineer. Online 14: 28; Tomei et al., 2015, Expert. Opin. Biol. Ther. 15: 1321-1326; Villa et al., 2017, Transplant. 101-1025-1035; Buchwald et al., 2018, Biotechnol. Bioeng 115; 232-245. Most of these encapsulation methods are based on generation of droplets of the coating material mixed with islets through air-jet pump or electrostatic droplet generators Rabanel et al., 2009, Biotechnol Prog 25, 946-963.

In contrast with encapsulation methods based on droplet generation, conformal coating of cell clusters of various diameters has been the focus of some recent investigations. Most of these methods are based on either (a) coating formation layer-by-layer directly onto cells (e.g., by chemical reaction or photo-polymerization) or (b) a purely hydrodynamic procedure, typically involving formation of particles by water-in-oil emulsion formation or by break-up of a water jet in oil by the fluid dynamic principle of Rayleigh-Plateau instability. Teramura et al., Id.; Chabert & Viovy, 2008, Proc Natl Acad Sci USA 105, 3191-3196. Using these methods, it is possible to generate water particles with a constant diameter uniquely dependent on the characteristics of the water and the oil phase, the surface tension between the two phases and the ratio of the hydrodynamic parameters of the two phases. Eggleton et al., 2001, Phys Rev Lett 87, 048302; Utada et al., 2008, Phys Rev Lett 100, 014502; Loscertales et al., 2020, Science 295, 1695-1698; Cohen et al., 2001, Science 292, 265-267. In the food and pharmaceutical industries, these methods have been extensively exploited to nano-encapsulate water-soluble drugs and other substances Loscertales et al., Id., and have only recently been extended to encapsulation of micron-size single cells and cell clusters, with some reported success, as described below.

Chabert and co-workers developed a microfluidic, high-throughput system for encapsulating and self-sorting single cells based on the principle described above. Chabert. & Viovy, Id. However, their system is designed for encapsulation and sorting of single cells (40 µm in diameter or less), and cannot be applied to cell clusters because of the micro-dimensions of their device, which would subject non-single cells to unaffordable shear stresses.

Garfinkel and co-workers developed another method to encapsulate islets by selectively withdrawing the islet-water phase from an external oil phase to create a thin coating on cell clusters. In this method, water phase jetting in the oil phase is achieved by suction of the water phase layer on top of the oil phase. In this design, turbulent flow is created in the water withdrawal area, ultimately leading to incomplete coating that necessitates a second round of encapsulation, increasing the amount of stress to which the cells are subjected and reducing the yield of the process. Wyman et al., 2007, Small 3, 683-690. Further, gel polymerization is achieved through photo-polymerization, which may compromise long-term function of the coated cells.

Hubbell and co-workers developed an approach of coating by a chemical reaction directly on the cell surface, whereby a photosensitizer was adsorbed to the surface of islets, and the photosensitizer-treated islets were suspended in an aqueous solution of a photopolymerizable macromer (U.S. Pat. No. 6,911,227). Photoillumination of the islet suspension led to the polymerization and crosslinking of the macromer to create a conformal polymer gel bound to the surface of the islets.

Hubbell and co-workers describe a conformal coating method in U.S. Pat. Nos. 10,653,816, 10,660,987, and International Publication WO2012/149496. In the exemplification, Hubbell et al. discloses that the water phase was comprised of (1) multi-arm PEG (10 kDa 8-arm 75-90% functionalized PEG-maleimide (PEG-MAL), or PEG-vinyl sulfone (PEG-VS)), an excess amount of crosslinker (dithiothreitol or 2 kDa PEG-dithiol at a molar ratio of 3-4 to 1) to achieve complete PEG gelation and a viscosity enhancing agent (e.g., alginate, amphiphilic self-assembling polymers or peptides, etc.). The inclusion of crosslinker and the viscosity enhancing agent, however, requires that the pH of the water phase be maintained at 3.5-6 (depending on the particular hydrogel composition) and the process to be run within 15 minutes to prevent premature gelation of the water phase before coating, which occurs downstream of water phase jetting and break-up in the encapsulation chamber because of the high reactivity of the Michael-type reaction occurring between the multi-arm PEG and the thiolated crosslinkers. This low pH can impact the long term cell functionality. Also, the rapid gelation reaction that occurs when premixing the base polymer and crosslinker limits the overall process throughput and complicates efforts to scale up the process. Finally, the inclusion of the viscosity enhancing agent can impact the immunoisolation properties of the coatings and the biocompatibility. See e.g., Manzoli et al., Am. J. Transplant, 18(3):590-603 (2018).

In view of the above, there remains a need in the art for efficient, high-yield methods of conformally coating cells and cell clusters without compromising cell functionality or biocompatibility.

SUMMARY

Provided herein are reagents and methods, as well as a conformal coating device, for conformal coating biomaterials, particularly cells and in particular stem cell derived insulin-secreting cells and beta cell-containing Islets of Langerhans isolated from vertebrates, more specifically mammals, and in particular humans. The biomaterials, particularly the cells and/or cell clusters, and more particularly islet cells and/or cell clusters are coated and maintained at neutral pH (e.g., pH~6-~7.4), as disclosed herein. Further modifications of the reagents, apparatus, and methods with regard to the reagents, apparatus, and methods set forth in related applications are set forth herein.

Thus, in a first aspect, this disclosure provides methods for conformally coating a biomaterial with a coating material, comprising the steps of:

(a) injecting an aqueous phase within a coaxial oil phase in a coating device configured to permit a transition from dripping to jetting and flow elongation of the aqueous phase within the oil phase;

(b) adding the biomaterial and the coating material to the aqueous phase, wherein the coating material of said step (b) does not comprise a viscosity-enhancing agent; and wherein the aqueous phase is at a pH of about 6 to about 7.4;

(c) allowing the aqueous phase jet to break up into particles; and (d) adding a component of the coating material downstream of breakup of the aqueous phase jet into particles, wherein the component is a gelling emulsion that promotes or catalyzes polymerization of the coating material; thereby resulting in conformally coated biomaterial.

In some embodiments, the method further comprises the step of collecting the outflow of the coating device (i.e., conformally coated biomaterial and any biomaterial-free coating material).

In some embodiments, the method further comprises the step of purifying the conformally coated biomaterial and the biomaterial-free coating material from said oil phase.

In some embodiments, the method further comprises the step of separating the conformally coated biomaterial from the biomaterial free coating material.

In some embodiments, purification of the conformally coated biomaterial and any biomaterial-free coating material from the oil phase comprises the step of (e) pouring the product from step (d) set forth in the method above into mineral oil while stirring the resultant mixture (i.e., the conformally coated biomaterial and any biomaterial-free coating material, oil phase, and gelling emulsion (comprising a solution of dithiothreitol (DTT) dissolved in Hanks' Balanced Salt Solution (HBSS) and emulsified in polypropylene glycol (PPG) with 10% sorbitan mono oleate (Span80) in mineral oil)).

In some embodiments, the purification of the conformally coated biomaterial and the biomaterial-free coating material from the oil phase comprises the step of (f) adding Hanks' Balanced Salt Solution (HBSS) to the product resultant in step (e) (i.e., the conformally coated biomaterial and any biomaterial-free coating material, oil phase, gelling emulsion (comprising a solution of dithiothreitol (DTT) dissolved in Hanks' Balanced Salt Solution (HBSS) and emulsified in polypropylene glycol (PPG) with 10% sorbitan mono oleate (Span80) in mineral oil) coming out of the device, and mineral oil).

In some embodiments of the methods disclosed herein, the product from step (f) is centrifuged and washed with HBSS.

In some embodiments of the methods disclosed herein, after centrifugation and wash with Hanks' Balanced Salt Solution (HBSS), the coated biomaterial and any biomaterial-free coating material are incubated with a solution of PEGdithiol.

In some embodiments, the viscosity enhancing agent that is excluded from the methods described herein is selected from polysaccharides, such as alginate, decellularized tissues, PEG-based nanomaterial assemblies, hyaluronic acid, chondroitin sulfate, dextran, dextran sulfate, heparin, heparin sulfate, heparan sulfate, chitosan, gella gum, xanthan gum, guar gum, water soluble cellulose derivatives, gelatin, collagen, and albumin.

In some embodiments, this disclosure provides methods for conformally coating a biomaterial with a coating material, comprising the steps of: (a) injecting a water phase within a coaxial oil phase in a coating device configured to permit a transition from dripping to jetting and flow elongation of the water phase within the oil phase; (b) adding the biomaterial and the coating material to the water phase, wherein polymerization of the coating material occurs downstream of breakup of the water phase jet into particles, resulting in the conformal coating of the biomaterial with the coating material; (c) adding a component of the coating material downstream of breakup of the water phase jet into particles, wherein said component promotes/catalyzes polymerization of the coating material; (d) optionally collecting the outflow of the coating device; e) optionally purifying the conformally coated biomaterial and biomaterial-free coating material from the oil phase; and (f) optionally separating the conformally coated biomaterial from the biomaterial-free coating material.

In some embodiments, the coating material comprises polyethylene glycol (PEG), polyethylene oxide (PEO), poly(N-vinyl pyrrolidinone) (PVP), polyethyl oxazoline, polyvinyl alcohol (PVA), polythyloxazoline (PEOX), poly(amino acids), derivatives thereof or combinations thereof. In some embodiments, the coating material is one or more of polyethylene glycol (PEG), polyethylene oxide (PEO), poly(N-vinyl pyrrolidinone) (PVP), polyethyl oxazoline, polyvinyl alcohol (PVA), polythyloxazoline (PEOX), and/or poly(amino acids). In some embodiments, the coating material comprises polyethylene glycol (PEG), PEG-maleimide, PEG-acrylate, PEG-vinyl sulfone, PEG-thiol, or modified derivatives thereof or combinations of particular species thereof. In some embodiments, the coating material comprises polyethylene glycol (PEG), PEG-maleimide, PEG-acrylate, or PEG-vinyl sulfone. In some embodiments, the aqueous phase comprises multi-arm polyethylene glycol (PEG) minimally crosslinked (5-50%) with PEGdiThiol. In some embodiments, the coating material comprises a multi-arm polyethylene glycol (PEG) minimally crosslinked (1-30%) with PEGdiThiol. In some embodiments, the coating material comprises 5-10% PEG. In some embodiments, the aqueous phase comprises serum-free media at about pH 6-7.4; or Hanks' Balanced Salt Solution (HBSS) at about pH 6-7.4; specifically, the pH of the aqueous phase is provided at about pH 6-7.4. In some embodiments, the aqueous phase comprises serum-free media at pH 6-7.4; or Hanks' Balanced Salt Solution (HBSS) at pH 6-7.4; specifically, the pH of the aqueous phase is provided at pH 6-7.4. In some embodiments, the water phase is at a pH of about 6 to about 7.4. In some embodiments, the water phase is at a pH of 6 to 7.4.

In some embodiments, the biomaterial comprises cells, cell clusters, biomaterial-coated cells or cell-clusters, subcellular organelles, biologic molecules, non-biologic drugs, or a combination thereof. In some embodiments, the biomaterial comprises one or more of cells, cell clusters, biomaterial-coated cells or cell-clusters, subcellular organelles, biologic molecules and non-biologic drugs. In some embodiments, the biomaterial comprises cells or cell clusters, more particularly islet cells or cell clusters thereof. In some embodiments, the biomaterial comprises cells or cell clusters. In some embodiments, the water phase comprises about 100,000,000-about 200,000,000 cells/mL. In some embodiments, the water phase comprises about 200,000,000 cells/mL. In some embodiments, the water phase comprises about 50,000-about 100,000 cell clusters/ml. In some embodiments, the water phase comprises about 100,000 cell clusters/ml. In some embodiments, the water phase comprises 500-750,000 cells and/or cell clusters/mL, particularly islet cells. In some embodiments, the biomaterial comprises about 100,000,000-about 200,000,000 cells/mL and/or about 50,000-about 100,000 cell clusters/mL. In some embodiments, the biomaterial comprises about 100,000,000-about 200,000,000 islet cells/mL. In some embodiments, the biomaterial comprises about 50,000-about 100,000 cell clusters/mL. In some embodiments, the aqueous phase comprises about 2,500-250,000 islet cells and/or cell clusters/mL.

In some embodiments, the aqueous phase comprises a thiolated reagent, a reducing reagent, a surfactant, or a combination thereof. In some embodiments, the aqueous phase used in the practice of the methods of this disclosure can optionally comprise one or more of a thiolated reagent, reducing reagent and/or a surfactant. In certain embodiments, the surfactant is polyoxyethylene-polyoxypropylene block copolymer or poly(ethylene glycol-bl-propylene sulfide), more particularly 2% polyoxyethylene-polyoxypropylene block copolymer. In some embodiments, the thiolated or reducing reagent is dithiothreitol (DTT) or PEGdiThiol. In some embodiments, the thiolated or reducing reagent in the aqueous phase is 0.01-0.62% dithiothreitol (DTT). In some embodiments, the thiolated or reducing reagent in the aqueous phase is 0.01-3.1% PEGdiThiol.

In some embodiments, the gelling emulsion comprises dithiothreitol (DTT) dissolved in Hanks' Balanced Salt Solution (HBSS) and emulsified in polypropylene glycol (PPG) with 10% v/v sorbitan mono oleate (Span80).

In some embodiments of the methods provided herein, the oil phase comprises polypropylene glycol (PPG). In some embodiments, the oil phase comprises polypropylene glycol (PPG) with 10% sorbitan mono oleate, wherein said oil phase optionally comprises triethanolamine. In triethanolamine-comprising embodiments, the oil phase comprises 0.01-0.2% triethanolamine. In some embodiments, the oil phase comprises mineral oil with a viscosity of at least 2.5 times more than the viscosity of the aqueous phase. In some embodiments, the viscosity of the oil phase is about 1,300 cP.

In some embodiments, methods are provided herein wherein the component of the coating biomaterial added downstream of breakup of the aqueous phase jet into particles (gelling emulsion) is a solution of dithiothreitol (DTT) dissolved in Hanks' Balanced Salt Solution (HBSS) and emulsified in polypropylene glycol (PPG) with 10% sorbitan mono oleate (Span80).

In a second aspect, this disclosure provides a biomaterial conformally coated by a method disclosed herein.

In a third aspect, this disclosure provides methods for treating a disease or disorder in a patient, comprising the step of implanting into the patient the conformally coated biomaterial produced according to the methods of the invention. In particular embodiments, the disease is and said conformally coated biomaterial comprises islet cells and cell clusters.

In some embodiments, the disorder is diabetes.

Methods provided herein comprise contacting coated biomaterial downstream of breakup of the aqueous phase jet into particles with an emulsion of dithiothreitol (DTT) and Hanks' Balanced Salt Solution (HBSS) in polypropylene glycol (PPG). In certain embodiments, a 3D-printed device is connected to the encapsulation chamber for dispensing the gelling emulsion coaxially to the coated biomaterial. In certain embodiments, a 3D-printed device is connected to the encapsulation chamber for dispensing the DTT/HBSS/PPG gelling emulsion coaxially to the coated biomaterial.

The methods of this disclosure advantageously and optionally provide purification of coated biomaterials. In such embodiments, purification of the conformally coated biomaterial and biomaterial-free coating material from the oil phase is conducted by pouring the product from the coating product into mineral oil while stirring. In certain embodiments of these purification steps of the provided method, during the purification with the mineral oil while stirring, Hanks' Balanced Salt Solution (HBSS) is added while continuing to stir the emulsion. In additional embodiments, after the purification with the mineral oil and Hanks' Balanced Salt Solution (HBSS), the product is centrifuged and washed with HBSS. In other embodiments, after the purification and washing with Hanks' Balanced Salt Solution (HBSS), the coated biomaterials are incubated with a solution of PEGdithiol.

In a fourth aspect, this disclosure provides a conformal coating device comprising:
(1) an encapsulation chamber comprising:
 (a) a housing portion coupled to a catheter via a first inlet at a first end of the housing portion and connected to a first pump;
 (b) an attachment portion comprising a first end configured to engage with an interior surface of a second end of the housing portion; and
 (c) a coating portion comprising a first end configured to engage with an exterior surface of a second end of the attachment portion, a chamber configured to coat, a second inlet coupled to a second pump, and a second end of the coating portion;
 wherein the catheter connected to the first pump is configured to inject a coating material and a biomaterial to be coated, in an aqueous phase to the first inlet on the internal side of the housing portion, wherein the aqueous phase comprises a pH level at or between 6-7.4; and wherein the injected coating material does not comprise a viscosity enhancing agent;
 wherein the second pump is configured to inject an oil phase comprising surfactant to a second inlet on the external side of the coating portion, wherein injection of the oil phase is configured to flow coaxially to and externally to the internal aqueous phase;
(2) a capillary coupled to the second end of the coating portion, wherein the capillary is downstream of a point where the aqueous phase flow contacts with and elongates within the external oil phase to form a biphasic fluid that is configured to flow coaxially through the capillary from the coating portion, and
(3) a third pump coupled to the capillary and configured to inject a gelling emulsion coaxially to the capillary, wherein the emulsion comprises a catalyst for polymerization of the aqueous phase.

In some embodiments, the first end of the coating portion substantially surrounds the second end of the attachment portion to form the chamber wherein the aqueous phase flow contacts with the oil phase to form the biphasic fluid.

In some embodiments, the encapsulation chamber comprises a tapered opening including a taper angle of an outlet nozzle configured for biphasic fluid to flow to the capillary, and the second inlet is coupled with the chamber at the tapper angle.

In some embodiments, the first pump is a precision flow syringe pump.

In some embodiments, the second pump is a first peristaltic pump.

In some embodiments, the third pump is a second peristaltic pump.

In some embodiments, provided herein is a conformal coating device comprising an encapsulation chamber formed by assembly of three parts. A catheter connected to a precision flow syringe pump is configured to inject a coating material and the biomaterial to be coated to a first inlet on the encapsulation chamber (internal phase), wherein this aqueous phase comprises a pH level at or between 6-7.4. A first peristaltic pump is configured to inject an oil phase containing surfactant to a second inlet on the encapsulation chamber, wherein injection of the oil phase (external phase) is configured to flow coaxially to the internal aqueous phase. A capillary coupled to an end of the encapsulation chamber, wherein the capillary is downstream of the point where the internal aqueous phase flow elongates within the external oil phase (biphasic fluid) such that the biphasic fluid is configured to flow into the capillary from the encapsulation chamber, and wherein the internal aqueous phase (containing the coating material and the biomaterial to be coated) and the external oil phase are configured to coaxially flow through the capillary. The device further comprises a second peristaltic pump configured to inject a gelling emulsion coaxially to the capillary, wherein the emulsion comprises a catalyst for polymerization of the coating material, wherein the emulsion is configured to coaxially contact with the coating material and the biomaterial to be coated. In some embodiments, the conformal coating device further comprises an outlet to release air from the device. In some embodiments, the coating portion may further comprise an outlet to release air from the device. In some embodiments, the outlet to release air is positioned upstream of the water phase inlet into the device. The air release outlet is closed during the coating process.

These and other features and advantages of this disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Definitions and General Techniques

Figure 1:
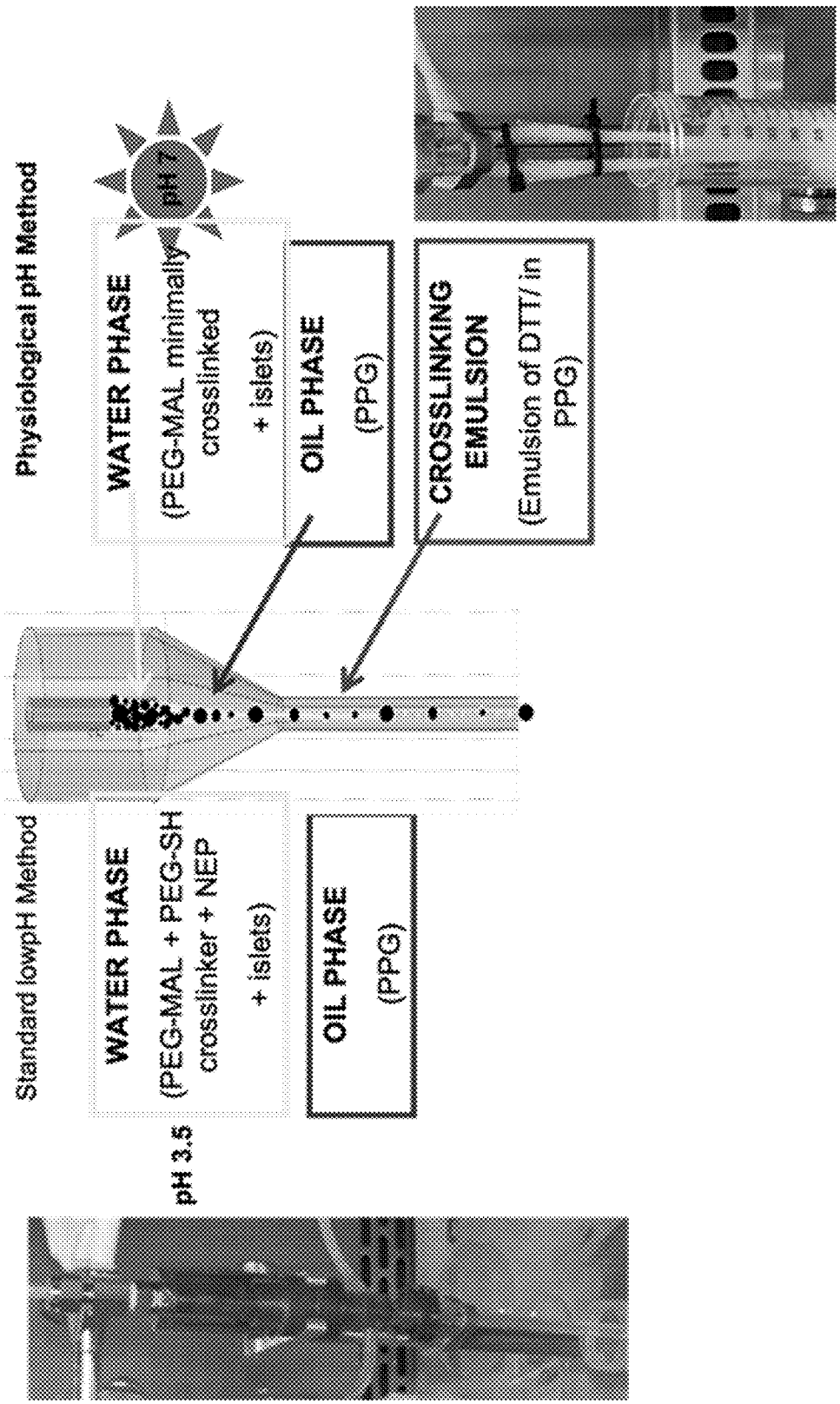
FIG. 1. Schematic of conformal coating modification to allow elimination of viscosity enhancers (alginate, Matrigel or amphiphilic self-assembling peptides) to improve biocompatibility of conformal coating (CC) gels and to allow encapsulation at physiological pH to maximize functionality of NHP islets. As set forth in the Prior Applications (hereinafter, the "low pH method"), the aqueous phase is composed by multi-arm PEG, crosslinker (PEGdithiol or dithiothreitol, DTT) and viscosity enhancers at pH less than 6 to prevent PEG crosslinking and gel formation before capsules are formed (downstream break-up of aqueous phase jet). The methods set forth herein are performed at physiological pH, wherein the aqueous phase is composed by multi-arm PEG only, which is crosslinked at 1-30% with PEG-SH to reach optimal viscosity at physiological pH (7.4). PEG crosslinking at 100% and gel formation are achieved after capsules are formed, wherein an emulsion of DTT in Hanks' Balanced Salt Solution (DTT/HBSS) and polypropylene glycol (PPG) is flowed downstream of the break-up of the aqueous phase jet and coaxially to the outflow of the device. Purification is achieved by dilution with light mineral oil and HBSS while stirring and centrifugation rather than by extraction with organic solvents such as hexane as in the Prior Applications. Thus, the innovation relies in (i) the composition of the aqueous phase containing only islets and pure PEG without any additives, (ii) the introduction of the PEG crosslinker downstream capsule formation by dispensing the gelling emulsion with a device, (iii) the capsule purification method that does not include organic solvents.

Unless otherwise defined herein, scientific and technical terms used in this application shall have the meanings that are commonly understood by those of ordinary skill in the art. Generally, nomenclature used in connection with, and techniques of, cell and tissue culture, molecular biology, biochemistry, immunology, microbiology, genetics, and related fields described herein are within the skill of the art. In case of conflict, the present specification, including definitions, will control.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art can be explicitly excluded from any one or more of the claims. Because such embodiments are deemed to be known to one of ordinary skill in the art, they can be excluded even if the exclusion is not set forth explicitly herein. Any particular embodiment of the invention can be excluded from any claim, for any reason, whether or not related to the existence of prior art.

The term "herein" means the entire application.

It should be understood that any of the embodiments described herein, including those described under different aspects of the disclosure and different parts of the specification (including embodiments described only in the Examples) can be combined with one or more other embodiments of the invention, unless explicitly disclaimed or improper. Combination of embodiments are not limited to those specific combinations claimed via the multiple dependent claims.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group.

Throughout this specification and embodiments, the word "comprise," or variations such as "comprises" or "comprising," will be understood to imply the inclusion of a stated integer (or components) or group of integers (or components) but not the exclusion of any other integer (or components) or group of integers (or components).

Throughout the specification, where compositions or devices are described as having, containing, including, or comprising (or variations thereof), specific components, it is contemplated that compositions also may consist essentially of, or consist of, the recited components. Similarly, where methods or processes are described as having, containing, including, or comprising specific process steps, the processes also may consist essentially of, or consist of, the recited processing steps. Further, it should be understood that the order of steps or order for performing certain actions is immaterial so long as the compositions, devices and methods described herein remains operable. Moreover, two or more steps or actions can be conducted simultaneously. For purposes of simplicity, those embodiments have not been specifically set forth in haec verba herein.

The term "including" is used to mean "including but not limited to." "Including" and "including but not limited to" are used interchangeably. Thus, these terms will be understood to imply the inclusion of a stated integer (or components) or group of integers (or components), but not the exclusion of any other integer (or components) or group of integers (or components).

As used herein, "about" or "approximately" means within an acceptable error range for the particular value as determined by one of ordinary skill in the art, which will depend in part on how the value is measured or determined, i.e., the limitations of the measurement system.

The use of the terms "a" and "an" and "the" and similar referents in the context of describing the elements (especially in the context of the following claims) are to be construed to cover both the singular and the plural, unless otherwise indicated herein or clearly contradicted by context.

The term "or" as used herein should be understood to mean "and/or," unless the context clearly indicates otherwise.

Any example(s) following the term "e.g." or "for example" is not meant to be exhaustive or limiting.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "conformal coating" or variations thereof such as "conformally coated" and "conformal coat" refers to a uniform layer of coating material (e.g., generally up to about 100 microns in thickness) that surrounds the external surface of and conforms to the shape and size of a biomaterial. The conformal coat is relatively monodisperse and not dependent on the size of the biomaterial. The conformal coat has a fixed and constant thickness. This is unlike traditional microencapsulation done by droplet generation where the size of the capsules is fixed and the thickness is dependent on the size of the enclosed biomaterials.

The terms "water phase" and "aqueous phase" are used interchangeably herein and refer to a liquid phase which comprises water and can additionally comprise hydrophilic co-solvents and water-soluble substances. Examples of the aqueous phase include, but are not limited to, water per se, aqueous buffers, cell culture media, peptide, protein, and carbohydrate solutions in water, organ preservation solutions.

The term "oil phase" as used herein, means a liquid phase which is immiscible with the water phase or the aqueous phase. Examples of the oil phase include, but are not limited to polypropylene glycol (PPG), Mineral oils (e.g., mineral oil having a viscosity of at least 2.5 times more than the viscosity of the aqueous phase, any highly viscous (e.g., 1,300 cP) liquid that is immiscible with water.

As used herein, "dripping" as it relates to the aqueous phase refers to a process whereby the aqueous phase is permitted to pass through an orifice, opening or aperture, such that droplets are formed. It also encompasses the process by which a continuous stream of the aqueous phase is converted to droplets via mechanical, ultrasonic, or other comparable means.

As used herein, "jetting" as it relates to the aqueous phase refers to a process whereby a stream of liquid (e.g., the aqueous phase) is forced out of an orifice, opening or aperture at a high velocity. The high velocity allows counteracting the surface tension difference. "Jetting" refers to flow elongation so that the aqueous phase flow diameter is reduced as it exits the injection orifice by at least an order of magnitude.

As used herein, the term "elongation" as it relates to the aqueous phase refers to the process whereby the length of stream of liquid (e.g., the aqueous) is extended or elongated while its cross-sectional diameter is reduced. Elongation allows transitioning from dripping to jetting.

This disclosure relates to reagents, apparatus, and methods for immunoisolating biomaterials, e.g., cells and cell clusters, to prevent immune rejection, inflammation, and/or autoimmune destruction while preserving cell functionality when the biomaterials are implanted into a subject.

The conformal coating technology set forth herein permits cell clusters having variable sizes (50-350 μm diameter, including insulin-producing cells and primary islets) to be coated with a few micron to tens of microns-thick hydrogel, where coating thickness was relatively monodisperse and not dependent on the cell cluster diameter. Tomei et al., 2014, Proc. Nat. Acad. Sci. USA 111: 10514-19. Significant advances in this technology include (i) minimization of capsule thickness, which maximizes nutrient/glucose/insulin transport to the coated cells maximizing cell viability and minimizing delays in glucose-stimulated insulin secretion, Buchwald et al., 2018, Biotechnol. Bioeng. 115: 232-245, and (ii) minimizing volume of an encapsulated cell graft, which permits transplantation in confined sites that can only accommodate limited volumes, including pre-vascularized sites and devices for local immunomodulation. See, Tomei et al., 2015, Expert. Opin. Biol. Ther. 15: 1321-1326.

Conformal coating is achieved by injecting a aqueous phase containing a coating solution and cell clusters coaxially to a larger (~10-fold larger in cross-sectional diameter) chamber containing a flowing, immiscible oil mixture (made, inter alia, of high viscosity polypropylene glycol (PPG) and Span80, a commercially available (Sigma Aldrich), nonionic surfactant, comprising oleic acid (C18: 1)<60%; balance primarily linoleic (C18:2), linolenic (C18: 3) and palmitic (C16:0) acids) within an encapsulation device having a flow-focusing geometry downstream of the aqueous phase injection into the oil phase. Such geometry allows elongation of biphasic flow and, if the viscosity of the aqueous phase is high enough, Tomei et al., 2014, Proc. Nat. Acad. Sci. USA. 111: 10514-10519, jetting of the aqueous phase inside the oil phase occurs, as set forth in U.S. Pat. Nos. 10,653,816, 10,660,987, and International Patent Application No. PCT/US2012/035696, the disclosures of each of these applications are hereby incorporated by reference in their entireties (hereinafter, "the Prior Applications").

As used herein, "jetting" refers to flow elongation so that the aqueous phase flow diameter is reduced as it exits the injection orifice by at least an order of magnitude. After aqueous phase jetting, the Plateau-Rayleigh instability phenomenon causes the aqueous phase to break-up into nano-liter-sized droplets and thereby, coating of the cell clusters contained in the aqueous phase. In the device, the encapsulation chamber is connected to a 10-cm long glass capillary with a 1-mm diameter bore where the biphasic fluids continue flowing; a collection tube is positioned below the tip of the glass tubing to collect the flow output.

As set forth in the exemplification of the Prior Applications, the water phase was comprised of (1) multi-arm PEG (10 kDa 8-arm 75-90% functionalized PEG-maleimide (PEG-MAL), or PEG-vinyl sulfone (PEG-VS)), an excess amount of crosslinker (dithiothreitol and 2 kDa PEG-dithiol at a molar ratio of 3-4 to 1, 8-arm PEG-MAL or PEG-VS) to achieve complete PEG gelation; the water phase also included additives to achieve sufficiently high viscosity of the water phase (including but not limited to alginate, amphiphilic self-assembling polymers or peptides, etc.). As set forth in the Prior Applications, the pH of the water phase in the exemplification needed to be maintained at 3.5-6 (depending on the particular hydrogel composition) to prevent premature gelation of the water phase before coating, which occurs downstream of water phase jetting and break-up in the encapsulation chamber because of the high reactivity of the Michael-type reaction occurring between the multi-arm PEG and the thiolated crosslinkers. To collect the outflow, a 50 mL conical tube was positioned below the glass tubing and filled with PPG and a base (triethanolamine) to increase the pH of the aqueous phase and accelerate gelation of the aqueous phase after collection and before purification. Purification was achieved by extracting the gelled aqueous phase (PEG hydrogel-coated cell clusters and empty PEG gel) using hexane. Using this method as disclosed in the Prior Applications, in vitro and in vivo functionality of conformal coated primary islets, stem cell-derived insulin secreting cells, and human renal epithelial cells was shown as set forth herein. These conformally coated cells were found in mice to reverse diabetes without the need of immunosuppression. See, Tomei et al., 2014, Ibid.; Manzoli et al., 2018, Ibid; Stock et al., 2020, Stem Cell Reports 14: 91-104.

However, low pH in the aqueous phase during encapsulation has been found to reduce coated primary islets functionality (e.g., viability), especially in non-human primate islets (as shown in the Examples herein). Also, the aqueous phase used in low pH methods needed to contain both PEG, crosslinker and a viscosity enhancing additive (alginate, amphiphilic self-assembling polymers or peptides, etc.) to achieve the necessary viscosity to allow aqueous phase jetting and break-up. Some of those additives reduced biocompatibility (as shown herein) and immunoisolation, as shown in Manzoli et al., 2018, Am. J. Transplant. 18: 590-603 of coating hydrogels in animal models.

Figure 1A:
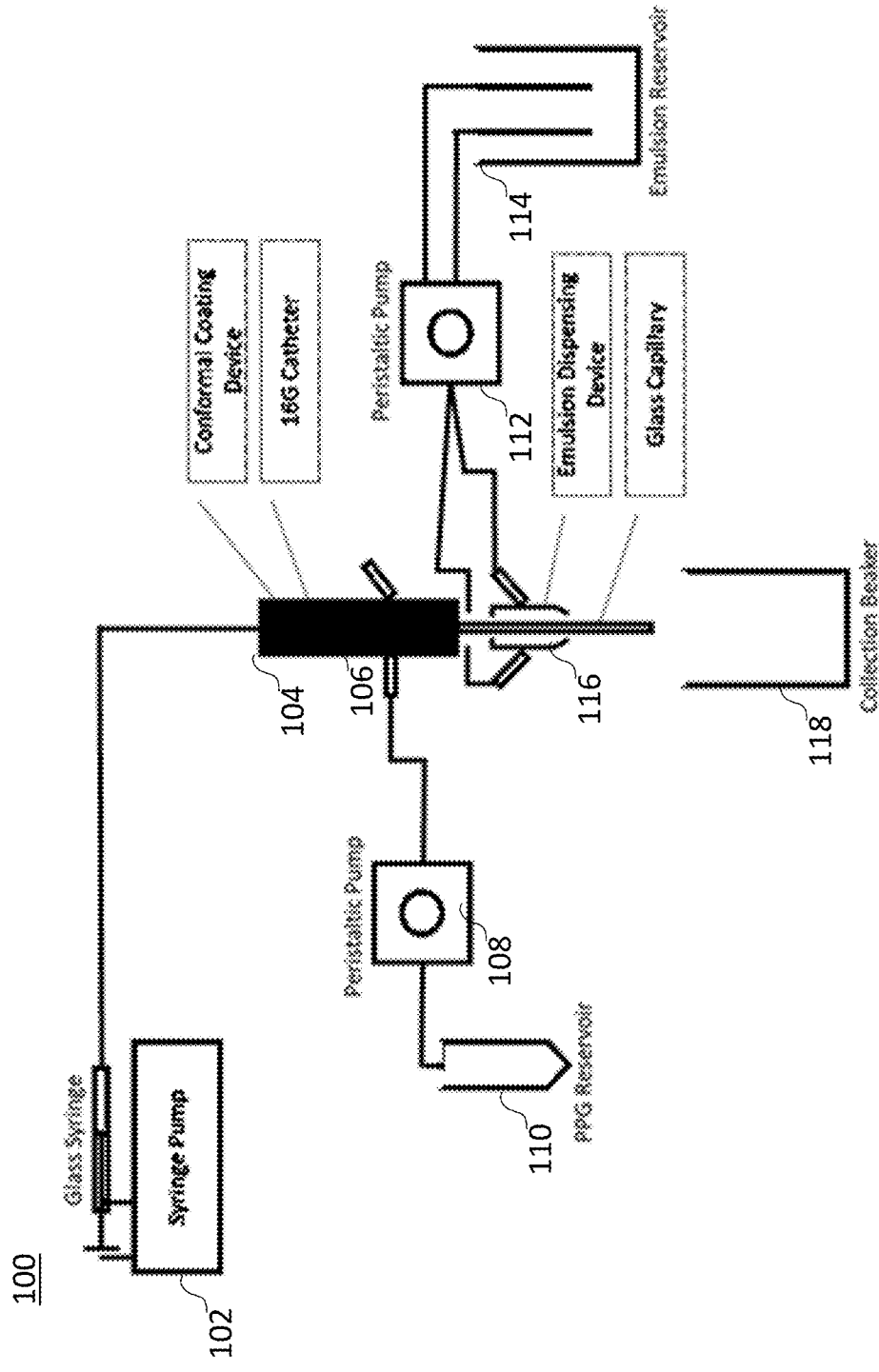
FIG. 1A. Schematic of conformal coating apparatus disclosed herein including the conformal coating device and the gelling emulsion dispensing device. The conformal coating device is obtained by assembling three different parts: Panels (ii), (iii), and (iv) are illustrations of the three principal components of one version of the conformal coating device used with a 16G intravenous catheter for coating 50-250 μm cell clusters. These three parts are assembled and screwed together along with a glass capillary to form the complete device. Panel (v) indicates the critical design components of the internal chamber of the conformal coating device and relative metrics that are necessary for achieving the fluidic conditions that allows formation of coatings around cell clusters that are conformal. The table indicates these relative metrics and the specific metrics used with a 16G intravenous catheter for coating 50-250 μm cell clusters.
Figure 1A:
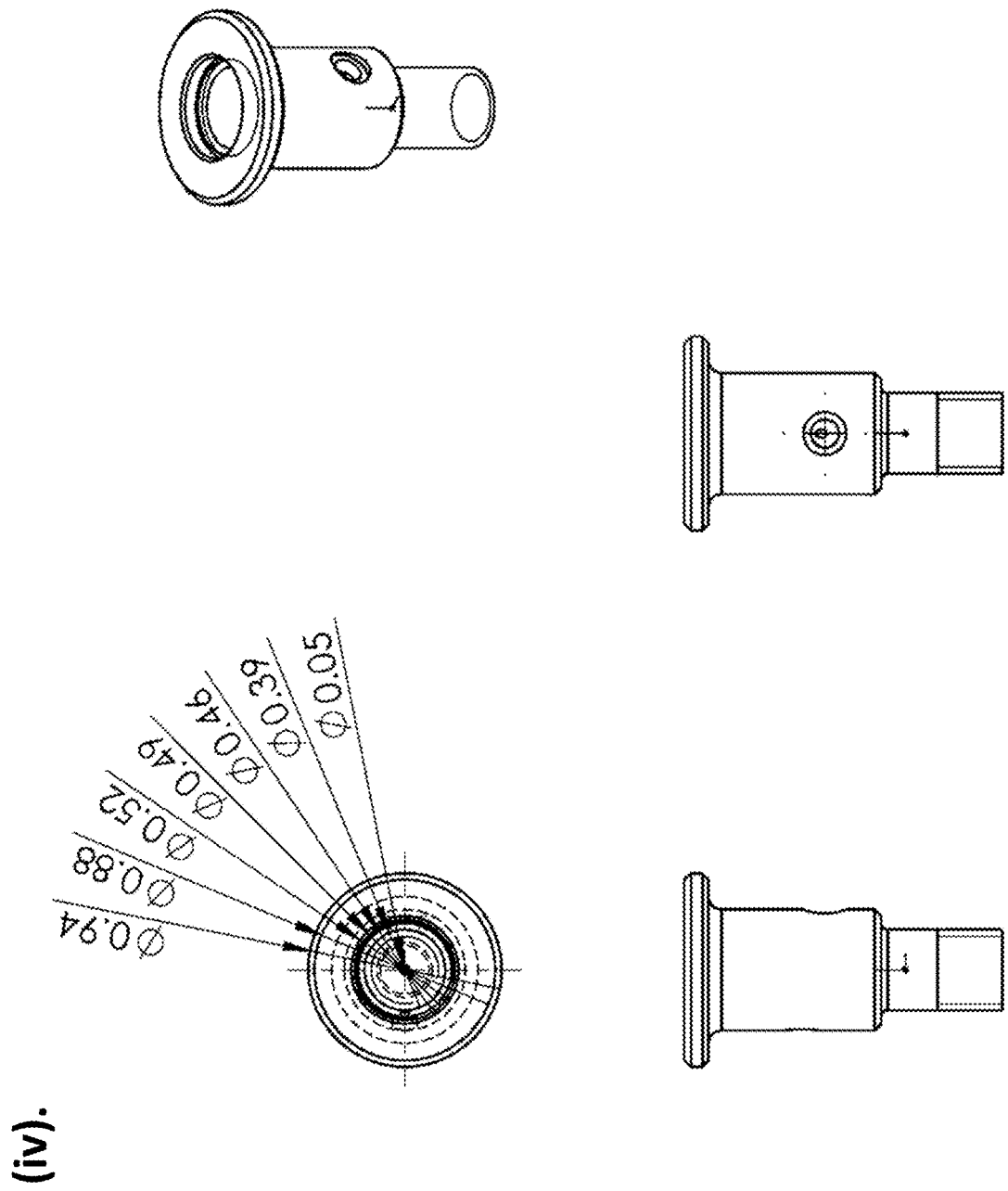
Figure 1A:
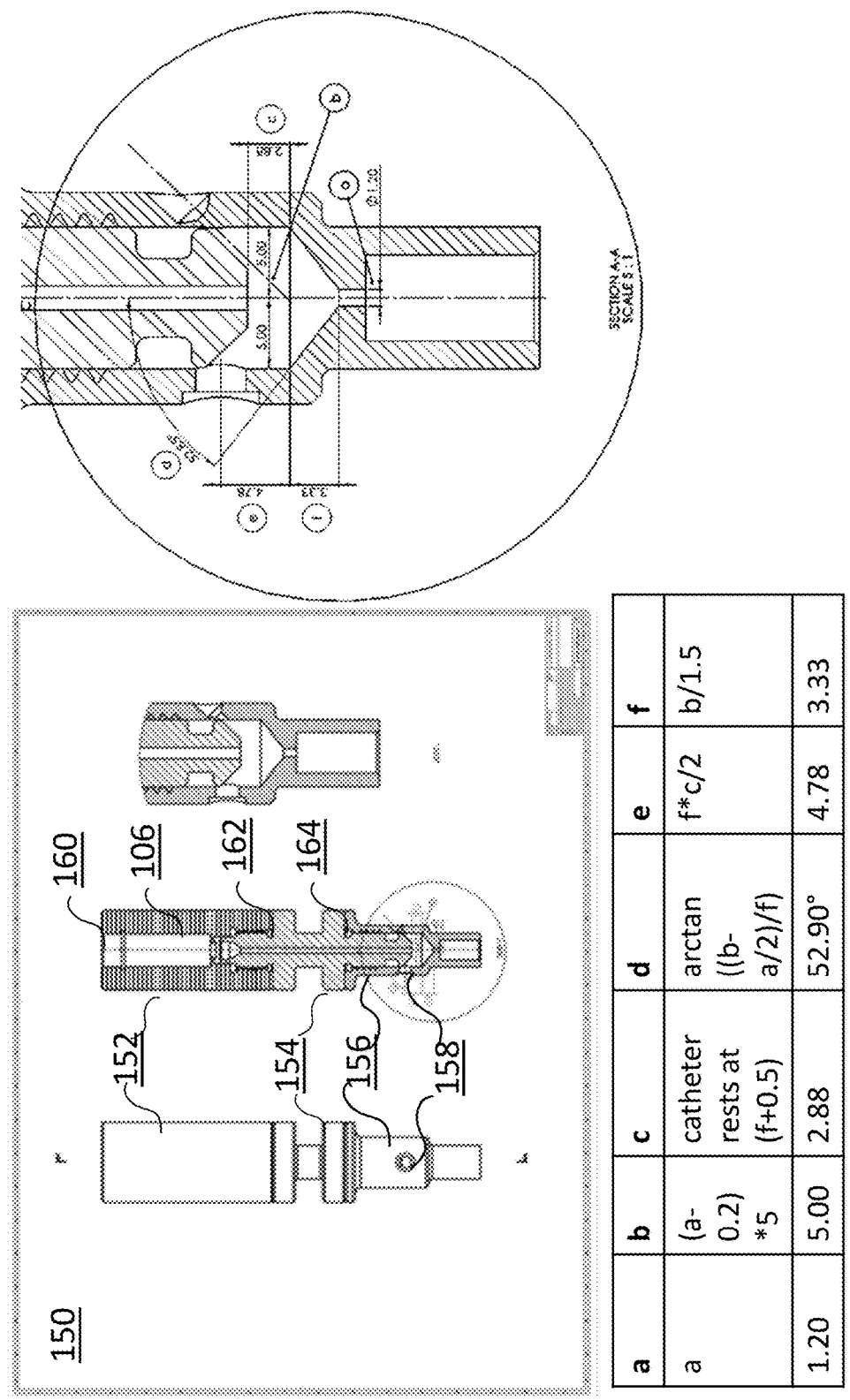
Figure 1B:
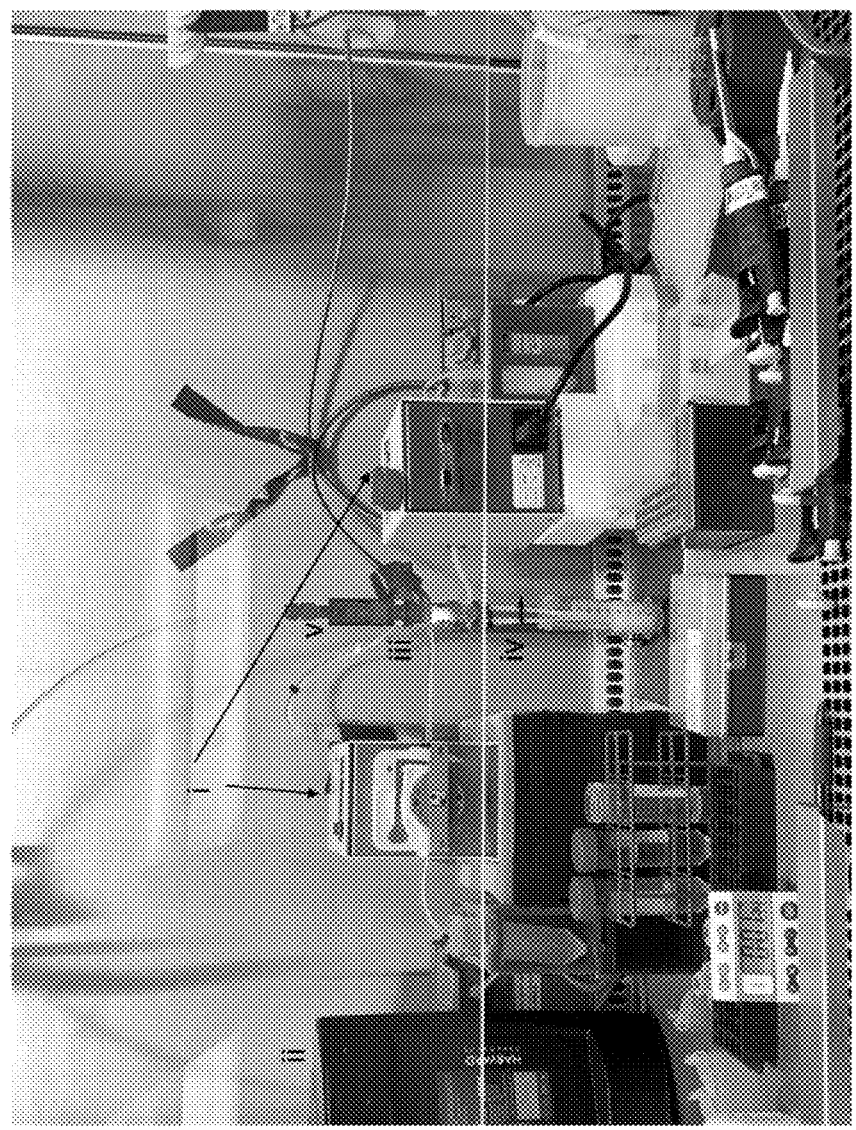
FIG. 1B. Photograph of conformal coating apparatus disclosed herein.

The modified conformal coating procedure set forth herein has enabled decoupling of the base polymer (10 kDa 8-arm 75% functionalized PEG-maleimide or PEG-vinyl sulfone) and the total amount of crosslinker (dithiothreitol and 2 kDa PEGdithiol) necessary to achieve PEG gelation (3 to 1 molar ratio of crosslinker to multi-arm PEG) into hydrogels from the aqueous phase containing cell clusters and further eliminates any need for viscosity-increasing additives in the aqueous phase (as illustrated herein by FIG. 1, 'Physiological pH method'). As disclosed herein, functional conformal coating of was achieved using an aqueous phase comprised by multi-arm PEG minimally crosslinked by adding 20% mol/mol of a necessary amount of crosslinker that achieved PEG gelation into hydrogels. Minimally crosslinked PEG (e.g., 1-30% crosslinking) has sufficient viscosity to allow aqueous phase jetting from a coaxial oil phase (made of polypropylene glycol (Mn~4000), PPG with 10% Span80 or surfactant having equivalent properties, particularly with regard to reducing interfacial tension) and break-up leading to formation of conformal coatings around cells and/or cell clusters. Full PEG crosslinking is achieved after cell and/or cell cluster coating downstream of aqueous phase jetting and break-up in the encapsulation chamber. This is now achieved by flowing a gelling emulsion of 1:15 (v:v) of 25 mg/mL DTT (Dithiothreitol) in HBSS−/−:PPG/ 10% Span80 downstream of the portion of the encapsulation chamber where jet break up occurs using an apparatus as shown in FIGS. 1, 1A and 1B. As set forth in the exemplification of the Prior Applications, aqueous phase pH needed to be maintained at acidic values, to prevent premature gelation of the water phase before coating, which occurred downstream of aqueous phase jetting and break-up in the encapsulation chamber. However, a low pH aqueous phase during encapsulation reduced functionality of coated primary islets (as illustrated herein by the Examples and particularly FIG. 2). Moreover, the aqueous phase as exemplified in the Prior Applications needed to contain PEG, a crosslinker and an additive (i.e., a viscosity-enhancing agent; alginate, amphiphilic self-assembling polymers or peptides, etc.) to achieve the necessary viscosity to allow aqueous phase jetting and break-up. Those additives reduced biocompatibility and immunoisolation of coating hydrogels in animal models, as shown in the Examples herein and FIGS. 2 and 3. Increasing the aqueous phase pH to near physiological values (~6-7.4) and eliminating any viscosity enhancers improved the functionality of the encapsulated islets and the coating biocompatibility, as shown herein in the Examples and FIGS. 4-8.

Therefore, in some embodiments, the disclosure provides a method of conformally coating a biomaterial with a coating material, comprising the steps of: (a) injecting an aqueous phase within a coaxial oil phase in a coating device configured to permit a transition from dripping to jetting and flow elongation of the aqueous phase within the oil phase; (b) adding the biomaterial and the coating material to the aqueous phase, wherein the coating material of said step (b) does not comprise a viscosity-enhancing agent; and wherein the aqueous phase is at a pH of about 6 to about 7.4; (c) allowing the aqueous phase jet to break up into particles; and (d) adding a component of the coating material downstream of breakup of the aqueous phase jet into particles, wherein the component is a gelling emulsion that promotes or catalyzes polymerization of the coating material; thereby resulting in conformally coated biomaterial. Examples of viscosity enhancing agents include, but are not limited to alginate, amphiphilic self-assembling polymers or peptides, etc.). In some embodiments, the viscosity enhancing agent that is excluded from the methods described herein is selected from polysaccharides, such as alginate, decellularized tissues, PEG-based nanomaterial assemblies, hyaluronic acid, chondroitin sulfate, dextran, dextran sulfate, heparin, heparin sulfate, heparan sulfate, chitosan, gella gum, xanthan gum, guar gum, water soluble cellulose derivatives, gelatin, collagen, and albumin.

In some embodiments, the method further comprises the step of collecting the outflow of the coating device (i.e., conformally coated biomaterial and any biomaterial-free coating material).

In some embodiments, the method further comprises the step of purifying the conformally coated biomaterial and the biomaterial-free coating material from said oil phase.

In some embodiments, the method further comprises the step of separating the conformally coated biomaterial from the biomaterial free coating material.

In some embodiments, purification of the conformally coated biomaterial and any biomaterial-free coating material from the oil phase comprises the step of (e) pouring the product from step (d) set forth in the method above into mineral oil while stirring the resultant mixture (i.e., the conformally coated biomaterial and any biomaterial-free coating material, oil phase, and gelling emulsion (comprising a solution of dithiothreitol (DTT) dissolved in Hanks' Balanced Salt Solution (HBSS) and emulsified in polypropylene glycol (PPG) with 10% sorbitan mono oleate (Span80) in mineral oil)).

In some embodiments, the purification of the conformally coated biomaterial and the biomaterial-free coating material from the oil phase comprises the step of (f) adding Hanks'

Balanced Salt Solution (HBSS) to the product resultant in step (e) (i.e., the conformally coated biomaterial and any biomaterial-free coating material, oil phase, gelling emulsion (comprising a solution of dithiothreitol (DTT) dissolved in Hanks' Balanced Salt Solution (HBSS) and emulsified in polypropylene glycol (PPG) with 10% sorbitan mono oleate (Span80) in mineral oil) coming out of the device, and mineral oil).

In some embodiments of the methods disclosed herein, the product from step (f) is centrifuged and washed with HBSS.

In some embodiments of the methods disclosed herein, after centrifugation and wash with Hanks' Balanced Salt Solution (HBSS), the coated biomaterial and any biomaterial-free coating material are incubated with a solution of PEGdithiol.

In some embodiments, the viscosity enhancing agent that is excluded from the methods described herein is selected from polysaccharides, such as alginate, decellularized tissues, PEG-based nanomaterial assemblies, hyaluronic acid, chondroitin sulfate, dextran, dextran sulfate, heparin, heparin sulfate, heparan sulfate, chitosan, gella gum, xanthan gum, guar gum, water soluble cellulose derivatives, gelatin, collagen, and albumin.

In some embodiments, the size of the biomaterial is smaller than the size of the orifice where the aqueous phase is injected into the oil phase.

The methods of this disclosure may be used to encapsulate any material that may benefit from immunoisolation when implanted into a subject. The material may be non-uniform in shape. In some embodiments, the material that may benefit from immunoisolation is a biomaterial. In some embodiments, the biomaterial comprises cells, cell clusters, biomaterial-coated cells or cell-clusters, subcellular organelles, biologic molecules, non-biologic drugs, or a combination thereof. In some embodiments, the methods of the invention are used to encapsulate one or more of cells, cell clusters, subcellular organelles, biologics such as proteins, nucleic acids and antibodies, and non-biologics (e.g., small molecules) such as drugs. In some embodiments, the biomaterial is cells. In some embodiments, the biomaterial is cell clusters. In some embodiments, the biomaterial is cells and cell clusters. In some embodiments, the biomaterial is subcellular organelles. In some embodiments, the biomaterial is protein. In some embodiments, the biomaterial is nucleic acids. In some embodiments, the biomaterial is antibodies. In some embodiments, the methods of this disclosure are used to encapsulate cells and/or cell clusters. In some embodiments, the methods of this disclosure are used to encapsulate pancreatic islet cells and cell clusters.

In certain embodiments, the conformally coated cells and cell clusters may comprise one or more of autologous, heterologous, syngeneic, allogeneic, or xenogeneic pancreatic islets, alone or in combination with other cell types (e.g., Sertoli cells, mesenchymal and bone marrow derived cells, endothelial progenitor cells, stem cells, regulatory T cells Treg, etc., each referred to generically as implant "helper cells") that provide growth factors and/or other beneficial agents for establishment, maintenance or expansion of the conformally coated cells, or otherwise to help the conformally coated cells deliver a therapeutic effect when implanted in a host. In some embodiments, the helper cells are mesenchymal stem cells.

As used herein, the term "host" refers to the recipient of implanted biomaterial and includes all animals. In some embodiments, the host is a mammal. In an exemplary embodiment, the host is human.

The methods of this disclosure may be used advantageously for conformal coating in cell therapy model systems. The conformally coated cells may deliver a therapeutic benefit, e.g., by expressing a therapeutic factor in vivo upon implantation. Examples of such cells include, but are not limited to, cells that produce: insulin to treat diabetes; dopamine to treat Parkinson's disease (Minquez-Castellanos et al., 2007, J Neurol Neurosurg Psychiatry 78:825-831); growth hormone to treat dwarfism (Chang et al., 1999, Trends Biotechnol 17:78-83); factor VIII and factor IX (Chang et al., 1999, Trends Biotechnol 17, 78-83) to treat hemophilia; and erythropoietin to treat anemia (Rinsch et al., 2002, Kidney Intern 62:1395-1401). Many more beneficial cell-produced factors or cellular/tissue activities may be imagined. In some embodiments, the conformally coated cells may express and/or deliver more than one therapeutic factor, or may comprise two or more cell types delivering one or more therapeutic factors. In some embodiments, the conformally coated cells also or alternatively express and/or deliver an antagonist, agonist, analog, derivative, chimera, fusion, or fragment of a therapeutic factor to deliver a therapeutic effect when implanted in a host.

In some embodiments, at least some of the conformally coated cells also or alternatively deliver a therapeutic effect without secreting a diffusible factor. In certain embodiments, the conformally coated cells provide an enzymatic activity that, for example, converts a substrate into a product having a beneficial effect, and/or metabolizes, sequesters, or absorbs a detrimental substance. In certain embodiments, the conformally coated cells deliver a therapeutic effect through a biological material-linked factor, such as a cell surface-linked factor.

In some embodiments, the conformally coated cells naturally deliver a therapeutic effect, without genetic modifications, upon implantation into a host. In some embodiments, the conformally coated cells are genetically engineered to deliver a therapeutic effect. As non-limiting examples, the cells may be transfected with expression vectors, or transduced with lentiviral vectors, that make the cells capable of expressing one or more therapeutic and/or helper cell factors. In another embodiment, the cells may comprise, consist of, or consist essentially of cells transfected with expression vectors that make the cells capable of expressing one or more therapeutic and/or helper cell factors. Such expression may be in a constitutive or in a regulated manner, e.g., in response to biological modulators in the bloodstream or tissues to which the cells are exposed.

In some embodiments, the cells for conformal coating are derived from cadaver tissue or from living tissue. In some embodiments, the cells are of non-mammalian or mammalian origin, non-human origin or human origin, self or non-self. The cells may be pluripotent, multipotent, totipotent, or differentiated embryonic or adult stem cells; primary differentiated cells; or immortalized cells, among other cell types. In certain embodiments, stem cells comprise, e.g., cells derived from cord blood, amniotic fluid, menstrual blood, placenta, Wharton's jelly, cytotrophoblasts, and the like. The cells may also comprise any combination of the above-listed cell types.

Exemplary therapeutic factors which may be delivered by the conformally coated cells include, but are not limited to, one or more of: insulin, glucagon, erythropoietin; Factor VIII; Factor IX; hemoglobin; albumin; neurotransmitters such as dopamine, gamma-aminobutyric acid (GABA), glutamic acid, serotonin, norepinephrine, epinephrine, and acetylcholine; growth factors such as nerve growth factor (NGF), brain-derived neurotrophic factor (BDNF), neurotrophin-3 (NT-3), neurotrophin 4/5 (NT-4/5), ciliary neurotrophic factor (CNTF), glial cell line-derived neurotrophic factor (GDNF), cholinergic differentiation factor/leukemia inhibitory factor (CDF/LIF), epidermal growth factor (EGF), insulin-like growth factor (IGF), fibroblast growth factor (FGF), and platelet-derived growth factor (PDGF); pain inhibitors such as Substance P, catecholamines, dynorphins, endorphins, or enkephalins; hormones such as parathyroid hormone or growth hormone; immunomodulators such as granulocyte-macrophage colony stimulating factor (GM-CSF); neuromodulators; lymphokines; cytokines; cofactors; antibodies; aptamers; and enzymes. Choice of one or more therapeutic factors and the concentrations at which they are produced and released from the cells are dictated by the needs of the patient being treated and may be readily determined empirically by the skilled practitioner.

In some embodiments, the conformally coated cells produce a therapeutic factor that has insulin-like or insulin-regulatory activity. In certain embodiments, the therapeutic factor is insulin. In certain embodiments, the therapeutic factor is a precursor form of insulin, such as preproinsulin or proinsulin. In certain embodiments, the therapeutic factor is an insulin chimeric or fusion protein.

In some embodiments, the therapeutic effect provided by the conformally coated cells comprises regulation of insulin levels in the blood. In certain embodiments, the therapeutic effect comprises regulation of glucose levels in the blood. In other embodiments, the therapeutic effect comprises regulation of levels of one or more other biological response regulators in the blood of the patient.

In some embodiments, the therapeutic factor(s) are released from the conformally coated cells due to the receipt of a stimulus or signal. For implanted cells, the stimulus or signal may be received from the host (e.g., changes in blood levels of glucose, hormones, metabolic signaling agents, chemical signaling molecules, etc.).

In some embodiments, the cells and/or cell clusters of this disclosure are generally uniform in size. In other embodiments, the cells and/or cell clusters of this disclosure are not uniform in size. In certain embodiments, the cells and/or cell clusters vary from about 10 µm to about 10000 µm in diameter; from about 25 µm to about 500 µm in diameter; or from about 40 µm to about 400 µm in diameter. In certain embodiments, the cells and/or cell clusters vary from 10 µm to 10000 µm in diameter; from 25 µm to 500 µm in diameter; or from 40 µm to 400 µm in diameter. In certain embodiments, the cells and/or cell clusters vary from about 10 µm to about 10000 µm in diameter. In certain embodiments, the cells and/or cell clusters vary from 10 µm to 10000 µm in diameter. In certain embodiments, the cells and/or cell clusters vary from about 25 µm to about 500 µm in diameter. In certain embodiments, the cells and/or cell clusters vary from 25 µm to 500 µm in diameter. In certain embodiments, the cells and/or cell clusters vary or from about 40 µm to about 400 µm in diameter. In certain embodiments, the cells and/or cell clusters vary or from 40 µm to 400 µm in diameter. In a particular embodiment, the cells and/or cell clusters vary from about 50 to about 300 µm in diameter. In a particular embodiment, the cells and/or cell clusters vary from 50 to 300 µm in diameter. In certain embodiments, islet cells and/or cell clusters vary from about 10 µm to about 10000 µm in diameter. In certain embodiments, islet cells and/or cell clusters vary from 10 µm to 10000 µm in diameter. In certain embodiments, islet cells and/or cell clusters vary from about 25 µm to about 500 µm in diameter. In certain embodiments, islet cells and/or cell clusters vary from 25 µm to 500 µm in diameter. In certain embodiments, islet cells and/or cell clusters vary or from about 40 µm to about 400 µm in diameter. In certain embodiments, islet cells and/or cell clusters vary or from 40 µm to 400 µm in diameter. In a particular embodiment, islet cells and/or cell clusters vary from about 50 to about 300 µm in diameter. In some embodiments, islet cells and/or cell clusters that vary from about 50 to about 300 µm in diameter comprise islet cells. In some embodiments, the cells and/or cell clusters that vary from 50 to 300 µm in diameter comprise islet cells.

In some embodiments, the cells and/or cell clusters are greater than about 40, 50, 60, 70, 80, 90, 100, 150, 200, 250, 300, 350, 400, 450, 500, 550, 600, 650, 700, 750, 800, 850, 900, 950, or 1000 µm in diameter. In some embodiments, the cells and/or cell clusters have a diameter greater than about 40 µm. In certain embodiments, the cells and/or cell clusters have a diameter greater than about 50 µm. In certain embodiments, the cells and/or cell clusters have a diameter greater than about 60 µm. In certain embodiments, the cells and/or cell clusters have a diameter greater than about 70 µm. In certain embodiments, the cells and/or cell clusters have a diameter greater than about 80 µm. In certain embodiments, the cells and/or cell clusters have a diameter greater than about 90 µm. In certain embodiments, the cells and/or cell clusters have a diameter greater than about 100 µm. In certain embodiments, the cells and/or cell clusters have a diameter greater than about 150 µm. In certain embodiments, the cells and/or cell clusters have a diameter greater than about 200 µm. In certain embodiments, the cells and/or cell clusters have a diameter greater than about 250 µm. In certain embodiments, the cells and/or cell clusters have a diameter greater than about 300 µm. In certain embodiments, the cells and/or cell clusters have a diameter greater than about 350 µm. In certain embodiments, the cells and/or cell clusters have a diameter greater than about 400 µm. In certain embodiments, the cells and/or cell clusters have a diameter greater than about 450 µm. In certain embodiments, the cells and/or cell clusters have a diameter greater than about 500 µm. In certain embodiments, the cells and/or cell clusters have a diameter greater than about 550 µm. In certain embodiments, the cells and/or cell clusters have a diameter greater than about 600 µm. In certain embodiments, the cells and/or cell clusters have a diameter greater than about 650 µm. In certain embodiments, the cells and/or cell clusters have a diameter greater than about 700 µm. In certain embodiments, the cells and/or cell clusters have a diameter greater than about 750 µm. In certain embodiments, the cells and/or cell clusters have a diameter greater than about 800 µm. In certain embodiments, the cells and/or cell clusters have a diameter greater than about 850 µm. In certain embodiments, the cells and/or cell clusters have a diameter greater than about 900 µm. In certain embodiments, the cells and/or cell clusters have a diameter greater than 950 µm. In some embodiments, the cells and/or cell clusters have a diameter up to about 1000 µm.

In some embodiments, the cells and/or cell clusters are greater than 40, 50, 60, 70, 80, 90, 100, 150, 200, 250, 300, 350, 400, 450, 500, 550, 600, 650, 700, 750, 800, 850, 900, 950, or 1000 µm in diameter. In some embodiments, the cells and/or cell clusters have a diameter greater than 40 µm. In certain embodiments, the cells and/or cell clusters have a diameter greater than 50 µm. In certain embodiments, the cells and/or cell clusters have a diameter greater than 60 µm. In certain embodiments, the cells and/or cell clusters have a diameter greater than 70 µm. In certain embodiments, the cells and/or cell clusters have a diameter greater than 80 µm. In certain embodiments, the cells and/or cell clusters have a diameter greater than 90 µm. In certain embodiments, the cells and/or cell clusters have a diameter greater than 100 µm. In certain embodiments, the cells and/or cell clusters have a diameter greater than 150 µm. In certain embodiments, the cells and/or cell clusters have a diameter greater than 200 µm. In certain embodiments, the cells and/or cell clusters have a diameter greater than 250 µm. In certain embodiments, the cells and/or cell clusters have a diameter greater than 300 µm. In certain embodiments, the cells and/or cell clusters have a diameter greater than 350 µm. In certain embodiments, the cells and/or cell clusters have a diameter greater than 400 µm. In certain embodiments, the cells and/or cell clusters have a diameter greater than 450 µm. In certain embodiments, the cells and/or cell clusters have a diameter greater than 500 µm. In certain embodiments, the cells and/or cell clusters have a diameter greater than 550 µm. In certain embodiments, the cells and/or cell clusters have a diameter greater than 600 µm. In certain embodiments, the cells and/or cell clusters have a diameter greater than 650 µm. In certain embodiments, the cells and/or cell clusters have a diameter greater than 700 µm. In certain embodiments, the cells and/or cell clusters have a diameter greater than 750 µm. In certain embodiments, the cells and/or cell clusters have a diameter greater than 800 µm. In certain embodiments, the cells and/or cell clusters have a diameter greater than 850 µm. In certain embodiments, the cells and/or cell clusters have a diameter greater than 900 µm. In certain embodiments, the cells and/or cell clusters have a diameter greater than 950 µm. In some embodiments, the cells and/or cell clusters have a diameter up to 1000 µm.

In certain embodiments, the cells and/or cell clusters have a diameter of about 40 µm. In certain embodiments, the cells and/or cell clusters have a diameter of about 50 µm. In certain embodiments, the cells and/or cell clusters have a diameter of about 60 µm. In certain embodiments, the cells and/or cell clusters have a diameter of about 70 µm. In certain embodiments, the cells and/or cell clusters have a diameter of about 80 µm. In certain embodiments, the cells and/or cell clusters have a diameter of about 90 µm. In certain embodiments, the cells and/or cell clusters have a diameter of about 100 µm. In certain embodiments, the cells and/or cell clusters have a diameter of about 150 µm. In certain embodiments, the cells and/or cell clusters have a diameter of about 200 µm. In certain embodiments, the cells and/or cell clusters have a diameter of about 250 µm. In certain embodiments, the cells and/or cell clusters have a diameter of about 300 µm. In certain embodiments, the cells and/or cell clusters have a diameter of about 350 µm. In certain embodiments, the cells and/or cell clusters have a diameter of about 400 µm. In certain embodiments, the cells and/or cell clusters have a diameter of about 450 µm. In certain embodiments, the cells and/or cell clusters have a diameter of about 500 µm. In certain embodiments, the cells and/or cell clusters have a diameter of about 550 µm. In certain embodiments, the cells and/or cell clusters have a diameter of about 600 µm. In certain embodiments, the cells and/or cell clusters have a diameter of about 650 µm. In certain embodiments, the cells and/or cell clusters have a diameter of about 700 µm. In certain embodiments, the cells and/or cell clusters have a diameter of about 750 µm. In certain embodiments, the cells and/or cell clusters have a diameter of about 800 µm. In certain embodiments, the cells and/or cell clusters have a diameter of about 850 µm. In certain embodiments, the cells and/or cell clusters have a diameter of about 900 µm. In certain embodiments, the cells and/or cell clusters have a diameter of about 950 µm. In some embodiments, the cells and/or cell clusters have a diameter of about 1000 µm.

The coating material used in the conformal coating methods of this disclosure are biocompatible and is mechanically and chemically stable. Further, materials useful for conformal coating do not interfere, or do not interfere substantially, with the function of the encapsulated biomaterial, and reduce, minimize or eliminate an immune response when the encapsulated biomaterial is implanted in a host. In certain embodiments, the coating material can be polymerized by internal gelation. In certain embodiments, the material used in the conformal coating methods of this disclosure is biodegradable.

In some embodiments the coating material comprises polyethylene glycol (PEG), polyethylene oxide (PEO), poly(N-vinyl pyrrolidinone) (PVP), polyethyl oxazoline, polyvinyl alcohol (PVA), polythyloxazoline (PEOX), poly(amino acids), derivative thereof or combination thereof. In some embodiments, the coating material comprises polyethylene glycol (PEG), PEG-maleimide, PEG-acrylate, PEG-vinyl sulfone, or combinations thereof.

In some embodiments, the coating material comprises polyethylene glycol (PEG), PEG-maleimide, PEG-acrylate, or PEG-vinyl sulfone. In some embodiments, the coating material comprises polyethylene glycol (PEG). In some embodiments, the coating material comprises PEG-maleimide. In some embodiments, the coating material comprises PEG-acrylate. In some embodiments, the coating material comprises PEG-vinyl sulfone.

In some embodiments the coating material is selected from polyethylene glycol (PEG), polyethylene oxide (PEO), poly(N-vinyl pyrrolidinone) (PVP), polyethyl oxazoline, polyvinyl alcohol (PVA), polythyloxazoline (PEOX), poly(amino acids), derivative thereof and combination thereof. In some embodiments, the coating material is polyethylene glycol (PEG), PEG-maleimide, PEG-acrylate, PEG-vinyl sulfone, or combinations thereof. In some embodiments, the coating material is polyethylene glycol (PEG), PEG-maleimide, PEG-acrylate, or PEG-vinyl sulfone. In some embodiments, the coating material is polyethylene glycol (PEG). In some embodiments, the coating material is PEG-maleimide. In some embodiments, the coating material is PEG-acrylate. In some embodiments, the coating material is PEG-vinyl sulfone.

In some embodiments, the coating material comprises one or more of polyethylene glycol (PEG), polyethylene oxide (PEO), poly(N-vinyl pyrrolidinone) (PVP), polyethyl oxazoline, polyvinyl alcohol (PVA), polythyloxazoline (PEOX), and/or poly(amino acids).

In certain embodiments, the coating material is mono-armed. In certain embodiments, the coating material is multi-armed. In certain embodiments, the coating material is a mix of mono-armed and multi-armed material. In some embodiments, the aqueous phase comprises multi-arm polyethylene glycol (PEG) minimally crosslinked (5-50%) with PEGdiThiol. In some embodiments, the coating material comprises a multi-arm polyethylene glycol (PEG) minimally crosslinked (1-30%) with PEGdiThiol. In some embodiments, the coating material comprises 5-10% PEG. In some embodiments, the aqueous phase comprises serum-free media at pH 6-7.4; or Hanks' Balanced Salt Solution (HBSS) at pH 6-7.4; specifically, the pH of the aqueous phase is provided at pH 6-7.4. In some embodiments, the water phase is at a pH of about 6 to about 7.4. In some embodiments, the water phase is at a pH of 6 to 7.4.

In some embodiments, the coating material comprises a minimally crosslinked PEG-MAL. In some embodiments, the coating material comprises PEG-MAL (10 kDa, 8 arm, 75% functionalized) admixed with PEG-SH. In some embodiments, the coating material comprises PEG-MAL (10 kDa, 8 arm, 75% functionalized), and PEG-SH. In some embodiments, the coating material comprises PEG-MAL (10 kDa, 8 arm, 75% functionalized), PEG-SH and HBSS. In some embodiments, the coating material comprises 12.5% w/v PEG-MAL (10 kDa, 8 arm, 75% functionalized) admixed with 10×PEG-SH. In some embodiments, the coating material comprises 12.5% w/v PEG-MAL (10 kDa, 8 arm, 75% functionalized), and PEG-SH. In some embodiments, the coating material comprises 12.5% w/v PEG-MAL (10 kDa, 8 arm, 75% functionalized), PEG-SH and HBSS.

In some embodiments, the aqueous phase comprises a thiolated reagent, a reducing reagent, a surfactant, or a combination thereof. In some embodiments, the aqueous phase used in the practice of the methods of this disclosure can optionally comprise one or more of a thiolated reagent, reducing reagent and/or a surfactant. In certain embodiments, the surfactant is polyoxyethylene-polyoxypropylene block copolymer or poly(ethylene glycol-bl-propylene sulfide), more particularly 2% polyoxyethylene-polyoxypropylene block copolymer. In some embodiments, the thiolated or reducing reagent is dithiothreitol (DTT) or PEGdiThiol. In some embodiments, the thiolated or reducing reagent in the water phase is 0.01-0.62% dithiothreitol (DTT).

In some embodiments, the gelling emulsion comprises a crosslinker dissolved in Hanks' Balanced Salt Solution (HBSS) an emulsified in an oil having a viscosity of 1,300 cP. In some embodiments, the gelling emulsion comprises DTT, Hanks' Balanced Salt Solution (HBSS) and polypropylene glycol (PPG). In some embodiments, the gelling emulsion comprises dithiothreitol (DTT), Hanks' Balanced Salt Solution (HBSS), polypropylene glycol (PPG) and sorbitan mono oleate (Span80). In some embodiments, the gelling emulsion comprises dithiothreitol (DTT) dissolved in Hanks' Balanced Salt Solution (HBSS) and emulsified in polypropylene glycol (PPG) with sorbitan mono oleate (Span80). In some embodiments, the gelling emulsion comprises dithiothreitol (DTT) dissolved in Hanks' Balanced Salt Solution (HBSS) and emulsified in polypropylene glycol (PPG) with 10% sorbitan mono oleate (Span80).

In some embodiments, the conformal coating has permeability characteristics that permit exchange of nutrients and cellular by-products and release of therapeutic factors, but that may also preclude host immune effector molecules and/or other undesired elements from entering the capsules. In certain embodiments, the conformal coating comprises pores with a cut-off size of 100, 110, 120, 130, 140, 145, 150, 155, 160, 170, 180, 190, 200, 210, 220, 230, 240, 250 or 500 kDa. In certain embodiments, the conformal coating comprises pores with a cut-off size of 150 kDa. In certain embodiments, the conformal coating comprises pores with a cut-off size of up to 500 kDa.

The thickness of the conformal coating does not depend on the size/diameter of the coated material. In some embodiments, the thickness of the coating ranges from 1 μm to 100 μm, from 5 μm to 50 μm, or from 8 μm to 25 μm. In some embodiments, the thickness of the coating ranges from 25-50 μm. In some embodiments, the thickness of the coating ranges from 10-20 μm.

In some embodiments, the coating is visualized by labeling the coating material with a detectable marker. The marker may be, e.g., a fluorescent, enzymatic, chemiluminescent, or epitopic label. In certain embodiments, the coating may be visualized by entrapping high molecular weight FITC dextran within the coating material. In a particular embodiment, the labeled coating material is PEG-FITC.

In some embodiments, the coating material may be chemically altered to contain functional groups. In some embodiments, the functional groups help stabilize the coating. Further, the coating material may comprise therapeutic factors or other molecules that associate with such therapeutic factors, such as receptors or affinity agents (see, e.g., Kim et al., 2003, Biomacromolecules 4:1214-1223). Therapeutic factors may be incorporated into the coating material via covalent cross-linking, emulsification, ionic interactions, specific affinity interactions, simple entrapment, or any combination thereof.

In certain embodiments, the coating material comprises anti-inflammatory molecules to reduce the host inflammatory response upon implantation of the conformally coated cells. Exemplary anti-inflammatory agents include corticosteroids (dexamethasone, cortisol, prednisolone, loteprednol etabonate, fluocinolone acetonide, and others), calcineurin inhibitors (Cyclosporin A) interleukin-1 (IL-1), interleukin-10 (IL-10), alpha 1-antitrypsin (AAT), lisofylline, pentoxyfylline, COX-2 inhibitors, interleukin-1 receptor antagonist peptide (IRAP), interleukin-10 (IL-10), alpha 1-antitrypsin (AAT), TGF-beta; antibodies to IL-1, interferon-gamma, and TNF-alpha; anti-tissue factor, and complement inhibitors; antibodies against leukocyte integrins (LFA-1 and ICAM-1). In some embodiments, the coating material comprises extracellular matrix (ECM) molecules such as collagen type I or IV, laminin, fibronectin, hyaluronic acid, or arginine-glycine-aspartate peptides (Beck et al., 2007, Tissue Eng 13(3):1-11). In some embodiments, the anti-inflammatory and/or ECM molecules are tethered to the surface of the coating material. In certain embodiments, the molecules are coated or encapsulated for slow release.

Conformal coating of the biomaterial takes place in a coating device. As used herein, the term "coating device" refers to any device that is capable of conformally coating a biomaterial. In some embodiments, the coating device is a device that allows for a transition from dripping to jetting and elongation of an aqueous phase within a non-miscible (e.g., oil) phase, wherein the aqueous phase undergoes jet breakup into particles. In some embodiments, the coating device is a flow chamber comprising one or more oil phase inlets, one or more aqueous phase inlets (which may be the same as or different from the oil phase inlets), and one or more flow focusing regions downstream of the inlets where co-flowing jets of the oil phase focus the aqueous phase. The flow chamber may further comprise one or more channels downstream of the flow focusing region(s). The diameter of the aqueous phase channel(s) may be, e.g., 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or 4 mm in diameter. The diameter of the oil phase channel(s) may be, e.g., 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 mm in diameter. In certain embodiments, the diameter of the oil phase channel(s) may be up to 100 mm. The length of the channel(s) may be, e.g., 5, 6, 7, 8, 9, 10, 11, 12, 13, 14, 15 or 30 mm. The channels may lead to one or more outlets from the flow chamber. In particular embodiments, the device or apparatus is configured as set forth in the Examples and illustrated in FIG. 1, 1A, or 1B.

In some embodiments, a coating system is provided, including a first pump 102, a conformal coating device 104 connected to the first pump 102, a catheter 106 positioned within the conformal coating device 104, a second pump 108 configured to contact an oil phase reservoir 110 (e.g., PPG) on the suction side and connected to the conforming coating device 104 on the discharge side, a third pump 112 configured to contact the emulsion reservoir 114 on the suction side and connected to the conformal coating device 104 on the discharge side, a capillary 116 on the downstream side of the conformal coating device 104 and a collection beaker 118, as shown in FIG. 1A.

The first pump 102 may be configured to inject a coating material and a biomaterial in an aqueous phase to be coated to the first inlet on an inner part of the housing portion. In some aspects, the first pump 102 is selected from a glass syringe pump, a peristaltic pump, or any other pump configured to inject the material. A conformal coating device 104 is connected to the first pump 102 on the upstream side and connected to the capillary 116 on the downstream side and may be configured to conformally coat the biomaterial with the coating material.

The catheter 106 may be positioned within the conformal coating device 104 and connected to a precision flow syringe pump 102. The catheter 106 may be configured to inject a coating material and the biomaterial to be coated to a first inlet 160 on the housing portion 152 of the encapsulation chamber (internal phase), as shown in FIG. 1A(v). The housing portion 152 may be coupled to an attachment portion 154 at a second end 162 on the housing portion 152, which is them coupled to a coating portion 156 at a second end of the attachment portion 154, as shown in FIG. 1A(v). In some aspects of this embodiment, the second end 162 of the housing portion 152 is opposite to the first end 160 of the housing portion 152, as shown in FIG. 1A(v). In some aspects of the coating portion 156 is configured to engage with an exterior surface of a second end 164 of the attachment portion 154, as shown in FIG. 1A(v).

The second pump 108 is connected to the PPG reservoir 110 on the suction side and connected on the discharge side to the second inlet 158 of the coating portion 156 of the conformal coating device 104, and is configured to inject an oil phase containing surfactant to the second inlet 158, as shown in FIG. 1A. The injection of the oil phase (external phase) may be configured to flow coaxially to the internal aqueous phase. In some embodiments, the second pump 108 is a peristaltic pump, a roller pump, a glass syringe pump, or any other pump configured to inject the oil phase material.

The encapsulation chamber includes the housing portion 152 coupled to the attachment portion 154, which is coupled to the coating portion 156, as shown in FIG. 1A, Panel (v).

In some embodiments, the conformal coating device further comprises an outlet to release air from the device. In some embodiments, the coating portion may further comprise an outlet to release air from the device. In some embodiments, the outlet to release air is positioned upstream of the water phase inlet into the device. The air release outlet is closed during the coating process.

In some embodiments, the device provides flow focusing from a channel of 10$d$ to a channel of d (1/10 restriction in diameter to allow transition from dripping to jetting). In certain embodiments, d ranges from 0.5-10 mm. In certain embodiments, d ranges from 1-4 mm. In a particular embodiment, d is around 1 mm. In some embodiments, the focusing angle of the device ranges from 100 to 5 degrees (more to less focusing). In certain embodiments, the focusing angle ranges from 90 to 10 degrees. In certain embodiments, the focusing angle is greater than 10, 20, 30, 40, 50, 55, 60, 65, 70, 80, or 90 degrees. In certain embodiments, the focusing angle of the device is about 60 degrees. In some embodiments, the flow focusing region is 50, 60, 70, 80, 90, 100, 110, 120, 130, 140, or 150 mm long. In certain embodiments, the flow focusing region is 100 mm long.

In some embodiments, the diameter of the external oil phase chamber (cylinder) is 1-20 mm. In some embodiments, the diameter of the external oil phase chamber is 5, 6, 7, 8, 9, 10, 11, 12, 13, 14, or 15 mm. In a particular embodiment, the diameter of the external oil phase chamber is 10 mm. In some embodiments, the external oil phase chamber is fed by a lateral port 1, 2, 3, 4, 5, 6, 7, 8, 9, or 10 mm upstream (cylinder axial distance) of the coaxial injection port for the aqueous phase. In certain embodiments, the lateral port is 5 mm upstream of the aqueous phase injection port. In certain embodiments, the external oil phase chamber is fed by more than one lateral port 1, 2, 3, 4, 5, 6, 7, 8, 9, or 10 mm upstream (cylinder axial distance) of the coaxial injection port for the aqueous phase.

In some embodiments, the tip of the water injection needle co-localizes with the base of the focusing region of the device. In some embodiments, the tip of the water injection needle is positioned about 0, 0.1, 0.2, 0.3, 0.4, 0.5, 0.6, 0.7, 0.8, 0.9, 1, 2, 3, 4, or 5 mm upstream or downstream (cylinder axial distance) of the base of the focusing region of the device. In a particular embodiment, the tip of the water injection needle is positioned about 0.5 mm upstream of the focusing region.

In a particular embodiment, the device is characterized by an external oil phase chamber 10 mm in diameter, fed by a lateral port 5 mm upstream of the coaxial injection port for the aqueous phase, which is 0.5 mm upstream of the flow focusing region, and flow focusing occurs in a channel that constricts from 10 mm to 1 mm in diameter and is 100 mm in length, with a focusing angle of 60 degrees.

In particular embodiments, the device is configured to permit coaxial flow of a solution comprising a gelling agent, particularly a dithiothreitol solution in Hanks' Balanced Salt Solution (HBSS) (10, 20, 25, 30, 40, 50, 60, 70, 80, 90, or 100 mg/mL dithiothreitol) emulsified in polypropylene glycol (PPG) at a volume to volume ratio of 1:2, 1:3, 1:4, 1:5, 1:10, 1:15, 1:20: 1:25, 1:50, or 1:100, localized at a position after formation of coated biomaterials.

In some embodiments, the device is able to coat cells and/or cell clusters of greater than 40, 50, 60, 70, 80, 90, 100, 150, 200, 250, 300, 350, 400, 450, 500, 550, 600, 650, 700, 750, 800, 850, 900, 950, or 1000 µm in diameter. In certain embodiments, the device is able to coat cells and/or cell clusters of greater than 40 µm in diameter. In certain embodiments, the device is able to coat cells and/or cell clusters of greater than 50 µm in diameter. In certain embodiments, the device is able to coat cells and/or cell clusters of greater than 60 µm in diameter. In certain embodiments, the device is able to coat cells and/or cell clusters of greater than 70 µm in diameter. In certain embodiments, the device is able to coat cells and/or cell clusters of greater than 80 µm in diameter. In certain embodiments, the device is able to coat cells and/or cell clusters of greater than 90 µm in diameter. In certain embodiments, the device is able to coat cells and/or cell clusters of greater than 100 µm in diameter. In certain embodiments, the device is able to coat cells and/or cell clusters of greater than 150 µm in diameter. In certain embodiments, the device is able to coat cells and/or cell clusters of greater than 200 µm in diameter. In certain embodiments, the device is able to coat cells and/or cell clusters of greater than 250 µm in diameter. In certain embodiments, the device is able to coat cells and/or cell clusters of greater than 300 µm in diameter. In certain embodiments, the device is able to coat cells and/or cell clusters of greater than 350 µm in diameter. In certain embodiments, the device is able to coat cells and/or cell clusters of greater than 400 µm in diameter. In certain embodiments, the device is able to coat cells and/or cell clusters of greater than 450 µm in diameter. In certain embodiments, the device is able to coat cells and/or cell clusters of greater than 500 µm in diameter. In certain embodiments, the device is able to coat cells and/or cell clusters of greater than 550 µm in diameter. In certain embodiments, the device is able to coat cells and/or cell clusters of greater than 600 µm in diameter. In certain embodiments, the device is able to coat cells and/or cell clusters of greater than 650 µm in diameter. In certain embodiments, the device is able to coat cells and/or cell clusters of greater than 700 µm in diameter. In certain embodiments, the device is able to coat cells and/or cell clusters of greater than 750 µm in diameter. In certain embodiments, the device is able to coat cells and/or cell clusters of greater than 800 µm in diameter. In certain embodiments, the device is able to coat cells and/or cell clusters of greater than 850 µm in diameter. In certain embodiments, the device is able to coat cells and/or cell clusters of greater than 900 µm in diameter. In certain embodiments, the device is able to coat cells and/or cell clusters of greater than 950 µm in diameter. In some embodiments, the device is able to coat cells and/or cell clusters of up to 1000 µm in diameter.

In certain embodiments, the device is able to coat cells and/or cell clusters having a diameter of about 40 µm. In certain embodiments, the device is able to coat cells and/or cell clusters having a diameter of about 50 µm. In certain embodiments, the device is able to coat cells and/or cell clusters having a diameter of about 60 µm. In certain embodiments, the device is able to coat cells and/or cell clusters having a diameter of about 70 µm. In certain embodiments, the device is able to coat cells and/or cell clusters having a diameter of about 80 µm. In certain embodiments, the device is able to coat cells and/or cell clusters having a diameter of about 90 µm. In certain embodiments, the device is able to coat cells and/or cell clusters having a diameter of about 100 µm. In certain embodiments, the device is able to coat cells and/or cell clusters having a diameter of about 150 µm. In certain embodiments, the device is able to coat cells and/or cell clusters having a diameter of about 200 µm. In certain embodiments, the device is able to coat cells and/or cell clusters having a diameter of about 250 µm. In certain embodiments, the device is able to coat cells and/or cell clusters having a diameter of about 300 µm. In certain embodiments, the device is able to coat cells and/or cell clusters having a diameter of about 350 µm. In certain embodiments, the device is able to coat cells and/or cell clusters having a diameter of about 400 µm. In certain embodiments, the device is able to coat cells and/or cell clusters having a diameter of about 450 µm. In certain embodiments, the device is able to coat cells and/or cell clusters having a diameter of about 500 µm. In certain embodiments, the device is able to coat cells and/or cell clusters having a diameter of about 550 µm. In certain embodiments, the device is able to coat cells and/or cell clusters having a diameter of about 600 µm. In certain embodiments, the device is able to coat cells and/or cell clusters having a diameter of about 650 µm. In certain embodiments, the device is able to coat cells and/or cell clusters having a diameter of about 700 µm. In certain embodiments, the device is able to coat cells and/or cell clusters having a diameter of about 750 µm. In certain embodiments, the device is able to coat cells and/or cell clusters having a diameter of about 800 µm. In certain embodiments, the device is able to coat cells and/or cell clusters having a diameter of about 850 µm. In certain embodiments, the device is able to coat cells and/or cell clusters having a diameter of about 900 µm. In certain embodiments, the device is able to coat cells and/or cell clusters having a diameter of about 950 µm. In some embodiments, the device is able to coat cells and/or cell clusters of up to 1000 µm in diameter.

In some embodiments, the aqueous phase flow, the oil phase flow, or both, are maintained by a peristaltic pump. In some embodiments, the aqueous phase flow, the oil phase flow, or both, are maintained by a syringe pump. In some embodiments, the aqueous phase flow is maintained by a syringe pump and the oil phase flow is maintained by a peristaltic pump. In certain embodiments, the dithiothreitol solution was introduced coaxially to the conformally coated biomaterials using a syringe pump or a peristaltic pump.

While the metrics for a specific device using a 16G intravenous catheter for coating 50-250 µm cell clusters are provided herein, it should be understood that other devices having different configurations and sizes are also contemplated to the extent that the relative metrics set forth in FIG. 1A, Panel (v) are maintained.

In some embodiments in which cells and/or cell clusters are the biomaterial to be conformally coated, the concentration of cells added to the aqueous phase may range from 100-500,000,000 cells/mL, 100-200,000,000 cells/mL, 1,000,000-200,000,000 cells/mL, 5,000,000-200,000,000 cells/mL, 10,000,000-200,000,000 cells/mL, 15,000,000-200,000,000 cells/mL, 20,000,000-200,000,000 cells/mL, 25,000,000-200,000,000 cells/mL, 30,000,000-200,000,000 cells/mL, 35,000,000-200,000,000 cells/mL, 40,000,000-200,000,000 cells/mL, 45,000,000-200,000,000 cells/mL, 50,000,000-200,000,000 cells/mL, 55,000,000-200,000,000 cells/mL, 60,000,000-200,000,000 cells/mL, 65,000,000-200,000,000 cells/mL, 70,000,000-200,000,000 cells/mL, 75,000,000-200,000,000 cells/mL, 80,000,000-200,000,000 cells/mL, 85,000,000-200,000,000 cells/mL, 90,000,000-200,000,000 cells/mL, 95,000,000-200,000,000 cells/mL, 100,000,000-200,000,000 cells/mL, 105,000,000-200,000,000 cells/mL, 110,000,000-200,000,000 cells/mL, 115,000,000-200,000,000 cells/mL, 120,000,000-200,000,000 cells/mL, 125,000,000-200,000,000 cells/mL, 130,000,000-200,000,000 cells/mL, 135,000,000-200,000,000 cells/mL, 140,000,000-200,000,000 cells/mL, 145,000,000-200,000,000 cells/mL, 150,000,000-200,000,000 cells/mL, 155,000,000-200,000,000 cells/mL, 160,000,000-200,000,000 cells/mL, 165,000,000-200,000,000 cells/mL, 170,000,000-200,000,000 cells/mL, 175,000,000-200,000,000 cells/mL, 180,000,000-200,000,000 cells/mL, 185,000,000-200,000,000 cells/mL, 190,000,000-200,000,000 cells/mL, 195,000,000-200,000,000 cells/mL, 100-1,000,000 cells/mL, 500-750,000 cells/mL, 1,000-500,000 cells/mL, or 2,500-250,000 cells/mL.

In some embodiments in which cells and/or cell clusters are the biomaterial to be conformally coated, the concentration of cells/cell clusters added to the aqueous phase may range from about 100-about 500,000,000 cells/mL, about 100-about 200,000,000 cells/mL, about 1,000,000-about 200,000,000 cells/mL, about 5,000,000-about 200,000,000 cells/mL, about 10,000,000-about 200,000,000 cells/mL, about 15,000,000-about 200,000,000 cells/mL, about 20,000,000-about 200,000,000 cells/mL, about 25,000,000-about 200,000,000 cells/mL, about 30,000,000-about 200,000,000 cells/mL, about 35,000,000-about 200,000,000 cells/mL, about 40,000,000-about 200,000,000 cells/mL, about 45,000,000-about 200,000,000 cells/mL, about 50,000,000-about 200,000,000 cells/mL, about 55,000,000-about 200,000,000 cells/mL, about 60,000,000-about 200,000,000 cells/mL, about 65,000,000-about 200,000,000 cells/mL, about 70,000,000-about 200,000,000 cells/mL, about 75,000,000-about 200,000,000 cells/mL, about 80,000,000-about 200,000,000 cells/mL, about 85,000,000-about 200,000,000 cells/mL, about 90,000,000-about 200,000,000 cells/mL, about 95,000,000-about 200,000,000 cells/mL, about 100,000,000-about 200,000,000 cells/mL, about 105,000,000-about 200,000,000 cells/mL, about 110,000,000-about 200,000,000 cells/mL, about 115,000,000-about 200,000,000 cells/mL, about 120,000,000-about 200,000,000 cells/mL, about 125,000,000-about 200,000,000 cells/mL, about 130,000,000-about 200,000,000 cells/mL, about 135,000,000-about 200,000,000 cells/mL, about 140,000,000-about 200,000,000 cells/mL, about 145,000,000-about 200,000,000 cells/mL, about 150,000,000-about 200,000,000 cells/mL, about 155,000,000-about 200,000,000 cells/mL, about 160,000,000-about 200,000,000 cells/mL, about 165,000,000-about 200,000,000 cells/mL, about 170,000,000-about 200,000,000 cells/mL, about 175,000,000-about 200,000,000 cells/mL, about 180,000,000-about 200,000,000 cells/mL, about 185,000,000-about 200,000,000 cells/mL, about 190,000,000-about 200,000,000 cells/mL, about 195,000,000-about 200,000,000 cells/mL, about 100-about 1,000,000 cells/mL, about 500-about 750,000 cells/mL, about 1,000-about 500,000 cells/mL, or about 2,500-about 250,000 cells/mL.

In some embodiments the concentration of cells added to the aqueous phase is about 100 cells/mL, about 500 cells/mL, about 1000 cells/mL, about 2500 cells/mL, about 5000 cells/mL, about 7500 cells/mL, about 10000 cells/mL, about 25000 cells/mL, about 50000 cells/mL, about 75000 cells/mL, about 100000 cells/mL, about 250000 cells/mL, about 500000 cells/mL, about 750000 cells/mL, about 1,000,000 cells/mL, about 2,500,000 cells/mL, about 5,000,000 cells/mL, about 7,500,000 cells/mL, about 10,000,000 cells/mL, about 20,000,000 cells/mL, about 25,000,000 cells/mL, about 30,000,000 cells/mL, about 40,000,000 cells/mL, about 50,000,000 cells/mL, about 60,000,000 cells/mL, about 70,000,000 cells/mL, about 80,000,000 cells/mL, about 90,000,000 cells/mL, about 100,000,000 cells/mL, about 105,000,000 cells/mL, about 110,000,000 cells/mL, about 115,000,000 cells/mL, about 120,000,000 cells/mL, about 125,000,000 cells/mL, about 130,000,000 cells/mL, about 135,000,000 cells/mL, about 140,000,000 cells/mL, about 145,000,000 cells/mL, about 150,000,000 cells/mL, about 155,000,000 cells/mL, about 160,000,000 cells/mL, about 165,000,000 cells/mL, about 170,000,000 cells/mL, about 175,000,000 cells/mL, about 180,000,000 cells/mL, about 185,000,000 cells/mL, about 190,000,000 cells/mL, about 195,000,000 cells/mL, about 200,000,000 cells/mL.

In some embodiments, the concentration of cells added to the aqueous phase is 100 cells/mL, 500 cells/mL, 1000 cells/mL, 2500 cells/mL, 5000 cells/mL, 7500 cells/mL, 10000 cells/mL, 25000 cells/mL, 50000 cells/mL, 75000 cells/mL, 100000 cells/mL, 250000 cells/mL, 500000 cells/mL, 750000 cells/mL, 1,000,000 cells/mL, 2,500,000 cells/mL, 5,000,000 cells/mL, 7,500,000 cells/mL, 10,000,000 cells/mL, 20,000,000 cells/mL, 25,000,000 cells/mL, 30,000,000 cells/mL, 40,000,000 cells/mL, 50,000,000 cells/mL, 60,000,000 cells/mL, 70,000,000 cells/mL, 80,000,000 cells/mL, 90,000,000 cells/mL, 100,000,000 cells/mL, 105,000,000 cells/mL, 110,000,000 cells/mL, 115,000,000 cells/mL, 120,000,000 cells/mL, 125,000,000 cells/mL, 130,000,000 cells/mL, 135,000,000 cells/mL, 140,000,000 cells/mL, 145,000,000 cells/mL, 150,000,000 cells/mL, 155,000,000 cells/mL, 160,000,000 cells/mL, 165,000,000 cells/mL, 170,000,000 cells/mL, 175,000,000 cells/mL, 180,000,000 cells/mL, 185,000,000 cells/mL, 190,000,000 cells/mL, 195,000,000 cells/mL, 200,000,000 cells/mL.

In some embodiments in which cell clusters are the biomaterial to be conformally coated, the concentration of cell clusters added to the aqueous phase may range from 100-200,000 cell clusters/mL, 100-100,000 cell clusters/mL, 500-100,000 cell clusters/mL, 1,000-100,000 cell clusters/mL, 2,000-100,000 cell clusters/mL, 3,000-100,000 cell clusters/mL, 4,000-100,000 cell clusters/mL, 5,000-100,000 cell clusters/mL, 6,000-100,000 cell clusters/mL, 7,000-100,000 cell clusters/mL, 8,000-100,000 cell clusters/mL, 9,000-100,000 cell clusters/mL, 10,000-100,000 cell clusters/mL, 15,000-100,000 cell clusters/mL, 20,000-100,000 cell clusters/mL, 25,000-100,000 cell clusters/mL, 30,000-100,000 cell clusters/mL, 35,000-100,000 cell clusters/mL, 40,000-100,000 cell clusters/mL, 45,000-100,000 cell clusters/mL, 50,000-100,000 cell clusters/mL, 55,000-100,000 cell clusters/mL, 60,000-100,000 cell clusters/mL, 65,000-100,000 cell clusters/mL, 70,000-100,000 cell clusters/mL, 75,000-100,000 cell clusters/mL, 80,000-100,000 cell clusters/mL, 85,000-100,000 cell clusters/mL, 900,000-100,000 cell clusters/mL, 95,000-100,000 cell clusters/mL.

In some embodiments in which cell clusters are the biomaterial to be conformally coated, the concentration of cell clusters added to the aqueous phase may range from about 100-about 200,000 cell clusters/mL, about 100-about 100,000 cell clusters/mL, about 500-about 100,000 cell clusters/mL, about 1,000-about 100,000 cell clusters/mL, about 2,000-about 100,000 cell clusters/mL, about 3,000-about 100,000 cell clusters/mL, about 4,000-about 100,000 cell clusters/mL, about 5,000-about 100,000 cell clusters/mL, about 6,000-about 100,000 cell clusters/mL, about 7,000-about 100,000 cell clusters/mL, about 8,000-about 100,000 cell clusters/mL, about 9,000-about 100,000 cell clusters/mL, about 10,000-about 100,000 cell clusters/mL, about 15,000-about 100,000 cell clusters/mL, about 20,000-about 100,000 cell clusters/mL, about 25,000-about 100,000 cell clusters/mL, about 30,000-about 100,000 cell clusters/mL, about 35,000-about 100,000 cell clusters/mL, about 40,000-about 100,000 cell clusters/mL, about 45,000-about 100,000 cell clusters/mL, about 50,000-about 100,000 cell clusters/mL, about 55,000-about 100,000 cell clusters/mL, about 60,000-about 100,000 cell clusters/mL, about 65,000-about 100,000 cell clusters/mL, about 70,000-about 100,000 cell clusters/mL, about 75,000-about 100,000 cell clusters/mL, about 80,000-about 100,000 cell clusters/mL, about 85,000-100,000 cell clusters/mL, about 90,000-about 100,000 cell clusters/mL, about 95,000-about 100,000 cell clusters/mL.

In some embodiments, the concentration of cell clusters added to the aqueous phase is about 100 cell clusters/mL, about 500 cell clusters/mL, about 1,000 cell clusters/mL, about 2,000 cell clusters/mL, about 3,000 cell clusters/mL, about 4,000 cell clusters/mL, about 5,000 cell clusters/mL, about 6,000 cell clusters/mL, about 7,000 cell clusters/mL, about 8,000 cell clusters/mL, about 9,000 cell clusters/mL, about 10,000 cell clusters/mL, about 15,000 cell clusters/mL, about 20,000 cell clusters/mL, about 25,000 cell clusters/mL, about 30,000 cell clusters/mL, about 35,000 cell clusters/mL, about 40,000 cell clusters/mL, about 45,000 cell clusters/mL, about 50,000 cell clusters/mL, about 55,000 cell clusters/mL, about 60,000 cell clusters/mL, about 65,000 cell clusters/mL, about 70,000 cell clusters/mL, about 75,000 cell clusters/mL, about 80,000 cell clusters/mL, about 85,000 cell clusters/mL, about 90,000 cell clusters/mL, about 95,000 cell clusters/mL, about 100,000 cell clusters/mL.

In some embodiments, the concentration of cell clusters added to the aqueous phase is 100 cell clusters/mL, 500 cell clusters/mL, 1,000 cell clusters/mL, 2,000 cell clusters/mL, 3,000 cell clusters/mL, 4,000 cell clusters/mL, 5,000 cell clusters/mL, 6,000 cell clusters/mL, 7,000 cell clusters/mL, 8,000 cell clusters/mL, 9,000 cell clusters/mL, 10,000 cell clusters/mL, 15,000 cell clusters/mL, 20,000 cell clusters/mL, 25,000 cell clusters/mL, 30,000 cell clusters/mL, 35,000 cell clusters/mL, 40,000 cell clusters/mL, 45,000 cell clusters/mL, 50,000 cell clusters/mL, 55,000 cell clusters/mL, 60,000 cell clusters/mL, 65,000 cell clusters/mL, 70,000 cell clusters/mL, 75,000 cell clusters/mL, 80,000 cell clusters/mL, 85,000 cell clusters/mL, 90,000 cell clusters/mL, 95,000 cell clusters/mL, 100,000 cell clusters/mL.

In some embodiments the concentration of islet cells added to the aqueous phase may range from 100-500,000,000 cells/mL, 100-200,000,000 cells/mL, 1,000,000-200,000,000 cells/mL, 5,000,000-200,000,000 cells/mL, 10,000,000-200,000,000 cells/mL, 15,000,000-200,000,000 cells/mL, 20,000,000-200,000,000 cells/mL, 25,000,000-200,000,000 cells/mL, 30,000,000-200,000,000 cells/mL, 35,000,000-200,000,000 cells/mL, 40,000,000-200,000,000 cells/mL, 45,000,000-200,000,000 cells/mL, 50,000,000-200,000,000 cells/mL, 55,000,000-200,000,000 cells/mL, 60,000,000-200,000,000 cells/mL, 65,000,000-200,000,000 cells/mL, 70,000,000-200,000,000 cells/mL, 75,000,000-200,000,000 cells/mL, 80,000,000-200,000,000 cells/mL, 85,000,000-200,000,000 cells/mL, 90,000,000-200,000,000 cells/mL, 95,000,000-200,000,000 cells/mL, 100,000,000-200,000,000 cells/mL, 105,000,000-200,000,000 cells/mL, 110,000,000-200,000,000 cells/mL, 115,000,000-200,000,000 cells/mL, 120,000,000-200,000,000 cells/mL, 125,000,000-200,000,000 cells/mL, 130,000,000-200,000,000 cells/mL, 135,000,000-200,000,000 cells/mL, 140,000,000-200,000,000 cells/mL, 145,000,000-200,000,000 cells/mL, 150,000,000-200,000,000 cells/mL, 155,000,000-200,000,000 cells/mL, 160,000,000-200,000,000 cells/mL, 165,000,000-200,000,000 cells/mL, 170,000,000-200,000,000 cells/mL, 175,000,000-200,000,000 cells/mL, 180,000,000-200,000,000 cells/mL, 185,000,000-200,000,000 cells/mL, 190,000,000-200,000,000 cells/mL, 195,000,000-200,000,000 cells/mL, 100-1,000,000 cells/mL, 500-750,000 cells/mL, 1,000-500,000 cells/mL, or 2,500-250,000 cells/mL.

In some embodiments, the concentration of islet cells added to the aqueous phase may range from about 100-about 500,000,000 cells/mL, about 100-about 200,000,000 cells/mL, about 1,000,000-about 200,000,000 cells/mL, about 5,000,000-about 200,000,000 cells/mL, about 10,000,000-about 200,000,000 cells/mL, about 15,000,000-about 200,000,000 cells/mL, about 20,000,000-about 200,000,000 cells/mL, about 25,000,000-about 200,000,000 cells/mL, about 30,000,000-about 200,000,000 cells/mL, about 35,000,000-about 200,000,000 cells/mL, about 40,000,000-about 200,000,000 cells/mL, about 45,000,000-about 200,000,000 cells/mL, about 50,000,000-about 200,000,000 cells/mL, about 55,000,000-about 200,000,000 cells/mL, about 60,000,000-about 200,000,000 cells/mL, about 65,000,000-about 200,000,000 cells/mL, about 70,000,000-about 200,000,000 cells/mL, about 75,000,000-about 200,000,000 cells/mL, about 80,000,000-about 200,000,000 cells/mL, about 85,000,000-about 200,000,000 cells/mL, about 90,000,000-about 200,000,000 cells/mL, about 95,000,000-about 200,000,000 cells/mL, about 100,000,000-about 200,000,000 cells/mL, about 105,000,000-about 200,000,000 cells/mL, about 110,000,000-about 200,000,000 cells/mL, about 115,000,000-about 200,000,000 cells/mL, about 120,000,000-about 200,000,000 cells/mL, about 125,000,000-about 200,000,000 cells/mL, about 130,000,000-about 200,000,000 cells/mL, about 135,000,000-about 200,000,000 cells/mL, about 140,000,000-about 200,000,000 cells/mL, about 145,000,000-about 200,000,000 cells/mL, about 150,000,000-about 200,000,000 cells/mL, about 155,000,000-about 200,000,000 cells/mL, about 160,000,000-about 200,000,000 cells/mL, about 165,000,000-about 200,000,000 cells/mL, about 170,000,000-about 200,000,000 cells/mL, about 175,000,000-about 200,000,000 cells/mL, about 180,000,000-about 200,000,000 cells/mL, about 185,000,000-about 200,000,000 cells/mL, about 190,000,000-about 200,000,000 cells/mL, about 195,000,000-about 200,000,000 cells/mL, about 100-about 1,000,000 cells/mL, about 500-about 750,000 cells/mL, about 1,000-about 500,000 cells/mL, or about 2,500-about 250,000 cells/mL.

In some embodiments the concentration of cells added to the aqueous phase is about 100 cells/mL, about 500 cells/mL, about 1000 cells/mL, about 2500 cells/mL, about 5000 cells/mL, about 7500 cells/mL, about 10000 cells/mL, about 25000 cells/mL, about 50000 cells/mL, about 75000 cells/mL, about 100000 cells/mL, about 250000 cells/mL, about 500000 cells/mL, about 750000 cells/mL, about 1,000,000 cells/mL, about 2,500,000 cells/mL, about 5,000,000 cells/mL, about 7,500,000 cells/mL, about 10,000,000 cells/mL, about 20,000,000 cells/mL, about 25,000,000 cells/mL, about 30,000,000 cells/mL, about 40,000,000 cells/mL, about 50,000,000 cells/mL, about 60,000,000 cells/mL, about 70,000,000 cells/mL, about 80,000,000 cells/mL, about 90,000,000 cells/mL, about 100,000,000 cells/mL, about 105,000,000 cells/mL, about 110,000,000 cells/mL, about 115,000,000 cells/mL, about 120,000,000 cells/mL, about 125,000,000 cells/mL, about 130,000,000 cells/mL, about 135,000,000 cells/mL, about 140,000,000 cells/mL, about 145,000,000 cells/mL, about 150,000,000 cells/mL, about 155,000,000 cells/mL, about 160,000,000 cells/mL, about 165,000,000 cells/mL, about 170,000,000 cells/mL, about 175,000,000 cells/mL, about 180,000,000 cells/mL, about 185,000,000 cells/mL, about 190,000,000 cells/mL, about 195,000,000 cells/mL, about 200,000,000 cells/mL.

In some embodiments the concentration of islet cells added to the aqueous phase is 100 cells/mL, 500 cells/mL, 1000 cells/mL, 2500 cells/mL, 5000 cells/mL, 7500 cells/mL, 10000 cells/mL, 25000 cells/mL, 50000 cells/mL, 75000 cells/mL, 100000 cells/mL, 250000 cells/mL, 500000 cells/mL, 750000 cells/mL, 1,000,000 cells/mL, 2,500,000 cells/mL, 5,000,000 cells/mL, 7,500,000 cells/mL, 10,000,000 cells/mL, 20,000,000 cells/mL, 25,000,000 cells/mL, 30,000,000 cells/mL, 40,000,000 cells/mL, 50,000,000 cells/mL, 60,000,000 cells/mL, 70,000,000 cells/mL, 80,000,000 cells/mL, 90,000,000 cells/mL, 100,000,000 cells/mL, 105,000,000 cells/mL, 110,000,000 cells/mL, 115,000,000 cells/mL, 120,000,000 cells/mL, 125,000,000 cells/mL, 130,000,000 cells/mL, 135,000,000 cells/mL, 140,000,000 cells/mL, 145,000,000 cells/mL, 150,000,000 cells/mL, 155,000,000 cells/mL, 160,000,000 cells/mL, 165,000,000 cells/mL, 170,000,000 cells/mL, 175,000,000 cells/mL, 180,000,000 cells/mL, 185,000,000 cells/mL, 190,000,000 cells/mL, 195,000,000 cells/mL, 200,000,000 cells/mL.

In some embodiments, the concentration of islet cell clusters added to the aqueous phase may range from 100-200,000 cell clusters/mL, 100-100,000 cell clusters/mL, 500-100,000 cell clusters/mL, 1,000-100,000 cell clusters/mL, 2,000-100,000 cell clusters/mL, 3,000-100,000 cell clusters/mL, 4,000-100,000 cell clusters/mL, 5,000-100,000 cell clusters/mL, 6,000-100,000 cell clusters/mL, 7,000-100,000 cell clusters/mL, 8,000-100,000 cell clusters/mL, 9,000-100,000 cell clusters/mL, 10,000-100,000 cell clusters/mL, 15,000-100,000 cell clusters/mL, 20,000-100,000 cell clusters/mL, 25,000-100,000 cell clusters/mL, 30,000-100,000 cell clusters/mL, 35,000-100,000 cell clusters/mL, 40,000-100,000 cell clusters/mL, 45,000-100,000 cell clusters/mL, 50,000-100,000 cell clusters/mL, 55,000-100,000 cell clusters/mL, 60,000-100,000 cell clusters/mL, 65,000-100,000 cell clusters/mL, 70,000-100,000 cell clusters/mL, 75,000-100,000 cell clusters/mL, 80,000-100,000 cell clusters/mL, 85,000-100,000 cell clusters/mL, 900,000-100,000 cell clusters/mL, 95,000-100,000 cell clusters/mL.

In some embodiments, the concentration of islet cell clusters added to the aqueous phase may range from about 100-about 200,000 cell clusters/mL, about 100-about 100,000 cell clusters/mL, about 500-about 100,000 cell clusters/mL, about 1,000-about 100,000 cell clusters/mL, about 2,000-about 100,000 cell clusters/mL, about 3,000-about 100,000 cell clusters/mL, about 4,000-about 100,000 cell clusters/mL, about 5,000-about 100,000 cell clusters/mL, about 6,000-about 100,000 cell clusters/mL, about 7,000-about 100,000 cell clusters/mL, about 8,000-about 100,000 cell clusters/mL, about 9,000-about 100,000 cell clusters/mL, about 10,000-about 100,000 cell clusters/mL, about 15,000-about 100,000 cell clusters/mL, about 20,000-about 100,000 cell clusters/mL, about 25,000-about 100,000 cell clusters/mL, about 30,000-about 100,000 cell clusters/mL, about 35,000-about 100,000 cell clusters/mL, about 40,000-about 100,000 cell clusters/mL, about 45,000-about 100,000 cell clusters/mL, about 50,000-about 100,000 cell clusters/mL, about 55,000-about 100,000 cell clusters/mL, about 60,000-about 100,000 cell clusters/mL, about 65,000-about 100,000 cell clusters/mL, about 70,000-about 100,000 cell clusters/mL, about 75,000-about 100,000 cell clusters/mL, about 80,000-about 100,000 cell clusters/mL, about 85,000-about 100,000 cell clusters/mL, about 90,000-about 100,000 cell clusters/mL, about 95,000-about 100,000 cell clusters/mL.

In some embodiments, the concentration of islet cell clusters added to the aqueous phase is about 100 cell clusters/mL, about 500 cell clusters/mL, about 1,000 cell clusters/mL, about 2,000 cell clusters/mL, about 3,000 cell clusters/mL, about 4,000 cell clusters/mL, about 5,000 cell clusters/mL, about 6,000 cell clusters/mL, about 7,000 cell clusters/mL, about 8,000 cell clusters/mL, about 9,000 cell clusters/mL, about 10,000 cell clusters/mL, about 15,000 cell clusters/mL, about 20,000 cell clusters/mL, about 25,000 cell clusters/mL, about 30,000 cell clusters/mL, about 35,000 cell clusters/mL, about 40,000 cell clusters/mL, about 45,000 cell clusters/mL, about 50,000 cell clusters/mL, about 55,000 cell clusters/mL, about 60,000 cell clusters/mL, about 65,000 cell clusters/mL, about 70,000 cell clusters/mL, about 75,000 cell clusters/mL, about 80,000 cell clusters/mL, about 85,000 cell clusters/mL, about 90,000 cell clusters/mL, about 95,000 cell clusters/mL, about 100,000 cell clusters/mL.

In some embodiments, the concentration of islet cell clusters added to the aqueous phase is 100 cell clusters/mL, 500 cell clusters/mL, 1,000 cell clusters/mL, 2,000 cell clusters/mL, 3,000 cell clusters/mL, 4,000 cell clusters/mL, 5,000 cell clusters/mL, 6,000 cell clusters/mL, 7,000 cell clusters/mL, 8,000 cell clusters/mL, 9,000 cell clusters/mL, 10,000 cell clusters/mL, 15,000 cell clusters/mL, 20,000 cell clusters/mL, 25,000 cell clusters/mL, 30,000 cell clusters/mL, 35,000 cell clusters/mL, 40,000 cell clusters/mL, 45,000 cell clusters/mL, 50,000 cell clusters/mL, 55,000 cell clusters/mL, 60,000 cell clusters/mL, 65,000 cell clusters/mL, 70,000 cell clusters/mL, 75,000 cell clusters/mL, 80,000 cell clusters/mL, 85,000 cell clusters/mL, 90,000 cell clusters/mL, 95,000 cell clusters/mL, 100,000 cell clusters/mL.

In certain embodiments, the concentration of cells/cell clusters added to the aqueous phase ranges from 5,000 to 100,000 cells/mL. In a particular embodiment, the 5,000 to 250,000 cells/mL added to the aqueous phase are pancreatic islet cells, which may optionally be enriched for insulin secreting beta cells or cell clusters.

In some embodiments, the pH of the aqueous phase is about 6, 6.1, 6.2, 6.3, 6.4, 6.5, 6.6, 6.7, 6.8, 6.9, 7, 7.1, 7.2, 7.3 or 7.4. In some embodiments, the pH of the aqueous is about 6. In some embodiments, the pH of the aqueous is about 6.1. In some embodiments, the pH of the aqueous is about 6.2. In some embodiments, the pH of the aqueous is about 6.3. In some embodiments, the pH of the aqueous is about 6.4. In some embodiments, the pH of the aqueous is about 6.5. In some embodiments, the pH of the aqueous is about 6.6. In some embodiments, the pH of the aqueous is about 6.7. In some embodiments, the pH of the aqueous is about 6.8. In some embodiments, the pH of the aqueous is about 6.9. In some embodiments, the pH of the aqueous is about 7.0. In some embodiments, the pH of the aqueous is about 7.1. In some embodiments, the pH of the aqueous is about 7.2. In some embodiments, the pH of the aqueous is about 7.3. In some embodiments, the pH of the aqueous is about 7.4. In particular embodiments, the pH of the aqueous is about 6-7.4.

As set forth herein, the pH of the aqueous phase is 6, 6.1, 6.2, 6.3, 6.4, 6.5, 6.6, 6.7, 6.8, 6.9, 7, 7.4, 7.5, or 8. In some embodiments, the pH of the aqueous is 6.0. In some embodiments, the pH of the aqueous is 6.1. In some embodiments, the pH of the aqueous is 6.2. In some embodiments, the pH of the aqueous is 6.3. In some embodiments, the pH of the aqueous is 6.4. In some embodiments, the pH of the aqueous is 6.5. In some embodiments, the pH of the aqueous is 6.6. In some embodiments, the pH of the aqueous is 6.7. In some embodiments, the pH of the aqueous is 6.8. In some embodiments, the pH of the aqueous is 6.9. In some embodiments, the pH of the aqueous is 7.0. In some embodiments, the pH of the aqueous is 7.1. In some embodiments, the pH of the aqueous is 7.2. In some embodiments, the pH of the aqueous is 7.3. In some embodiments, the pH of the aqueous is 7.4. In particular embodiments, the pH of the aqueous is 6-7.4.

In some embodiments, the aqueous phase comprises cells and/or cell clusters in media, surfactant, and one or more thiolated or reducing reagents (which may be, e.g., mono- or multi-functional agents that are linear or multi-armed). In some embodiments, the cells/cell clusters comprise islet cells, the media is serum-free or is Hanks' Balanced Salt Solution (HBSS), and/or the thiolated or reducing reagent is DTT or linear bifunctional PEGdithiol. In some embodiments, the aqueous phase comprises 5-10% PEG (e.g., 5% or 10% PEG) and 50,000-250,000 islet cells or cell clusters/ml at pH 7.4. In some embodiments, the aqueous phase comprises 1-30% PEG (e.g., 1% or 30% PEG) and 50,000-250,000 islet cells or cell clusters/ml at a pH of 6 to 7.4. The conformal coating methods of this disclosure encompass any combinations of these values.

In some embodiments, the oil phase comprises polypropylene glycol (PPG), mineral oil with a viscosity of at least 2.5 times more than the viscosity of the aqueous phase, polypropylene glycol (PPG) with 10% sorbitan mono oleate. In some embodiments, the oil phase comprises polypropylene glycol (PPG) with 10% sorbitan mono oleate, wherein said oil phase optionally comprises triethanolamine. In triethanolamine-comprising embodiments, the oil phase comprises 0.01-0.2% triethanolamine. In certain embodiments, the oil phase comprises one or more of, e.g., polypropylene glycol (PPG) or mineral oil with a viscosity of at least 2.5 times more than the viscosity of the aqueous phase. In certain embodiments, the oil phase comprises polypropylene glycol (PPG). In some embodiments, the oil phase comprises mineral oil with a viscosity of at least 2.5 times more than the viscosity of the aqueous phase.

The oil phase may further comprise one or more agents e.g., Span80.

In some embodiments, the oil phase comprises PPG. In certain embodiments, the oil phase comprises PPG with 1-20%, 5-15%, 6-14%, 7-13%, 8-12%, 9-11%, or 10% Span80. In some embodiments, the oil phase comprises PPG with 1-20% Span80. In some embodiments, the oil phase comprises PPG with 5-15% Span80. In some embodiments, the oil phase comprises PPG with 6-14% Span80. In some embodiments, the oil phase comprises PPG with 7-13% Span80. In some embodiments, the oil phase comprises PPG with 8-12% Span80. In some embodiments, the oil phase comprises PPG with 9-11% Span80. In a particular embodiment, the oil phase comprises PPG with 10% Span80.

In some embodiments, the flow rates of the aqueous phase (Qw) and the oil phase (Qo) are respectively selected from: 10 μl/min and 3.5 ml/min; 15 μl/min and 3.5 ml/min; 20 μl/min and 3.5 ml/min; 1 μl/min and 3.5 ml/min; 10 μl/min and 7 ml/min; 50 μl/min and 0.5 ml/min; 50 μl/min and 2.5 ml/min; 150 μl/min and 0.5 ml/min; and 150 μl/min and 2.5 ml/min. In some embodiments, air is injected before the aqueous phase to allow stabilization of the water in the oil jet. In certain embodiments, air is drawn into an injection catheter containing the aqueous phase, such that the bubble of air can be injected into the oil phase prior to injection of the aqueous phase into the oil phase to help visualize the beginning of the aqueous phase.

The flow rates of the aqueous phase and the oil phase may be adjusted over time. In some embodiments, the aqueous phase is reduced over time while the oil phase is increased. In a particular embodiment, the aqueous phase enters the oil phase first at 50 μl/min and is then reduced to 10 μl/min. In certain embodiments, the oil phase rate is gradually increased from 0.5 to 3.5 ml/min while the aqueous phase is decreased and is then kept constant for the entire encapsulation process, or the oil phase rate is kept constant at 3.5 ml/min throughout the encapsulation process.

In some embodiments, the ratio of the oil phase velocity to the aqueous phase velocity is between 70 and 500. In certain embodiments, the ratio is 50, 60, 70, 80, 90, 100, 150, 200, 250, 300, 310, 320, 330, 340, 350, 360, 370, 380, 390, 400, 450, or 500. In a particular embodiment, the ratio is 350.

In some embodiments, the ratio of the oil phase viscosity to the aqueous phase viscosity is between 2.5 and 100. In certain embodiments, the ratio is 2.5, 3, 3.1, 3.2, 3.3, 3.4, 3.5, 3.6, 3.7, 3.8, 3.9, 4, 5, 10, 20, 30, 40, 50, 60, 70, 80, 90, or 100. In a particular embodiment, the ratio is 3.5.

Upon breakup of the water jet, the material for encapsulation (e.g., cells and/or cell clusters) is coated with a thin, coating material-containing water layer that is proportional to the size of the jet, allowing for conformal coating. As disclosed herein, the coating is then formed into a polymer by contact coaxially with a gelling emulsion that promotes polymerization. In certain embodiments, the emulsion comprises dithiotheitol and Hanks' Balanced Salt Solution (HBSS) in polypropylene glycol (PPG).

The coated cells/cell clusters are then collected from the outflow of the coating device. In some embodiments, after collection, the coated cells and/or cell clusters are kept under stirring for, e.g., 1-30, 5-20, or 8-12 minutes to avoid coalescence until polymerization of the coating is completed. In some embodiments, the stirring takes place at between 4 and 25° C. In particular embodiments, the stirring takes place at 25° C. In some embodiments, the stirring speed is between 50-500 rpm or 100-300 rpm. In some embodiments, the coated cells and/or cell clusters are kept stirring for about 7 minutes. In some embodiments, the coated cells and/or cell clusters are collected in a vessel and allowed to settle by gravity. In some embodiments, the coated cells and/or cell clusters are kept without stirring in the outer bath for, e.g., 1-30, 5-20, or 8-12 minutes to allow polymerization of the coating to complete. In some embodiments, the coated cells and/or cell clusters are collected within a vessel comprising mineral oil and 0.01-0.1% triethanolamine.

It may be desirable to separate the coated cells and/or cell clusters from biomaterial-free coating material. This separation may be achieved by any of a number of size or density-based separation techniques well known in the art, e.g., by gradient centrifugation. In certain embodiments, coated cells and/or cell clusters are further purified from coating material by gradient centrifugation, comprising the steps of:
(a) layering solutions to form a density gradient capable of separating the conformally coated biomaterial and the biomaterial-free coating material; (b) applying the conformally coated biomaterial and biomaterial-free coating material to the density gradient; (c) centrifuging the density gradient to separate the conformally coated biomaterial from the biomaterial-free coating material; and (d) removing the part of the gradient containing the biomaterial-free coating material.

In some embodiments, the solutions layered to form the gradient are at the densities of (1) 1-1.1 g/ml, e.g., 1.042 g/ml, and (2) media. In some embodiments, more than 50, 60, 70, 80, 85, 90, 91, 92, 93, 94, 95, 96, 97, 98, 99, or 100% of the coated biomaterial is purified from the biomaterial-free coating material. In a certain embodiment, more than 95% of the coated biomaterial is purified from the biomaterial-free coating material.

In certain embodiments, the conformally coated biomaterials, particularly cells, are washed repetitively, in certain embodiments comprising HBSS. After purification cell-comprising the conformally coated biomaterial can be cultured in vitro under appropriate culture conditions.

If the coating material bears a fluorescent label, the conformally coated cells and/or cell clusters can be visualized by, e.g., fluorescence microscopy, fluorocytometry, flow cytometric cell sorting technology, or by a fluorescent plate reader. In some embodiments, the fluorescently labeled conformally coated cells can be detected and/or isolated using, e.g., flow cytometry or fluorescent-activated cell sorting (FACS).

In some embodiments, the methods of this disclosure are scaled up to conformally coat at least 50,000; 100,000; 150,000; 200,000; 300,000; 400,000; 500,000; 600,000; 700,000; 800,000; 900,000; or 1,000,000 cells and/or cell clusters at the same time. In some embodiments, this scale up is achieved by performing the methods of this disclosure in a series of chambers. In some embodiments, the disclosed methods can be scaled up by assembling a series of parallel vertical chambers in, e.g., a radial configuration in which radial flow to each chamber feeds the aqueous phase to each separate chamber with comparable hydrodynamic flow characteristics. In some embodiments, the coated cells and/or cell clusters and biomaterial-free coating material from each chamber are collected in separate containers. In some embodiments, the coated cells and/or cell clusters and biomaterial-free coating material from each chamber are collected in the same container and purified at the same time.

In some embodiments, the methods of this disclosure provide conformal coating of greater than 15, 20, 25, 30, 35, 40, 45, 50, 55, 60, 65, 70, 75, 80, 85, 90, 91, 92, 93, 94, 95, 96, 97, 98, 99, or 100% of the biomaterial introduced into the coating device. In certain embodiments, the disclosed methods provide conformal coating of greater than 95% of the introduced biomaterial.

In some embodiments, the viability and function of coated cells and/or cell clusters are assessed by any of a number of methods well known in the art, e.g., MTT assay, live/dead staining, and/or (in the case of islets) static glucose stimulated insulin secretion or perifusion. In some embodiments, said assessment takes place before implantation of the cells. In cases where the coated cells are islets, immunoprotection of the transplanted islets by conformal coating may be evaluated by, e.g., monitoring the glucose level and/or weight of the transplanted patient, serum C peptide levels, hemoglobin A1c, and/or by histological evaluation.

This disclosure further provides methods of treating a disorder in a patient, comprising the step of implanting into the patient the conformally coated biomaterial isolated by the methods referred to herein. These disorders include, but are not limited to: diabetes, hemophilia, renal failure, amyloidosis, immune system disorders, inflammations, chronic pain, arthritis, hypertension, disorders of the nervous system, metabolic disorders, endocrine disorders, lymphoproliferative disorders, myeloproliferative disorders, myelodysplastic syndromes, stem cell disorders, phagocyte disorders, histiocytic disorders, abnormalities of erythrocytes or platelets, plasma cell disorders, acute leukemias, chronic leukemias, malignancies (breast carcinoma, Ewing Sarcoma, neuroblastoma, renal cell carcinoma, etc.), hypothyroidism, hypopituitarism, hypogonadism, graft failure, graft versus host disease (GVD), veno-occlusive disease, side effects from pre-transplant chemotherapy (such as excessive bleeding, infertility, and renal as well as lung and heart complications), and other disorders and diseases that would be recognized by the skilled practitioner.

As referred to herein, the term "patient" refers to the recipient of a therapeutic treatment and includes all animals. In some embodiments, the patient is a mammal. In some embodiments, the patient is a primate. In some embodiments, the patient is a human.

The conformally coated biomaterial produced by the methods of this disclosure may be implanted in any appropriate place within a patient. The biomaterial may be implanted live or pre-vascularized sites; in physiological or transformed sites; and within tissue and organs or adjacent to them. In certain embodiments, the implant location may be, for example, intraomental (in an omental pouch), subcutaneous, intraperitoneal, preperitoneal, intramuscular, intra-lymph nodal, or renal subcapsular. In some embodiments, the implant location is subcutaneous. In some embodiments, the implant location is not the abdominal cavity.

In some embodiments, conformally coated biomaterial produced by the methods of this disclosure is placed in a device before implantation in a patient, to decrease the patient immune response and/or to prolong the survival of the cells. The device may be any device suitable for the implantation of biological material in a patient, e.g., the device as described in U.S. Publication No. 2006/0024276 or in U.S. Pat. No. 6,716,246, each of which is incorporated herein by reference in its entirety. In some embodiments, the conformally coated biomaterial is implanted within or adjacent to a natural or synthetic, biodegradable or non-biodegradable scaffolding substrate.

The Examples that follow are illustrative of specific embodiments of the disclosure, and various uses thereof. They are set forth for explanatory purposes only and should not be construed as limiting the scope of the disclosure in any way.

EXAMPLES

Conformal coating procedures set forth herein are improvements over the procedures disclosed in U.S. patent application Ser. No. 15/478,320, filed Apr. 4, 2017, U.S. patent application Ser. No. 14/114,690, International Patent Application No. PCT/US2012/035696, and U.S. Provisional Patent Application No. 61/480,513, the disclosures of each of which are expressly incorporated by reference herein. These improvements involve, inter alia, avoiding subjecting biomaterials, particularly cells and most particularly islet cells, to low pH (i.e., less than about pH 5) conditions and elimination of viscosity enhancers in aqueous phases comprising said biomaterials, which results in improvement of encapsulated islet functioning and coating biocompatibility.

| Materials for use in improved conformal coating procedures: Item |
|---|
| 10 kDa 8-arm 75% functionalized PEG-maleimide (12.5% w/v concentration) in HBSS-/- |
| 25 mg/mL Dithiothreitol in HBSS-/- |
| 10X 2 kDa PEGdithiol (PEG-SH) solution (42.9% W/V) |
| 1X PEG-SH (4.29% w/v) |
| Polypropylene glycol (Mn ~4000) with 10% Span80 |
| Light mineral oil |
| Isolated islets of Langerhans |
| Sterile beakers (150 mL, 1 L) |
| Conformal coating device |
| Syringe pump |
| Peristaltic pump |
| Tygon tubing for peristaltic pump |
| Rigid Tubing for Syringe Pump |
| Hamilton Syringe |
| 16G catheter (SurFlash ®) |
| 1N HCL solution |
| 1N NaOH solution |

Reagents Used in Improved Conformal Coating Procedures:

Gelling emulsion—Dithiothreitol solution in Hanks' Balanced Salt Solution (HBSS) (25 mg/mL dithiothreitol) was added slowly by stirring to 500 mL of polypropylene glycol (PPG) until emulsified (milky white) and evenly mixed.

Minimally crosslinked PEG-MAL solution—To 400 µL of 12.5% w/v PEG-MAL (10 kDa, 8 arm, 75% functionalized), 2.6 µL of 1N HCl was added and then vortexed (which prevented instant gelation due to inhomogeneous mixing), then 22.22 µL of 10×PEG-SH solution was added by mixing. This provided a minimally crosslinked PEG-MAL solution.

Separately, 1 µL of 1N NaOH was added to 400 µL of HBSS, which was then added to the 401 µL of the minimally crosslinked PEG-MAL solution, and then vortexed completely. This mixture was then left to gel partially, converting to a viscous liquid for 30 minutes. This gelling step may be performed for 5, 10, 15, 20, 25, 30, 35, 40, or 45 minutes.

Apparatus Setup

The components of the coating device, as illustrated in FIG. 1 and FIG. 1A, were cleaned, let dry and then reassembled and sterilized (typically, in an autoclave) except for the capillary, capillary screw and bubble trap. Specifically, the three parts shown in FIG. 1A, Panels (ii), (iii), and (iv) were screwed together. A pair of rubber valves were placed atop the part shown in FIG. 1A (iii) prior to screwing. A glass capillary was inserted into the bottom orifice of the part shown in FIG. 1A, Panel (iv) and fixed into place. For each preparation, new, unused Tygon pump tubing and rigid tubing (for use with the syringe pump) were washed and sterilized. Similar washing and sterilization procedures were used for the Hamilton syringe. All remaining steps in the procedure were performed under a cell culture, laminar flow hood, wherein the apparatus was assembled as shown in FIGS. 1 and 1A. The capillary tube was then mounted and affixed in place with the capillary screw, and 1 waste receptacle, typically a 50 mL conical tube, was placed under the capillary. The bubble trap was also positioned on the device as shown in FIGS. 1 and 1A.

The glass Hamilton syringe was then filled with mineral oil without introducing gas bubbles and the rigid tubing prepared by priming with mineral oil, conveniently using a 5 mL luer lock syringe and then the primed tubing connected to the Hamilton syringe. The syringe was then secured on the syringe pump as shown in FIGS. 1 and 1A, taking care to leave at least 2 mL mineral oil in the syringe to permit proper catheter priming. The distal end of the rigid tubing is conveniently secured to a steel stand as shown in FIG. 1A.

Tygon tubing was then attached to peristaltic pump and contacted with 50 mL conical tube (or other receptacle) containing solution of PPG and 10% Span 80. The distal end of the Tygon tubing was then attached to the coating device as shown in FIGS. 1 and 1A and the pump was then primed. The pump was then primed to a flow rate of 3.5 mL/min by calibrating the amount delivered, for example, to a 50 mL conical tube to be 3.5 g.

A sterile catheter was then attached to the end of the rigid tubing and the syringe pump flow rate set to 2 mL/min. The catheter was primed to ensure any air bubbles were removed and at least 1 mL mineral oil left in the syringe.

Figure 1C:
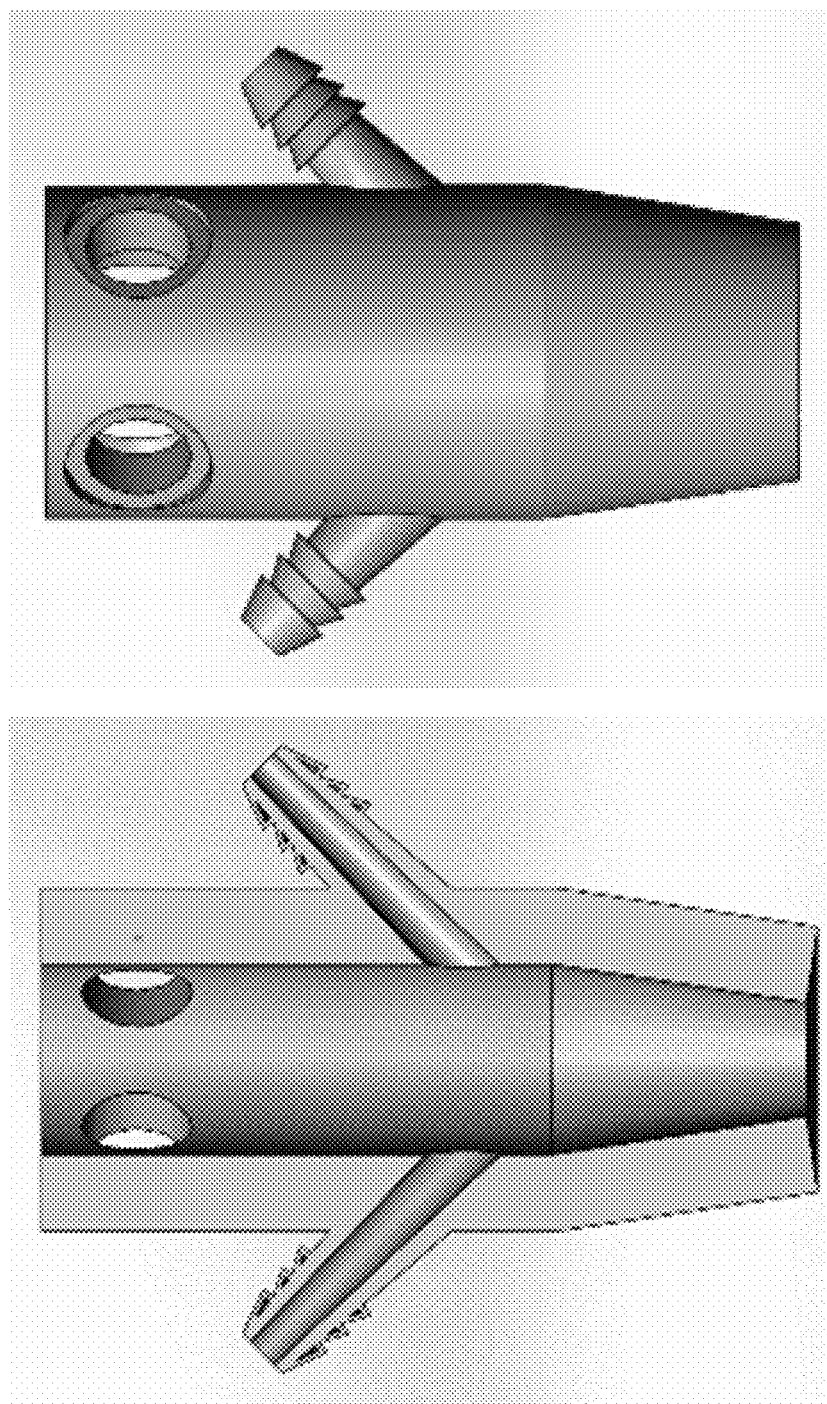
FIG. 1C. Exemplary image of a 3D-printed gelling emulsion-dispensing implement disclosed herein.

Finally, two wide-orifice 200 µL micropipette tips were affixed to the glass capillary, conveniently using zip ties on the opposite ends of the capillary, and two peristaltic tubings affixed to the wide orifice tips secured to the glass capillary. The tube/capillary assembly was then mounted onto the peristaltic pump as shown in FIGS. 1 and 1A, and the ends of the peristaltic tubes dipped into the gelling emulsion. A photograph of the fully assembled apparatus is shown in FIG. 1B. Additionally, a 3D printed custom implement was designed to replace the assembly described previously in this paragraph (FIG. 1C). Briefly, this implement is designed to slide onto and bite down on the glass capillary and has two barbed inlets where the peristaltic tubing can be affixed directly.

Conformal Coating Process:

Pancreatic islet cells were conformally coated according to the following protocol. Approximately 10,000 islet cell equivalents (IEQ) in cell culture media were introduced into a 1.5 mL low-binding, sterile Eppendorf tube and centrifuged at 150 RCF for 1 minute, to pellet the cells. After decanting the supernatant cell culture media, the islets cells were resuspended in 100 µL of minimally crosslinked PEG-MAL (at neutral pH), conveniently using a 200 µL wide orifice tip affixed to a P100 pipettor. The cells were then withdrawn into the 16G catheter (Surflash®) at a withdraw rate of 100 µL per minute using the precision syringe pump. The gelling emulsion was then introduced into the capillary and flowed into a 150 mL collection beaker at a flow rate of 4 mL/min. The bubble trap was opened to ensure bubble removal and the PPG/Span 80 mixture introduced into the device at the calibrated rate of 3.5 mL/min. (The bubble trap was closed once bubbles resulting from introduction of various liquid components were cleared from the device.)

The 16G catheter (Surflash®) comprising the islet cells was then inserted into the top of the device and the islet-comprising PEG-MAL suspension flowed into the capillary using the Harvard syringe pump at a rate of 15 µL per minute. The coating procedure was allowed to proceed for about 7 minutes, the dripping-to-jetting transition being observed throughout the procedure to ensure stable transition. Thereafter, the 2 peristaltic pumps and the Harvard syringe pump were turned off and the conformally coated islets collected in the 150 mL collection beaker were permitted to gel for 12 minutes.

Purification Process

The collected effluent from the conformal coating procedure was slowly poured into 200 mL of mineral oil, typically contained in a 1 µL beaker at a stir rate of 240 rpm. The islet-containing receptacle was then rinsed with HBSS−/− and the volume of the receptacle containing the islet cells and mineral oil adjusted to a total of 500 mL with HBSS−/− and stirring continued at the same rate for two minutes. Thereafter, the mixture was separated into two, 250 mL portions into conical tubes and subjected to centrifugation for 5 min at 1500 rpm, leaving a cell-containing pellet of ~5 mL.

The cell pellet was transferred into a 50 mL conical tube, the pelleting tubes rinsed with HBSS−/− and added to each 50 mL conical tube. The volume of the islet cell-containing 50 mL conical tubes was adjusted to 50 mL with HBSS−/− and subjected to centrifugation for 5 min at 1000 rpm. The cell pellets from this centrifugation were transferred to 15 mL tubes, the 50 mL tubes rinsed with HBSS−/− and added to the 15 mL tubes. The volume of the islet cell-containing 15 mL conical tubes were each adjusted to 15 mL with HBSS−/− and subjected to centrifugation for 5 min at 1000 rpm. The supernatant was then removed, and the cells incubated with 250 µL 1×PEG-SH for 1 minute, and after 1 minute the volume of each 15 mL conical tube was adjusted to 15 mL with HBSS−/− and subjected to centrifugation at 1000 rpm for 1 minute. The cell pellet comprising conformal coated islet cells was then rinsed three times with 1 mL cell culture media and pelleted by centrifugation at 1,000 rpm for 1 minute each time. The rinsed conformally coated islet cells were then plated in 10 mL cell culture media in a 10 cm petri dish.

Comparisons of Cell Viability and Functionality:

Effects of Previous Method on Cell Viability and Functionality

Figure 2:
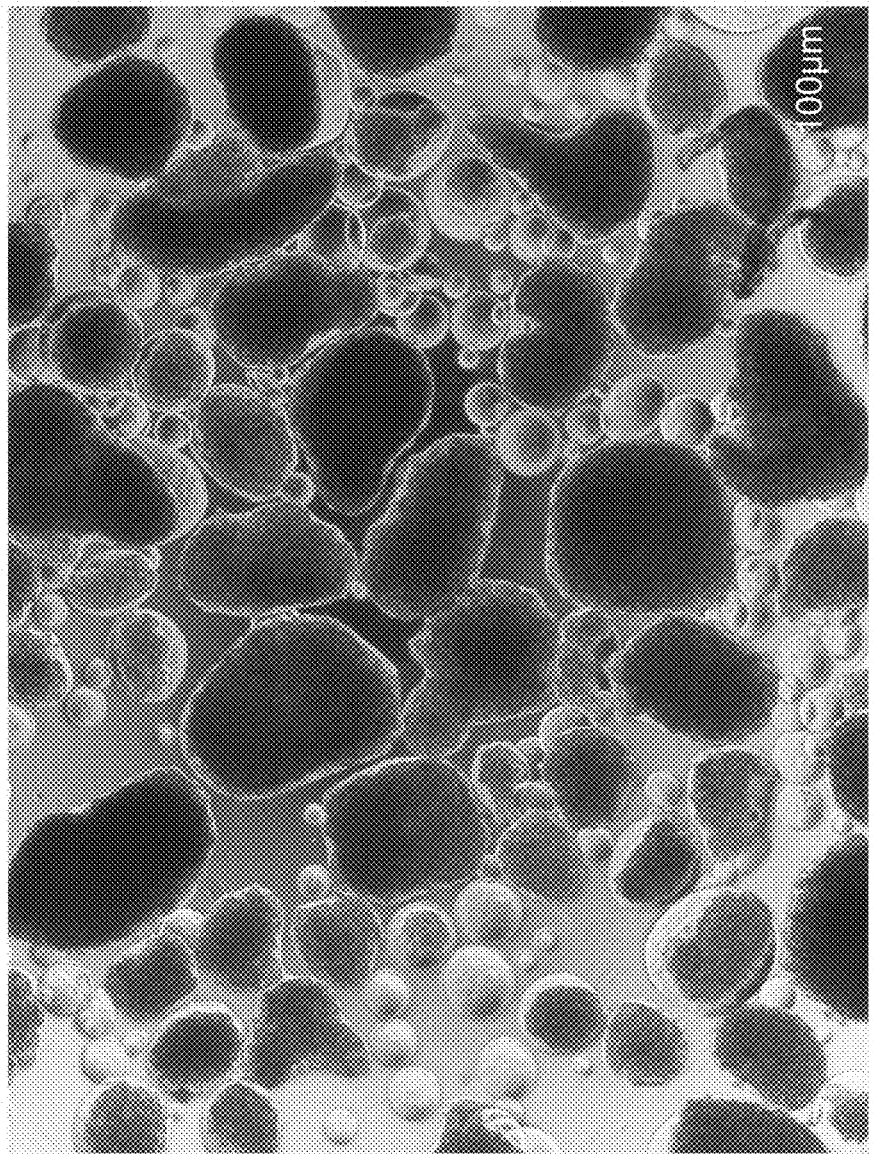
FIG. 2. In vitro and in vivo assessment of conformal coated (CC) non-human primate (NHP) islets. NHP islets from cynomolgus monkeys were conformal coated (CC) with PEG/PEG-dithiol (PEG-SH)/peptide hydrogels under low pH method. Panel A depicts phase contrast images of CC NHP islets showed that large islets had very thin and potentially incomplete coatings. Panel B: Functionality of naked (NK) and CC small (<200 μm) and large (>200 μm) NHP islets by static glucose-stimulated insulin secretion (GSIS), by sequential stimulation with 2.2 mM glucose (1 hr, L1), 16.7 mM glucose (1 hr, H), 2.2 mM glucose (1 hr, L2), and 25 mM KCl (1 hr), showed higher functionality of smaller islets (arrows) but reduced insulin secretion of CC NHP islets compared to naked islets. Functionality was evaluated as secreted insulin (left), GSIS index (ratio of insulin secretion during 16.7 mM to 2.2 mM glucose stimulation: H divided by L1), and GSIS delta (difference in insulin secretion during 16.7 mM and 2.2 mM glucose stimulation: H minus L1). Panel C: Functionality of CC NHP islets by dynamic glucose-stimulated insulin release (perifusion) showed reduced insulin secretion for CC NHP islets compared to naked islets but a stimulation index of 2.6; which indicates functionality. Panels D-G: In vivo functionality of CC NHP islets compared to naked islets after transplantation of 2,000 or 4,000 IEQ/mouse in the epididymal fat pad (EFP) or the kidney capsule (KD) of diabetic NSG mice or NODscid mice as blood glucose (Panels D, F, G) and random human c-peptide in blood serum 7 days after islet transplantation (Panel E). Data shown are from three independent NHP islets: batch #1 (Panels D,E); batch #2 (Panel F); batch #3 (Panel G).
Figure 2:
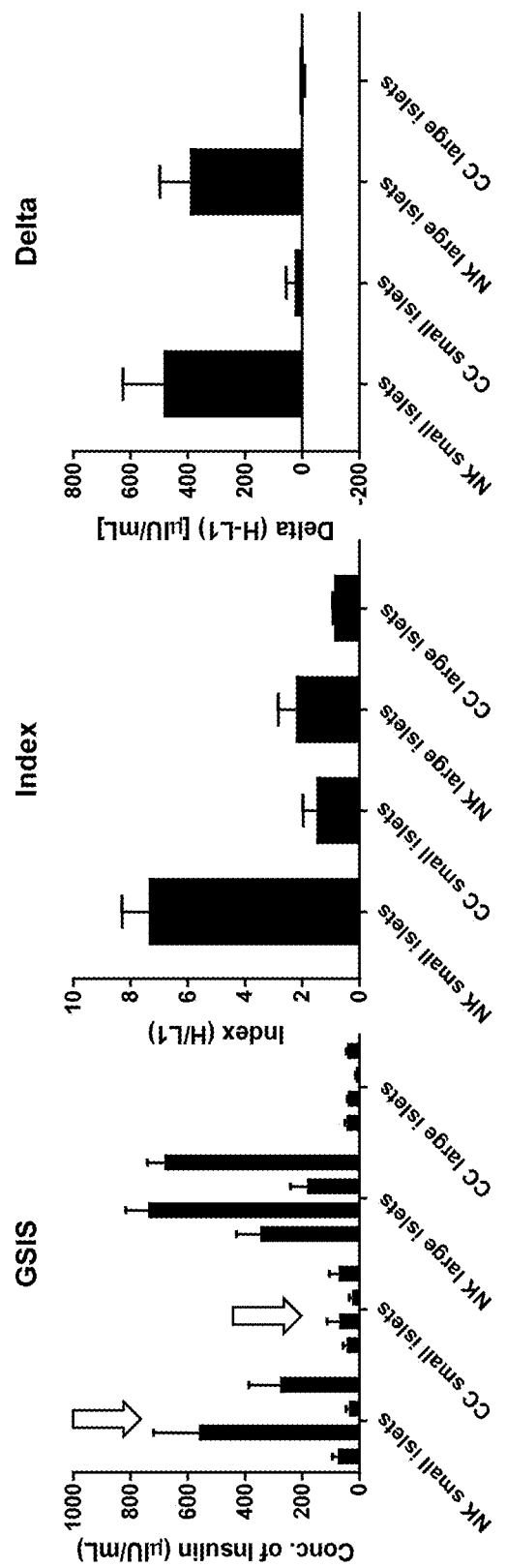
Figure 2:
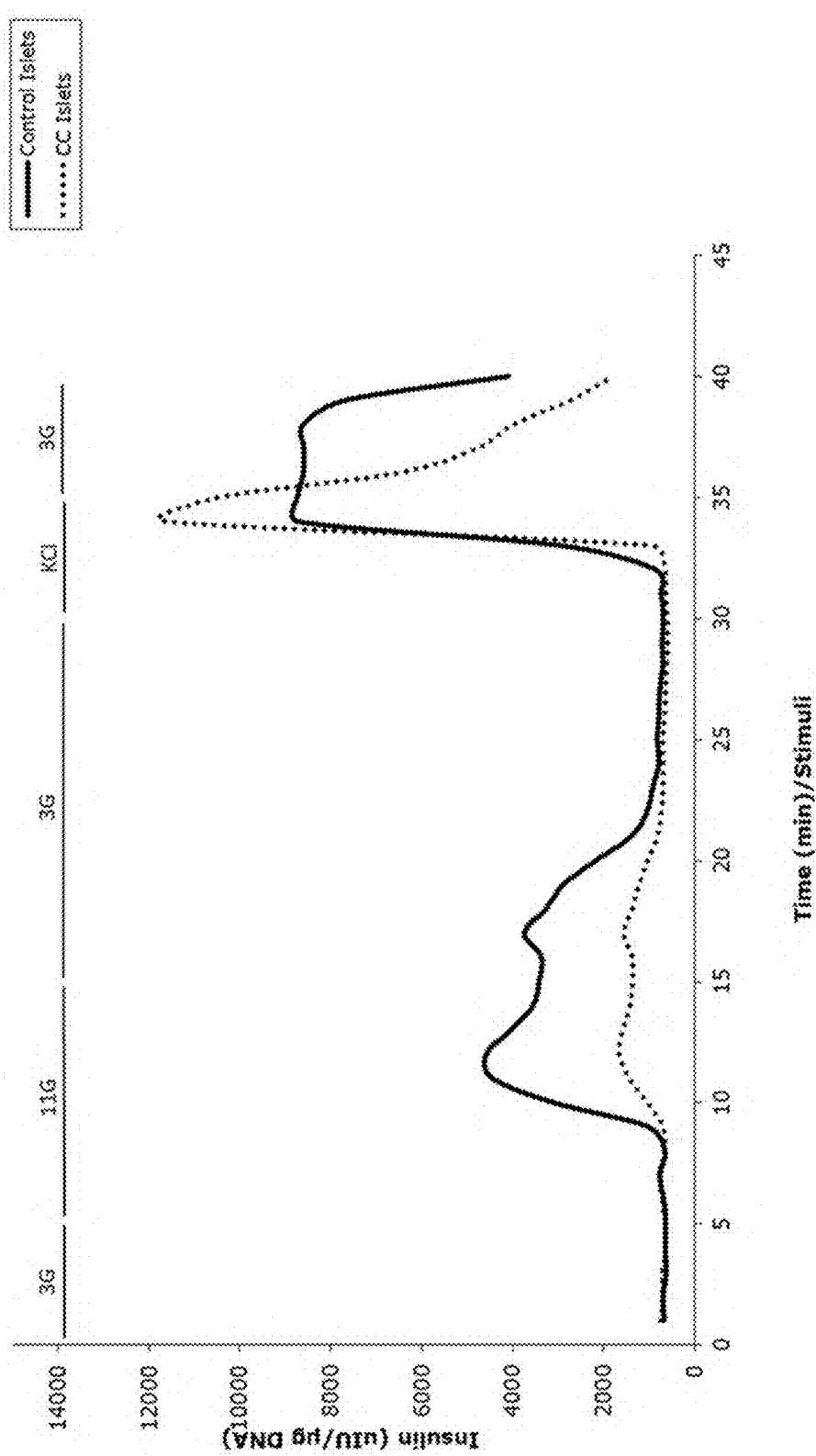
Figure 2:
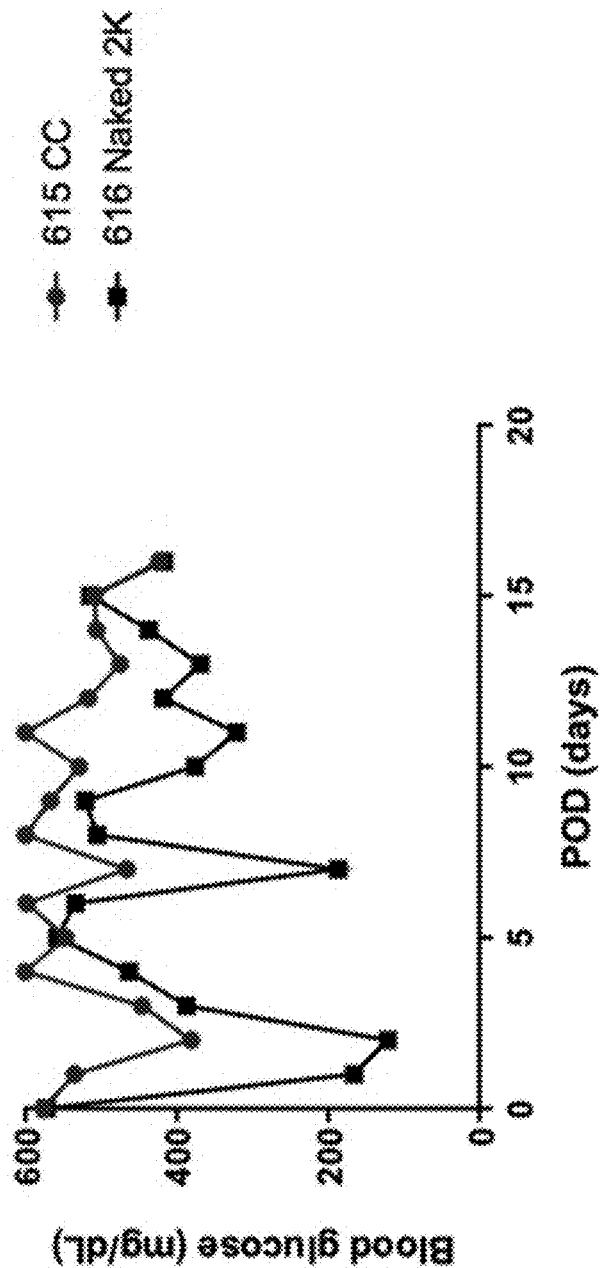
Figure 3:
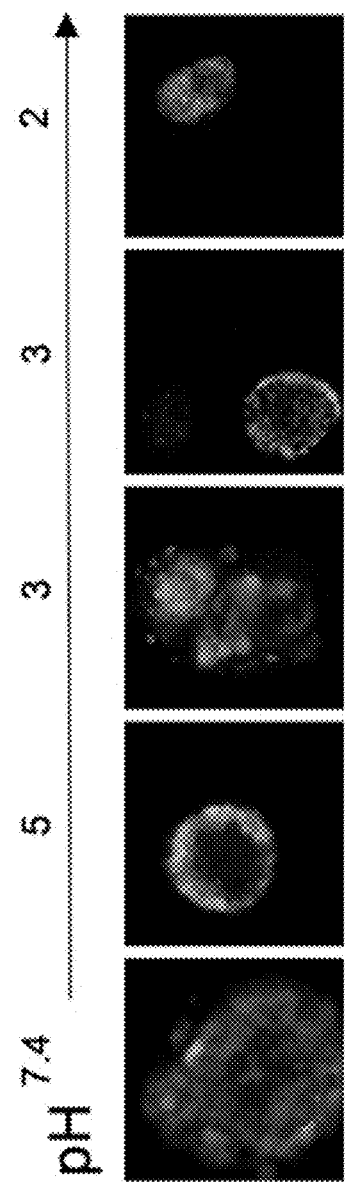
FIG. 3. Effects of pH of coating solution on viability of insulin-secreting pancreatic islets (nuclei, live cell cytoplasm, and dead cell nuclei were stained using the live/dead assay), showing decreased viability with decreasing pH.

Using the conformal coating methods set forth in U.S. patent application Ser. No. 15/478,320, filed Apr. 4, 2017, U.S. patent application Ser. No. 14/114,690, International Patent Application No. PCT/US2012/035696, and U.S. Provisional Patent Application No. 61/480,513, the disclosures of each of which are expressly incorporated by reference herein, non-human primate (NHP) islets conformal coated with PEG and an amphiphilic self-assembling peptide at low pH (shown in FIG. 2, Panel A) poorly responded to static (GSIS) and dynamic (perifusion) glucose-stimulated insulin secretion in vitro (FIG. 2, Panels B and C). Absolute insulin secretion and stimulation indexes of CC NHP islets were lower than naked islets. Concordantly, CC NHP islets were not able to reverse diabetes after transplantation in the fat pad or the kidney capsule of NSG mice (shown in FIG. 2, Panel D), though detectable human C-peptide was found in all recipient mice (FIG. 2, Panel E). Further comparative studies indicated that islet cell viability decreased with pH, as shown in FIG. 3.

Effects of Previous Method on Biocompatibility in Large Animals

Figure 4:
FIG. 4. Assessment of CC NHP islets (low pH method, PEG/PEG-SH/peptide hydrogels) in the omental pouch of a diabetic NHPs. Panel A shows feasibility of laparoscopic procedure for immobilization of CC NHP islets on the omental surface of a cynomolgus monkey using biologic scaffolds. Panel B shows exogenous insulin requirement (EIR, dotted line), blood glucose (dots) and C-peptide of CC NHP islet recipient showing minimal function of CC NHP islets. Panels C and D show the histological evaluation of explanted CC NHP omental grafts analyzed for islet survival (insulin) and capsule immunoisolation from T cells (CD3, green label) (Panel D; arrows pointing to staining for insulin (red label)) and for biocompatibility (Panel C, arrows pointing to multinucleated giant cells). The inflammatory reaction to the capsule in the omental site of NHPs was extensive, chronic, and active.
Figure 4:
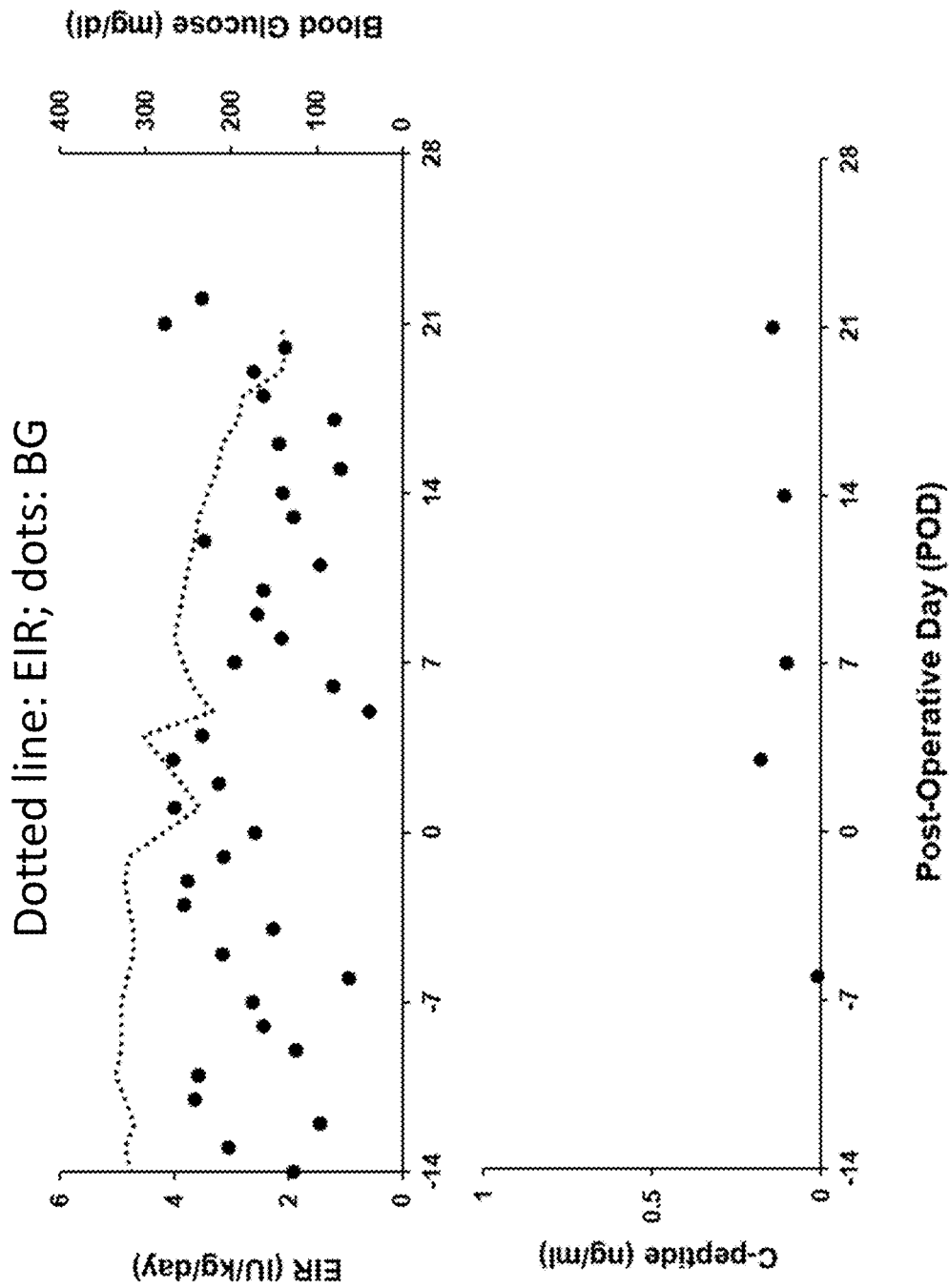
Figure 4:
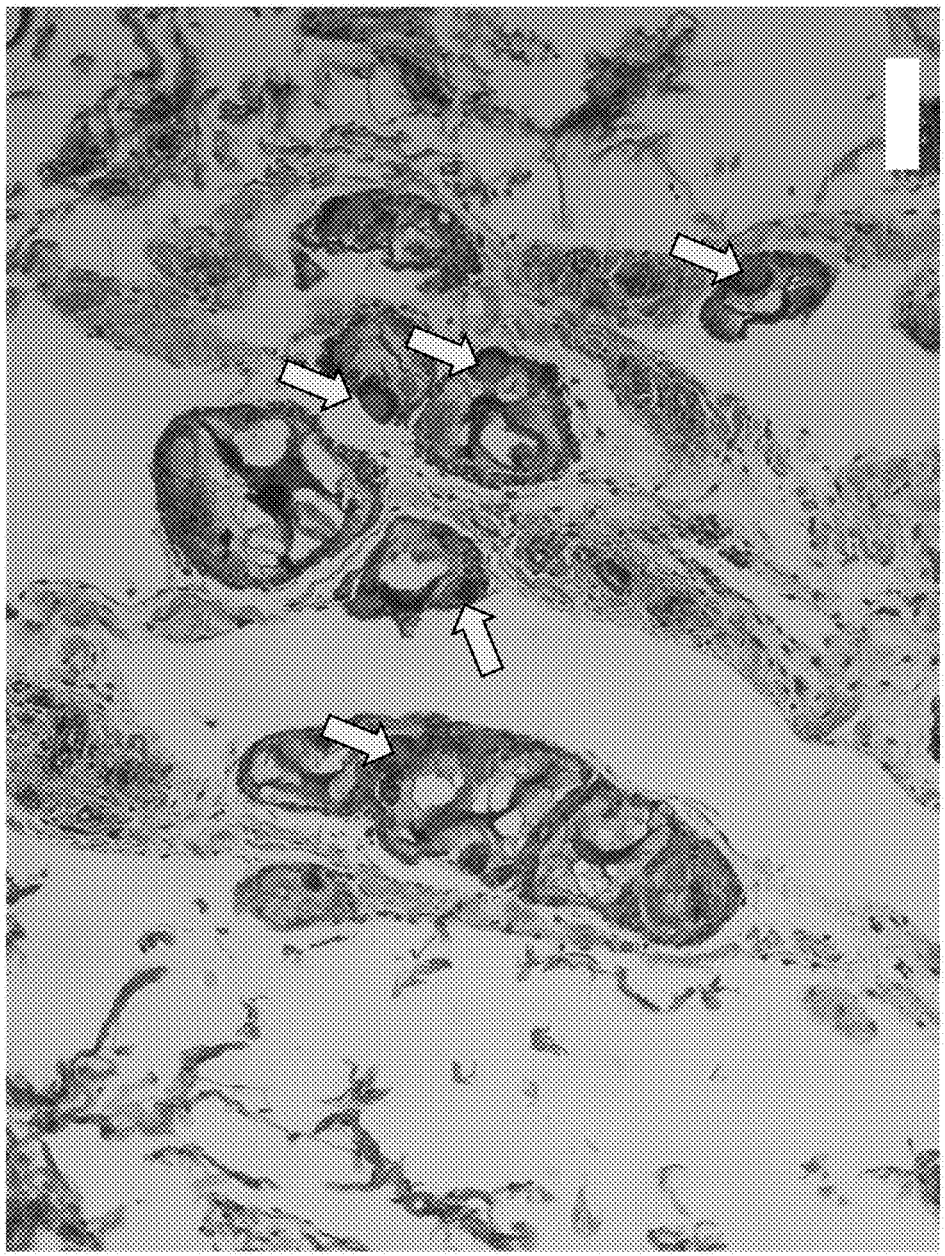
Figure 4:
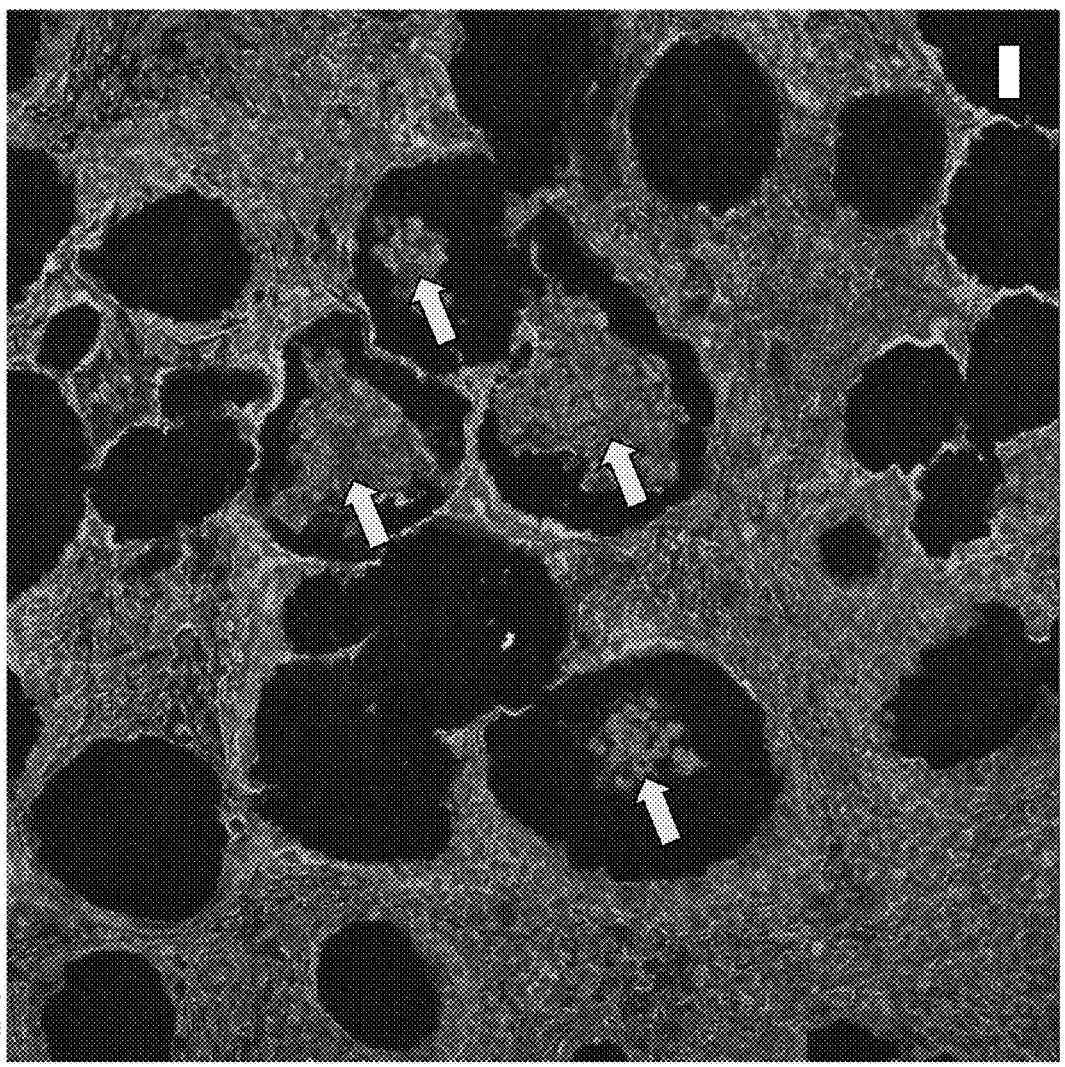

In diabetic NHP, laparoscopic implantation of CC NHP islets in the omental pouch using biologic scaffolds (FIG. 4, Panel A) was demonstrate using a marginal dose (5k IEQ/kg) of fully allogeneic CC NHP islets and steroid-free immunosuppression. Nonetheless, only minimal function of CC NHP islets was observed as reduction in insulin requirement and detectable C-peptide after transplantation of CC NHP islets (FIG. 4, Panel B). Histological examination of grafts explanted 21 days after transplantation, revealed the presence of insulin positive CC NHP islets in the graft and an absence of T cell infiltration (FIG. 4, Panel D). However, biocompatibility in the omental pouch of PEG/PEG-SH/peptide produced using the prior "low pH" method was poor. Pathological examination revealed extensive, chronic, active severe inflammatory reaction characterized by large numbers of multinucleated giant cells and fibroplasia (FIG. 4, Panel C).

Testing of New Conformal Coating Method: Improved Cell Viability and Functionality The conformal coating methods set forth herein (i) improve biocompatibility of coatings by eliminating the viscosity enhancer component and obtain pure PEG coatings and (ii) permit coating at neutral pH to maximize viability and functionality of coated islets (including NHP islets). The changes from the methods set forth in the Prior Applications, include increasing the viscosity of the aqueous phase, which can include inter alia the islet cells to be coated, by minimally crosslinking 20% of crosslinkable arms of PEG-MAL-PEG-SH crosslinker, which achieved viscosities necessary for jetting the aqueous phase within the oil phase for conformal coating formation. In the methods disclosed herein, complete gelation of PEG-MAL around the islets occurs downstream of jet breakup, where capsule formation occurs, by flowing an emulsion of dithiothreitol (DTT) solution in polypropylene glycol and Span80 surfactant coaxially to the aqueous phase but downstream of the part of the device where break-up of the jetting aqueous phase occurs.

Figure 5:
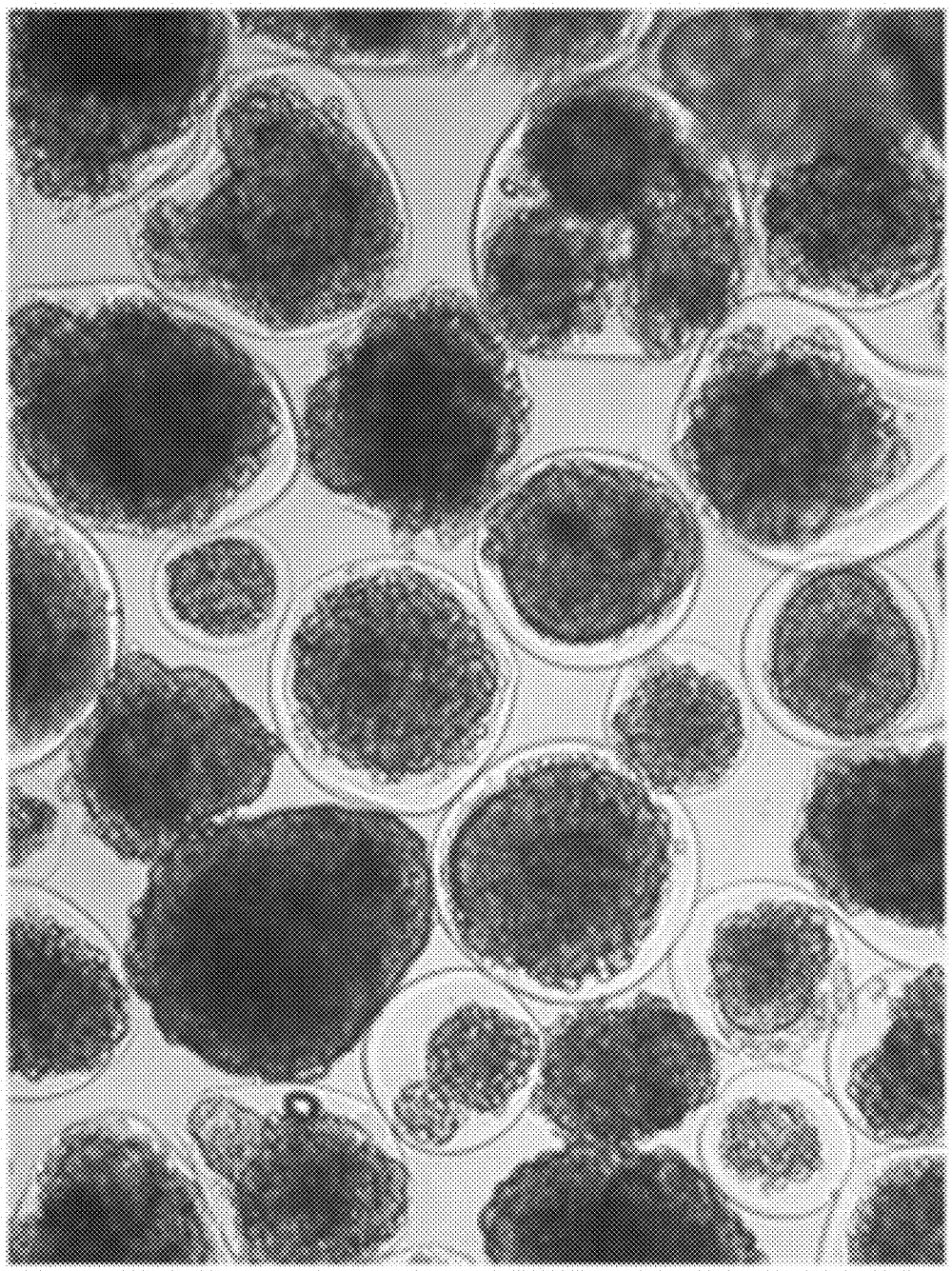
FIG. 5. Evaluation of the conformal coating method disclosed herein (pure PEG and physiological pH) with human islets in vitro and in vivo. Coating quality was evaluated by phase contrast microscopy (Panel A); viability of coated islets by live/dead staining and confocal microscopy (Panel B); in vitro function by static (Panel C, E) and dynamic (perifusion, Panel D, F) glucose-stimulated insulin secretion on islets from three different donors and two batches of encapsulation (batch #1: C,D; batch #2: E,F); in vivo function by monitoring blood glucose (Panel G), glucose tolerance during intraperitoneal glucose test (Panel H) and stimulated human c-peptide (Panel I) after transplantation of 4,000 IEQ/mouse of naked or CC human islets in the fat pad of diabetic immunodeficient NSG (NOD scid gamma mouse) mice.
Figure 5:
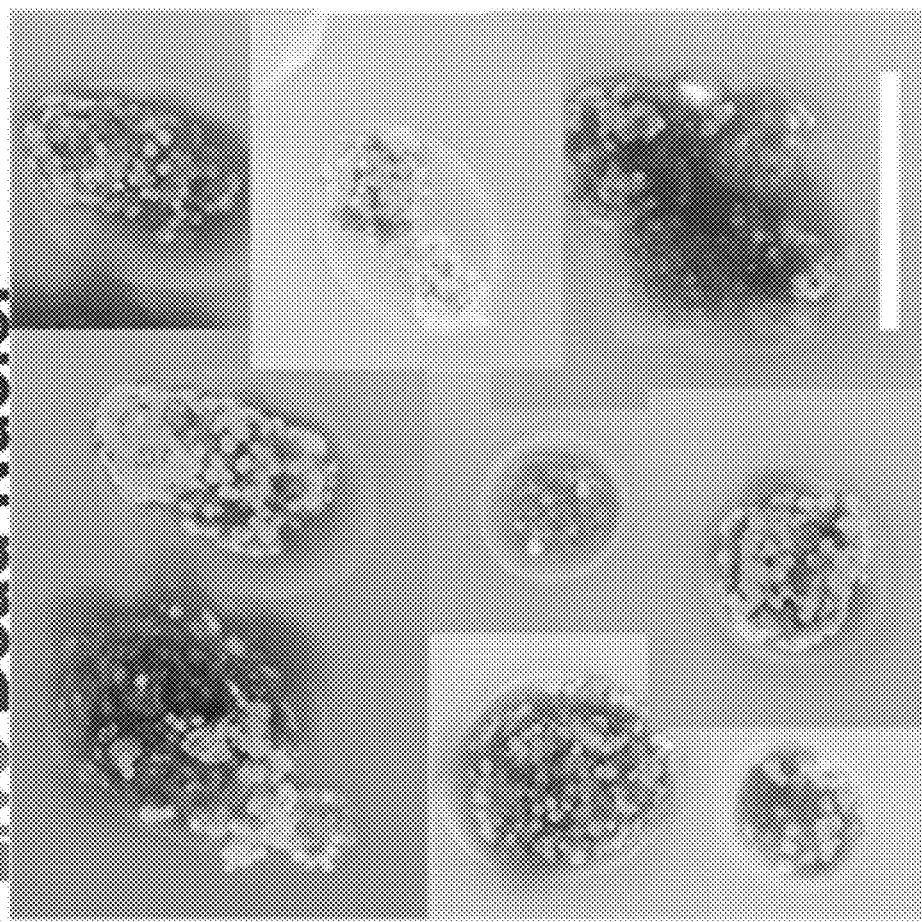
Figure 5:
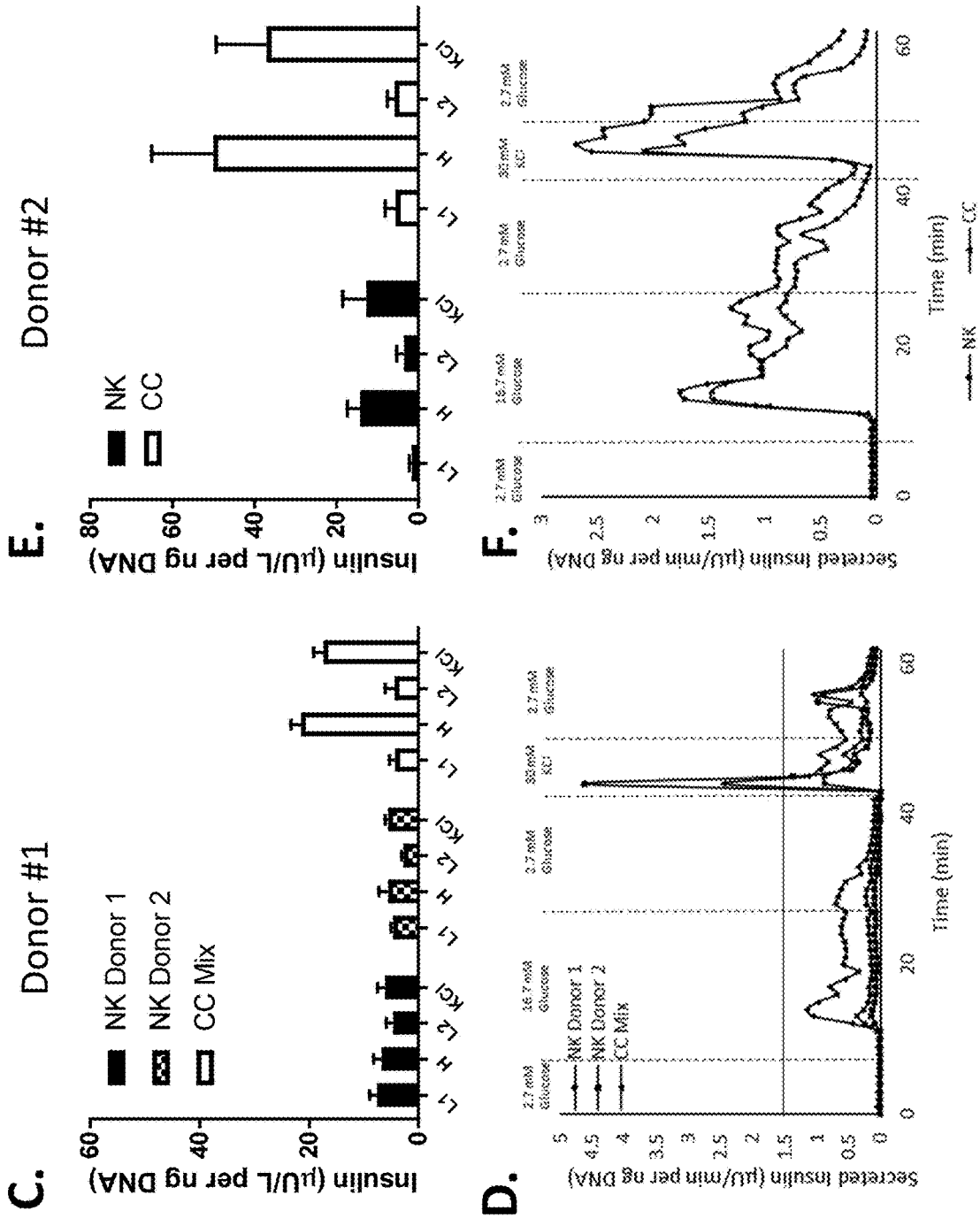
Figure 5:
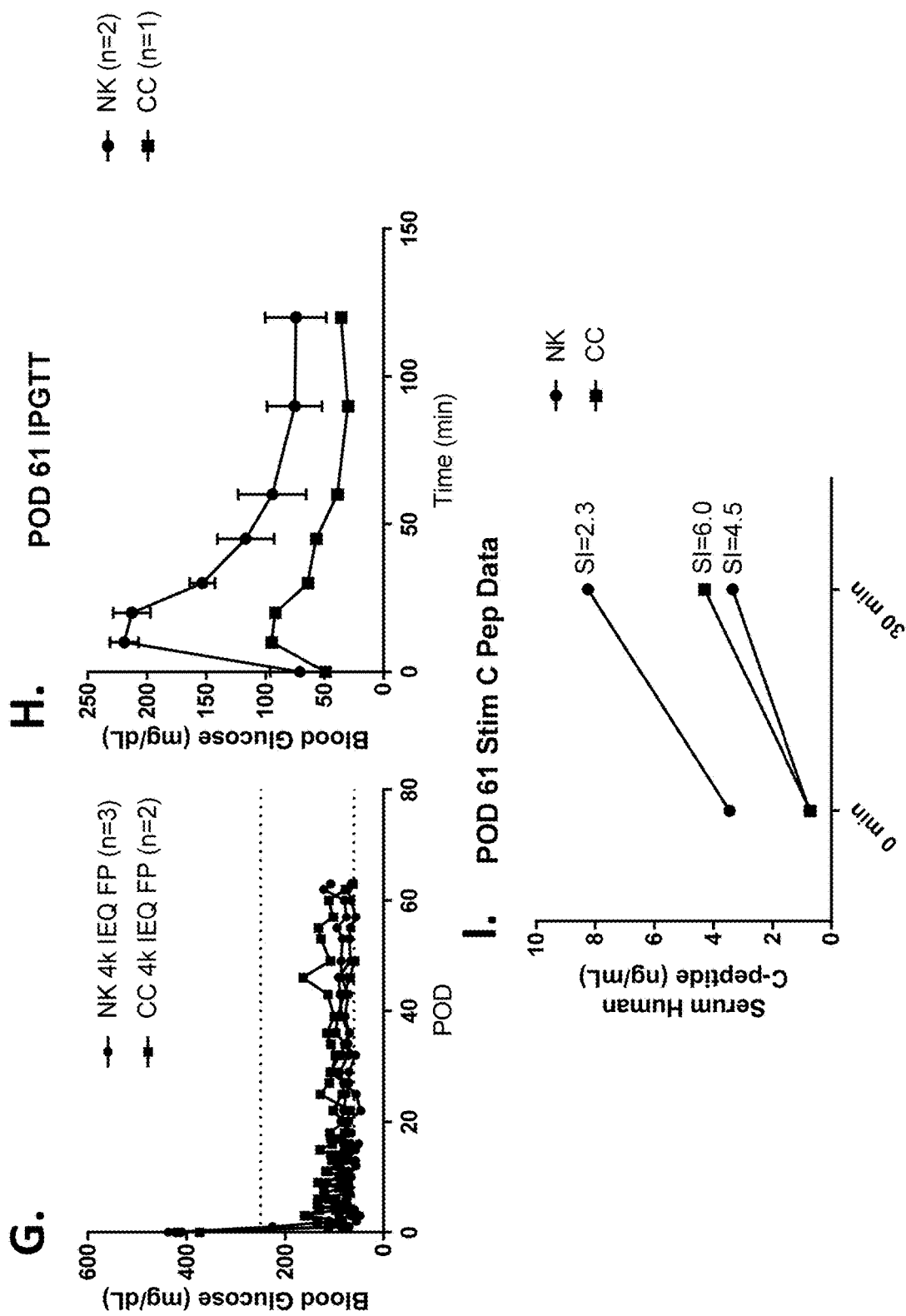

The coating method redesigned to allow CC with pure PEG (to improve biocompatibility) and at physiological pH (to improve NHP islet functionality) was tested on both human and NHP islets, which showed increased in vitro glucose-stimulated insulin secretion assay performance of both NHP and human islets. Results are shown in FIG. 5, wherein human islets were efficiently coated with methods disclosed herein (FIG. 5, Panel A), were viable (FIG. 5, Panel B), and showed in vitro (FIG. 5, Panels C-F) and in vivo (FIG. 5, Panels G-I) function that was comparable to and often higher than naked islets. With this method, absolute insulin secretion of CC islets was not reduced compared to naked islets and glucose tolerance in diabetic animals was improved.

Figure 6:
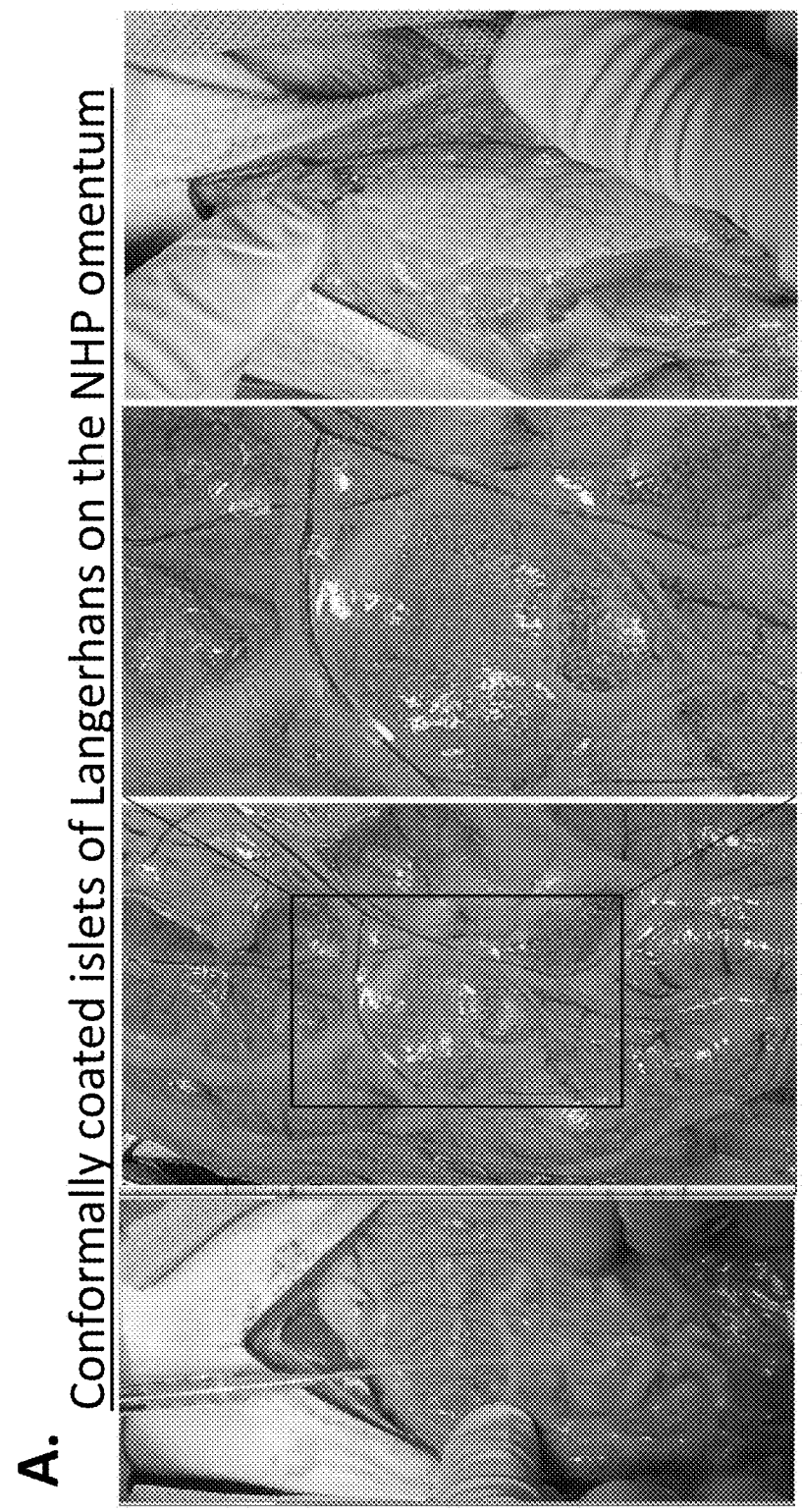
FIG. 6. Transplantation of CC human islets using the physiological pH method set forth herein in the bursa omentalis of diabetic NHP islets with co-stimulatory blockade.
(Panel A) Feasibility of laparotomy procedure for implantation of CC NHP islets in the bursa omentalis of a diabetic cynomolgus monkey. (Panel B, FIG. 6C) Exogenous insulin requirement (EIR, solid line), blood glucose (dots), c-peptide and summary table (Panel C) of CC NHP islet recipient demonstrating minimal function of transplanted CC human islets as decreased blood glucose levels. (Panel D, Panel E, Panel F) Histological evaluation of explanted CC NHP grants analyzed by H&E staining for biocompatibility assessment (Panel D, E) and graft revascularization (Panel E, CD31: blood vessels; aSMA: fibrosis and/or blood vessel maturity). The inflammatory reaction to the capsule in the NHP bursa omentalis was chronic and active but mild.
Figure 6:
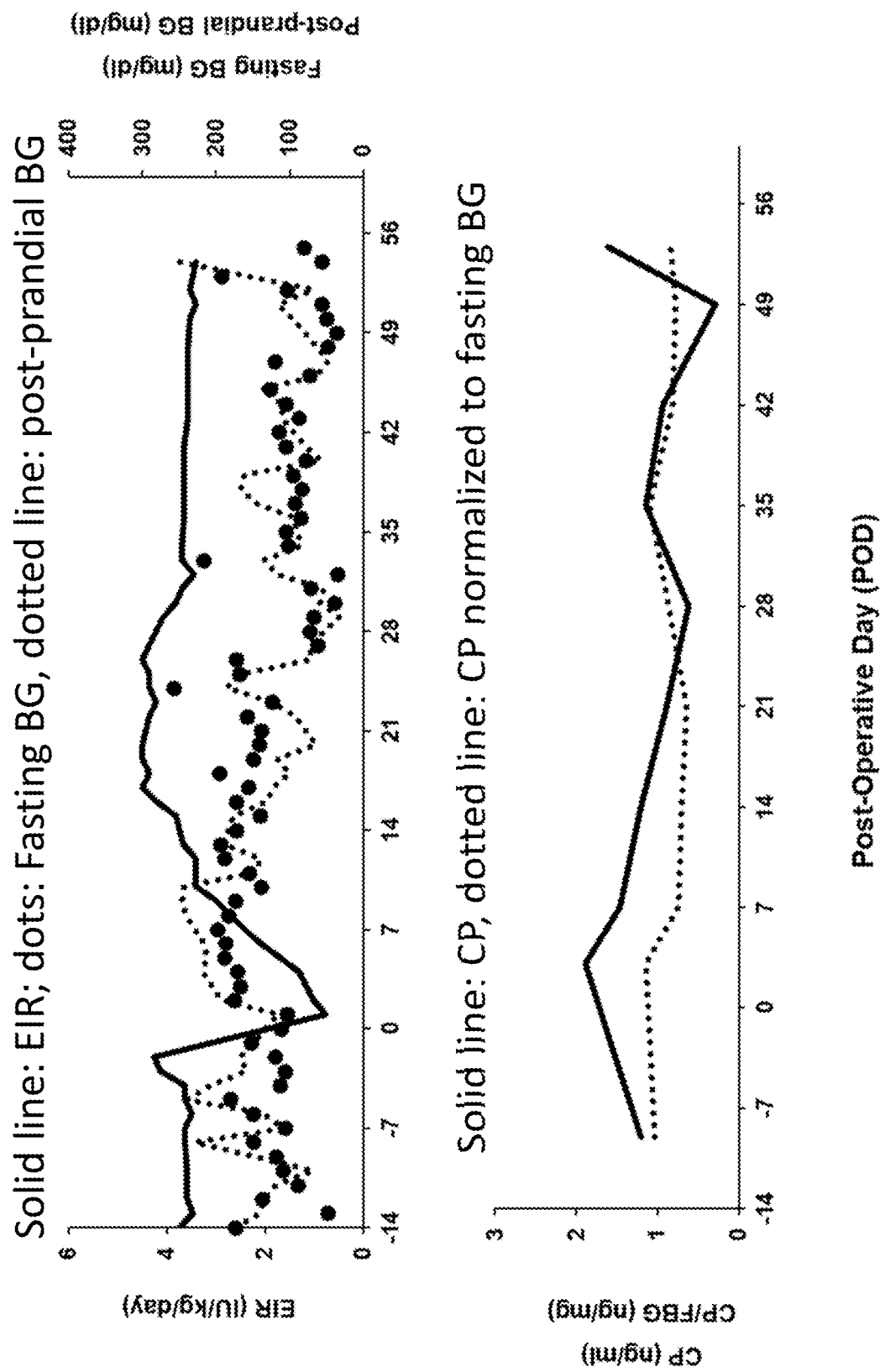
Figure 6:

Transplantation of Human Islet Cells Conformally Coated at Physiological pH in NHP Islets CC human islets using the method set forth herein were transplanted in the bursa omentalis of diabetic NHP islets with co-stimulatory blockade. Orencia® (20 mg/kg IV) was administered on post-operative day (POD) −1, 0, 3, 7, 14, 21 and 28 and weekly thereafter and anti-CD154 (20 mg/kg IV) on POD −1, 0, 3, 7, 14, 21 and 28 and every 10 days thereafter. On POD 0, using a laparotomy procedure, the animal received 20,358 islet equivalents (IEQ)/kg in the bursa omentalis. An elective necropsy was performed on POD 55. Feasibility of laparotomy procedure for implantation of CC NHP islets in the bursa omentalis of a diabetic cynomolgus monkey was assessed (FIG. 6, Panel A). Exogenous insulin requirement (EIR, solid line), blood glucose (dots), c-peptide of CC NHP islet recipient demonstrated minimal function of transplanted CC human islets as decreased blood glucose levels (FIG. 6, Panels B and C). Histological evaluation of explanted CC NHP grants and graft revascularization were assessed (FIG. 6, Panels D and E).

Figure 7:
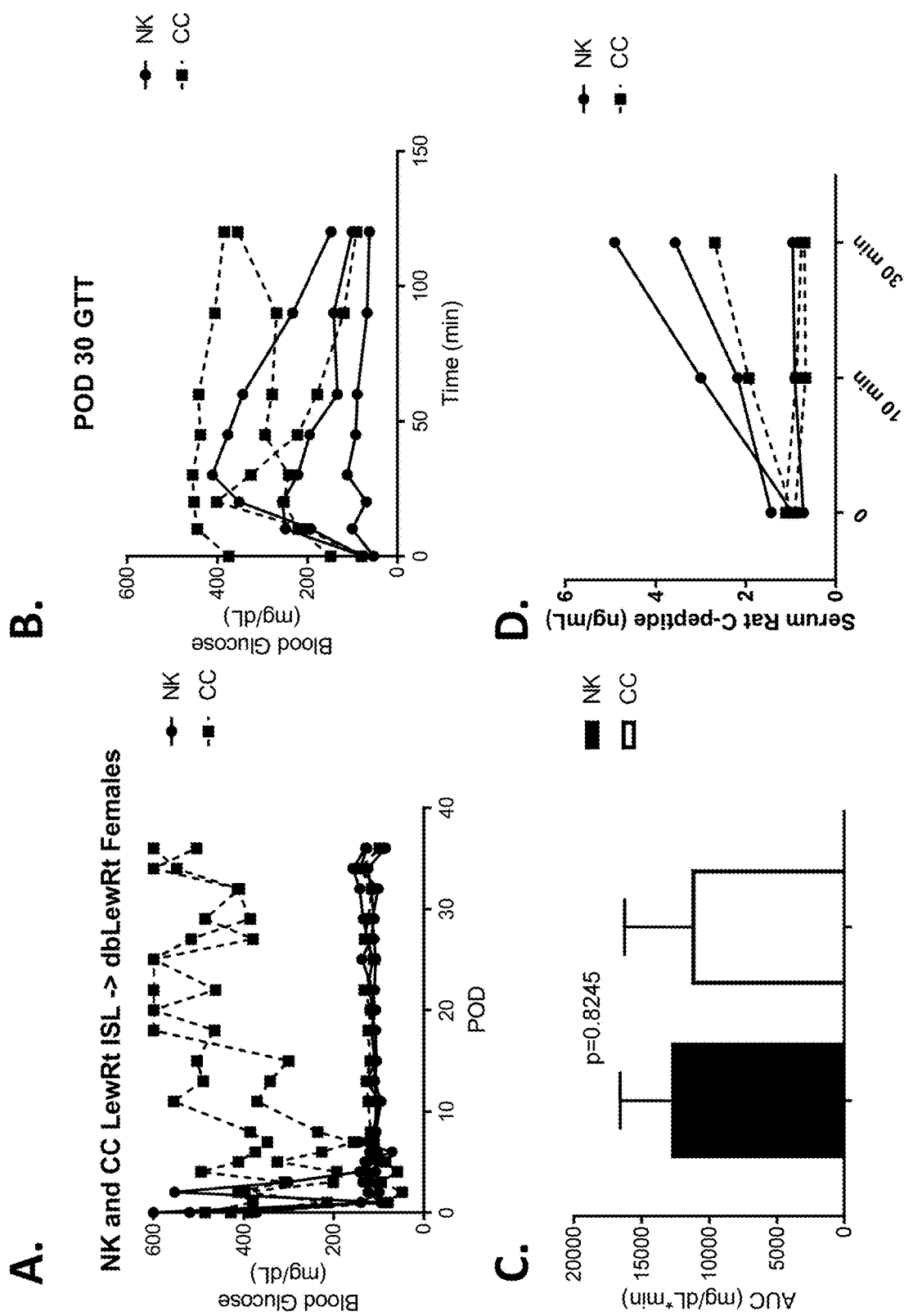
FIG. 7. Transplantation of syngeneic Lewis rat islets into diabetic, immunocompetent Lewis rat omentum. Panel A: Blood glucose of recipients of naked (solid line, dot markers) and conformal coated (dashed line, square markers) Lewis rat islets. (Panel B) Post-operative day (POD) 30 intraperitoneal glucose tolerance test (IPGTT) of recipients of naked (solid line, dot markers) and conformal coated (dashed line, square markers) Lewis rat islets and (Panel C) IPGTT areas-under-curves. (Panel D) Fasting and stimulated C peptide during IPGTT of recipients of naked (solid line, dot markers) and conformal coated (dashed line, square markers) Lewis rat islets. Statistical analysis confirms comparable in vivo functionality of CC rat islet syngeneic grafts to naked grafts in the rat omentum.

Transplantation of Syngeneic Lewis Rat Islets into Diabetic, Immunocompetent Lewis Rat Omentum Lewis rats were rendered diabetic (blood glucose >250 mg/dL) by streptozotocin injection. 2,500 naked or conformal coated Lewis rat islets were transplanted in the omental pouch of diabetic Lewis rats. Diabetes was monitored by blood glucose measurements up to post-operative day (POD) 36 and by intraperitoneal glucose tolerance test at POD 30. Panel A: Blood glucose of recipients of naked and conformal coated Lewis rat islets was assessed (FIG. 7, Panel A). Post-operative day (POD) 30 intraperitoneal glucose tolerance test (IPGTT) of recipients of naked and conformal coated Lewis rat islets and IPGTT areas-under-curves were assessed (FIG. 7, Panels B and C). Fasting and stimulated C peptide during IPGTT of recipients of naked (solid line, dot markers) and conformal coated (dashed line, square markers) Lewis rat islets was also analyzed (FIG. 7 Panel D).

Figure 8:
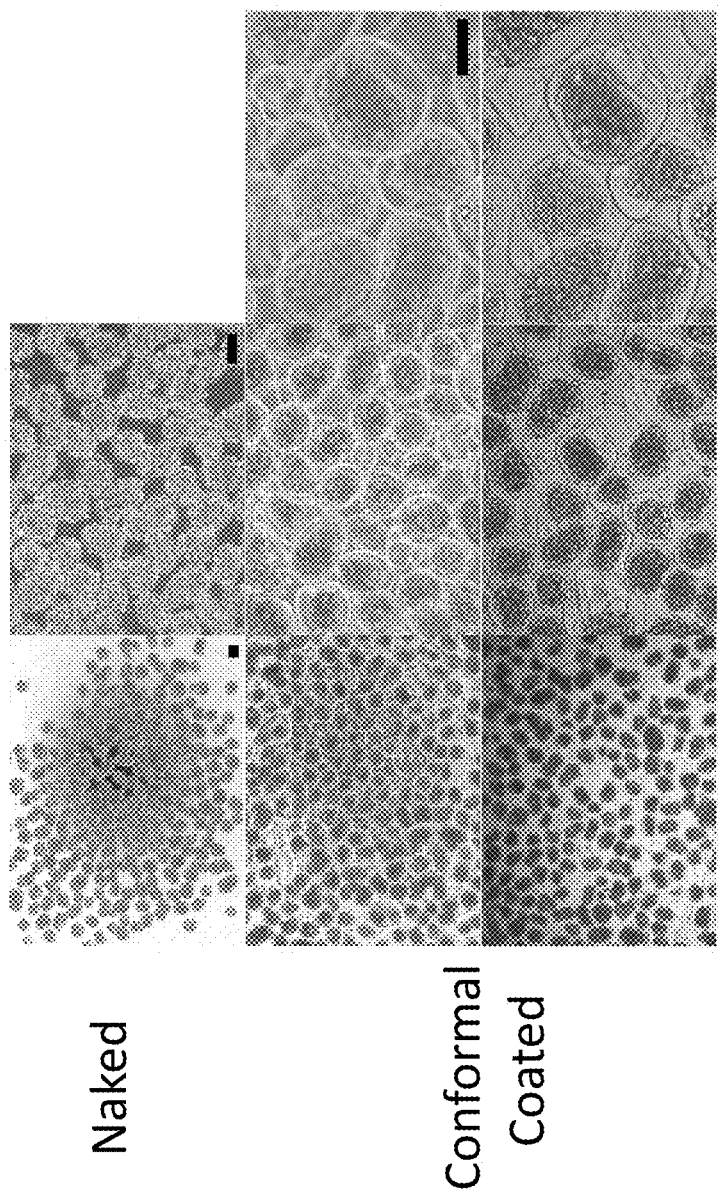
FIG. 8. Transplantation of allogeneic MIN6 insulinoma cell clusters into spontaneously diabetic NOD mice. (Panel A) Phase contrast images of naked (top row) and conformal coated (middle and bottom row) MIN6 clusters. (Panel B) Confocal micrographs of conformal coated MIN6 clusters with anti-PEG staining and adjacent orthogonal projections showing capsule completeness in three dimensions. (Panel C) Mortality of recipients of naked (solid line, dot markers) and conformal coated (dashed line, square markers) MIN6 clusters showing improved survival of CC clusters. (Panel D) Random, non-fasting C peptide of recipients of naked and conformal coated MIN6 clusters showing persistence of c-peptide in CC but not naked clusters. (Panel E) Histological evaluation of explanted CC MIN6 cluster grafts analyzed by H&E staining for survival of cell clusters within CC capsules and biocompatibility assessment demonstrating that CC capsules provide immunoisolation to allogeneic cell clusters in presence of both allorejection and autoimmunity.
Figure 8:
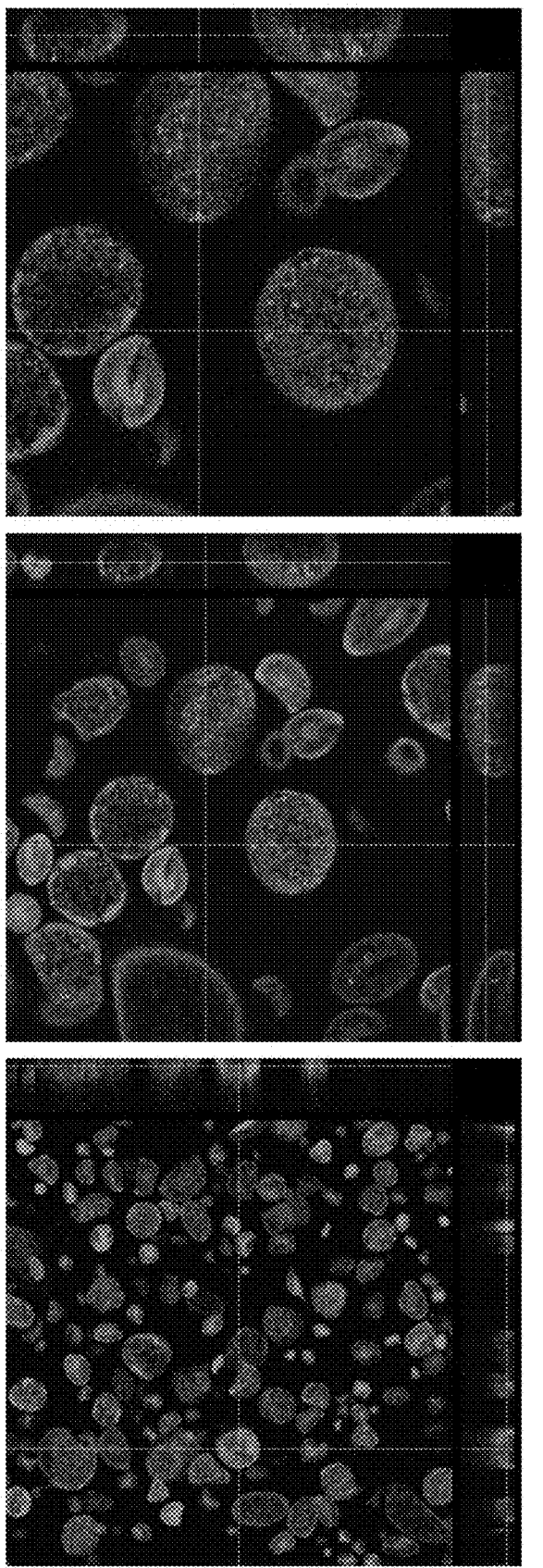
Figure 8:
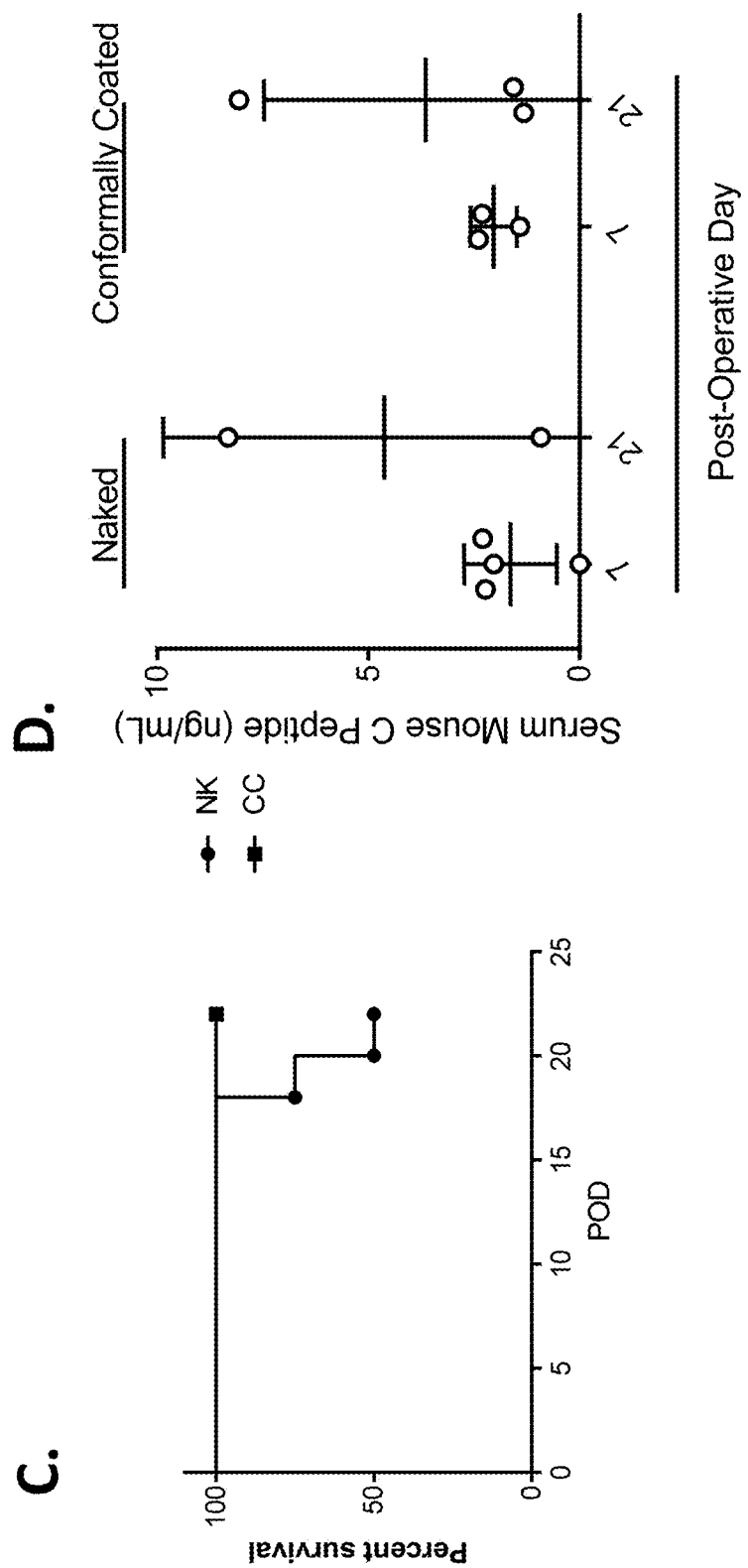
Figure 8:
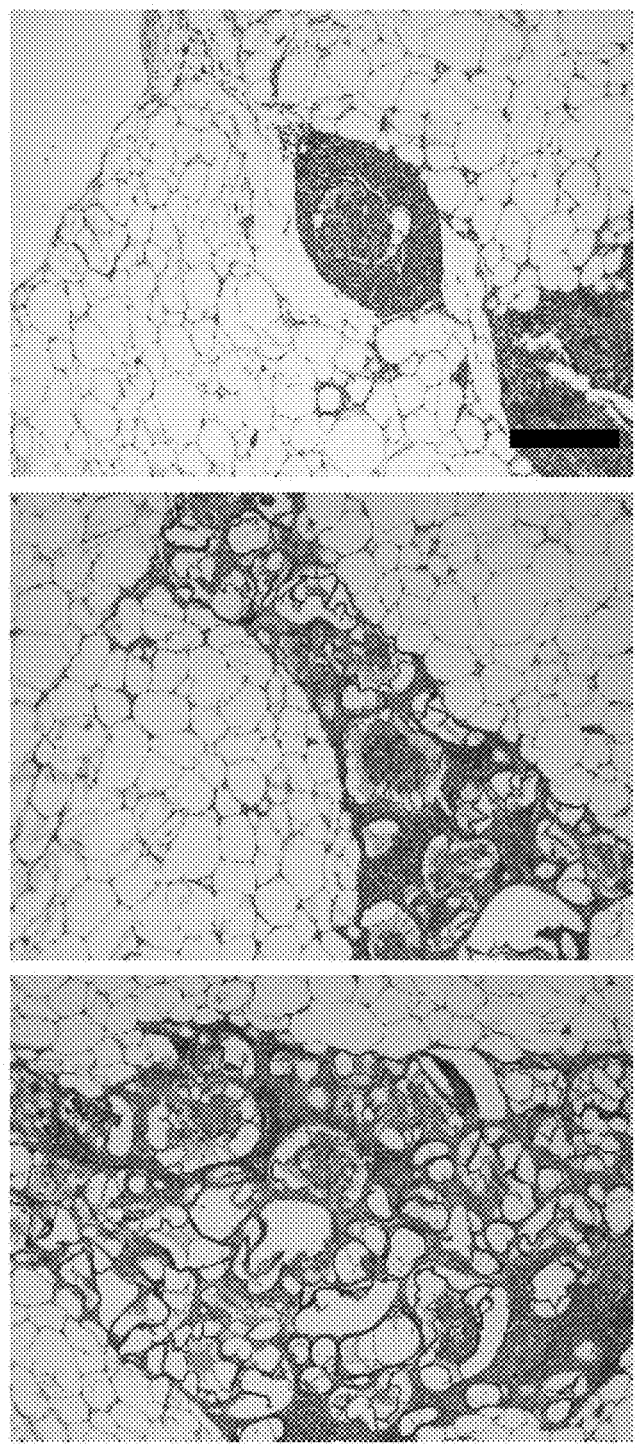

In Vivo Effects of Allogeneic MIN6 Insulinoma Cell Clusters Transplanted into Spontaneously Diabetic NOD Mice MIN6 cells were aggregated into clusters by suspension culture for 4 days and then conformal coated. Non-obese diabetic (NOD) mice that spontaneously developed diabetes as blood glucose >250 mg/dL were transplanted with either naked or conformal coated (CC) MIN6 clusters at 4,000 IEQ/mouse dose. Graft functionality and survival was monitored by evaluating mice mortality and by measuring c-peptide levels in blood of naked and CC recipient mice and by graft histological evaluation. FIG. 8, Panel A shows phase contrast images of naked (and conformal coated MIN6 clusters. FIG. 8, Panel B shows confocal micrographs of conformal coated MIN6 clusters with anti-PEG staining and adjacent orthogonal projections showing capsule completeness in three dimensions. Mortality of recipients of naked and conformal coated MIN6 clusters showing improved survival of CC clusters was evaluated (FIG. 8, Panel C). (Panel D) Random, non-fasting C peptide levels of recipients of naked and conformal coated MIN6 clusters were evaluated (FIG. 8, Panel D). Histological evaluation of explanted CC MIN6 cluster grafts and survival of cell clusters within CC capsules were assessed (FIG. 8, Panel E).

Autograft Assessment of Conformal Coated Islets in Porcine Model of Diabetes

Approximately eight-week old Yorkshire-Landrace pigs are implanted with 2-4 Cell Pouches (8-plug or 10-plug) (Sernova Corp, London Ontario) in the deep subcutaneous space 4-8 weeks prior to 90% pancreatectomy and islet isolation (conducted by standard procedures). To ensure a stringent hyperglycemic state, pigs may be dosed intravenously with 150 mg/kg streptozotocin post-pancreatectomy. The isolated islets are subjected to the conformal coating process followed by testing for release criteria. Following confirmation that the Conformal Coated islets have passed release criteria, islets are then transplanted into the prevascularized Cell Pouch chambers approximately five days post-isolation allowing recovery from the pancreatectomy and confirmation of the diabetic state. Graft function is assessed through biweekly blood glucose and weight measurements, as well as monthly intravenous glucose tolerance tests (IVGTTs) as required. Fasting and IVGTT blood values of C-peptide are measured and compared to pre-transplant control. At the end of the study, Cell Pouches are explanted and prepared through standard histological processes to assess insulin staining of islets, microvessel development within the Cell Pouch chambers and islet cell viability. Following Cell Pouch explantation, the above efficacy measures are taken to confirm loss of blood glucose control. Glucose disappearance rates, blood glucose area under curve and C-peptide levels may be assessed.

Assessment of Conformal Coated Donor Islets in an Allograft Porcine Model of Diabetes Approximately one year old female miniature Gottingen pigs are implanted with two (8-plug or 10-plug) Cell Pouches™ (Sernova Corp, London Ontario) in the deep subcutaneous space, six to eight weeks prior to receiving an islet allograft. Donor islets are procured and isolated by standard procedures from >2 year old retired breeder Yorkshire-Landrace pigs. The isolated islets are subjected to the Conformal Coating process and passing of release criteria is confirmed. One to three weeks prior to transplant, diabetes is chemically induced by dosing animals intravenously with 150 mg/kg of streptozotocin. To ensure a stringent hyperglycemic state, diabetic intravenous glucose tolerance tests (IVGTTs) are performed prior to conformal islet transplantation. Recipient mini-pigs are transplanted with allogeneic conformal coated islets ranging from 2,500-10,000 IEQ/kg into the prevascularized subcutaneous Cell Pouch™ following surgical exposure of the Cell Pouch and removal of the plugs in sequential order. Graft function is assessed through biweekly blood glucose and weight measurements, as well as monthly intravenous glucose tolerance tests (IVGTTs) as required. Fasting and IVGTT blood values of C-peptide are measured and compared to pre-transplant control. At the end of the study, Cell Pouches are explanted and prepared through standard histological processes to assess insulin staining of islets and other hormones important in blood sugar control (i.e. glucagon, somatostatin), and microvessel development within the Cell Pouch chambers. Following Cell Pouch explantation the above measures are taken to confirm loss of blood glucose control. Glucose disappearance rates, blood glucose area under curve and C-peptide levels may also be measured.

Assessment of Conformal Coated Human Glucose Responsive Stem Cell Derived Islets in a Xenograft Porcine Model of Diabetes Approximately one year old female miniature Gottingen pigs are implanted with two (8-plug or 10-plug) Cell Pouches™ (Sernova Corp, London, Ontario) in the deep subcutaneous space, six to eight weeks prior to receiving a glucose responsive conformal coated human stem cell derived technology (iPSC or ESC's). Prior to cell transplantation the stem cell derived insulin producing cells or cell clusters are prepared and subjected to the conformal coating process followed by confirmation that the cells meet the standard release criteria. One to three weeks prior to conformal coated stem cell derived transplant, diabetes is chemically induced by dosing animals intravenously with 150 mg/kg of streptozotocin. To ensure a stringent hyperglycemic state, diabetic intravenous glucose tolerance tests (IVGTTs) are performed prior to conformal stem cell derived cell transplantation. Recipient mini-pigs are transplanted with allogeneic conformal coated islets or islet clusters ranging from 2,500-10,000 IEQ/kg (or equivalent) into the prevascularized subcutaneous Cell Pouch™ chambers following surgical exposure of the Cell Pouch chambers and removal of the plugs in a sequential manner. Graft function is assessed through biweekly blood glucose and weight measurements, as well as monthly intravenous glucose tolerance tests (IVGTTs) as required. Fasting and IVGTT blood values of C-peptide are measured and compared to pre-transplant control. At the end of the study, Cell Pouches are explanted and prepared through standard histological processes to assess insulin staining of islets and other hormones important in blood sugar control (i.e. glucagon, somatostatin), and microvessel development within the Cell Pouch chambers as well as confirmation of human stem cell derived survival. Following Cell Pouch explantation the above measures are taken to confirm loss of blood glucose control. Glucose disappearance rates, blood glucose area under curve and C-peptide levels may also be measured in this xenograft model of diabetes using a Conformal Coated human xenograft model of diabetes to protection of the Conformal Coated human stem cell technology from immune system attack.

Assessment of Conformal Coated Donor Islets in a Syngeneic Mouse Model of Diabetes Four to five weeks before cell transplant, to induce neovascularization, a single chamber mini-CP (Sernova Corp. London, ON) is implanted subcutaneously into the lower abdominal quadrant of approximately 25 g male BALB/c mice. Briefly, to place the CP, a small transverse incision is made, allowing for a small pocket to be created inferior to the incision line. Once an adequate space is created, the CP is implanted into the space such that the opening is in the cranial position. The incision is closed with surgical staples (Autoclip; Becton Dickinson, Sparks, MD). Pancreatic islets are isolated from 8 to 12-week-old male BALB/c mice. Animals are housed under conventional conditions having access to food and water ad libitum. Before pancreatectomy, the common bile duct is cannulated with a 27-G needle, and the pancreas is distended with 0.125 mg/mL cold Liberase TL Research Grade enzyme in Hank's Balanced Salt Solution. Islets are isolated by digesting the pancreases in a 50-mL Falcon tube placed in a 37° C. water bath for 14 minutes with light shaking. Subsequent to the digestion phase, islets are purified from the pancreatic digests using histopaque-density gradient centrifugation (1.108, 1.083, and 1.069 g/mL). Upon isolation of islets, they are subjected to the Conformal Coating process in preparation for transplant into the Cell Pouch and confirmed to pass release criteria.

Three to 5 days before transplantation, CP implanted mice are rendered diabetic by chemical induction with intraperitoneal streptozotocin, at 185 mg/kg in acetate phosphate buffer, pH 4.5. The animals are considered diabetic when their blood glucose levels exceeded 15 mmol/L for 2 consecutive daily readings.

A full islet mass (500 Conformal Coated islets±10% per diabetic recipient mouse) or marginal mass (200 Conformal Coated islets±10% per diabetic recipient) with purity of 90%±5% are aspirated into polyethylene-50 tubing using a microsyringe and centrifuged into a pellet suitable for transplantation.

A dosing study may be conducted to examine the efficacy of full islet dose (500 Conformal Coated islets) to reverse diabetes when transplanted into the CP and a marginal islet mass study (200 Conformal Coated islets) transplanted into CP.

To transplant islets into the CP, a small incision is made in the skin to gain access to the cranial portion of the device. Subsequently, the plug is removed revealing a vascularized tissue chamber into which the islet preparation is infused. The CP is closed by approximating the 2 layers of the cranial portions of the CP with 4-0 vicryl suture. The cutaneous incision is subsequently closed with a surgical staple (Autoclip; Becton Dickinson).

Islet graft function is assessed twice weekly in recipients through non-fasting blood glucose measurements (mmol/L), with a portable glucometer in all groups tested. Graft function and reversal of diabetes is defined as 2 consecutive readings less than 11.1 mmol/L and maintained until study completion. In addition, glucose tolerance tests are conducted on euglycemic mice up to 100 days after transplantation, to further assess metabolic capacity. Recipients are fasted overnight before receiving an intraperitoneal glucose bolus (3 g/kg). Blood glucose levels are monitored at baseline (time 0), 15, 30, 60, 90, and 120 minutes after injection, allowing for area under the curve (AUC-blood glucose) to be calculated and analyzed between transplant groups.

To confirm graft-dependent euglycemia, animals with functional grafts have their islet transplants explanted by CP removal. The CP explants are carried out by a small skin incision. The ventral surface of the CP is dissected from the dermis while maintaining the integrity of the encompassing neovascularized tissue. The dorsal side of the islet-engrafted device is dissected to allow for its complete removal. Post-explantation CPs are placed in 10% buffered formalin for histological analysis, and animals are monitored for hyperglycemia.

Immunohistochemistry is used to identify overall structure detail using hematoxylin-eosin, endothelial cells for the assessment of vascularization using anti-von Willebrand Factor antibody, anti-insulin, and anti-glucagon antibodies to identify the presence of islets within the CP. Immediately after explantation, CP tissues are fixed in 10% buffered formalin for 48 hours and then washed in phosphate-buffered saline, with a final wash in 70% ethanol. The tissue is dissected, embedded in paraffin, and sectioned at a thickness of 5 μm. Representative tissue sections are stained with hematoxylin-eosin. Additionally, tissue sections are stained using immunofluorescence. The sections are deparaffinized and treated with antigen heat retrieval (Target Retrieval Solution, Dako) followed by washing with tris-buffered saline (TBS) supplemented with tween-20 (TBS-T). Sections are blocked using 10% goat serum in TBS-T for 1 hour room temperature. Sections are treated with a primary antibody of either rabbit anti-von Willebrand factor (Millipore AB7356) diluted 1:100 (TBS with 1% goat serum), guinea pig anti-insulin (Dako A0564) diluted 1:1000 (TBS with 1% goat serum), or rabbit anti-glucagon (AbD Serotec AHP534) diluted 1:100 (TBS with 1% goat serum) for 15 hours at 4° C. Sections are washed with TBS-T followed by secondary antibody treatment consisting of goat antirabbit (Molecular Probes A-11034; Alexa Fluor 488) diluted 1:1000 (TBS-T with 1% goat serum) or goat anti-guinea pig (Molecular Probes A-11075; Alexa Fluor 568) diluted 1:1000 (TBS-T with 1% goat serum) for 1 hour at room temperature. Samples are washed with TBS-T, counterstained with DAPI (1:1000). To reduce autofluorescence background, sections are treated with 0.3% sudan black (in 70% ethanol) for 2 minutes, washed with TBS and cover slipped with an antifade mounting medium. Microscopy and image analysis are accomplished using Aperio-Scan Scope Console for light microscopy and Zeiss Axio Imager Z1 for fluorescent microscopy or equivalent.

Evaluation of Conformal Coated Islets Transplanted into a Subcutaneous Implanted Prevascularized Device (Cell Pouch™) to Reverse Diabetes in a Syngeneic Rat Model Male Lewis rats (250 g) as islet donors and female Lewis rats (up to 200 g) are used as transplant recipients. The Cell Pouch (1-plug or 2-plug) Sernova Corp, London Ontario) is implanted subcutaneously of Lewis rats on the ventral side according to Sernova Corp specifications and left for a minimum of 4 weeks to develop the vascularized tissue chambers suitable for cell transplant. At 4 weeks post implant, diabetes is induced in recipient rats by administration of streptozotocin. Rats with two non-fasting glycemic values >300 mg/dL on blood samples obtained from tail pricking (OneTouch Ultra glucometers) are considered diabetic. Islets from donor Lewis rats are isolated by enzymatic digestion, followed by purification on density gradients using standard protocols. Lewis rat islets are then conformally coated. Approximately four days after coating, naked or Conformal Coated Lewis isolated islets are be transplanted into the vascularized Cell Pouch. To transplant the islets the Cell Pouch is surgically exposed, and the plug(s) removed to expose the vascularized tissue void space and Conformal Coated or naked islets are transplanted into the Cell Pouch chambers using a Micro-Pipette, at a dose of approximately 3000-5000 IEQ per diabetic recipient. It is anticipated that several doses in different groups will be assessed. Blood glucose of the islet recipient rats are monitored at least three times per week by tail pricking using portable glucometers. Graft function will be defined as non-fasting BG<200 mg/dL and positive rat C-peptide measured by standard techniques. At selected time points after transplantation, a glucose tolerance test is performed in the islet recipient rats to assess graft efficacy. Following overnight fasting, an oral (oral glucose tolerance test [OGTT]; 2.5 g/kg) or intravenous (intravenous glucose tolerance test [IVGTT]; 0.5 g/kg) glucose bolus administered. Glycemic values are monitored and the area under the curve (AUC) of glucose calculated. Rats blood samples are taken before (t=0 min) and 30 min after administering the glucose bolus and fasting and stimulated c-peptide is assessed. Transplanted Cell Pouches are retrieved at intervals in different dosing groups between 60 and 300 days to confirm efficacy in establishing glucose control. Explanted Cell Pouches are processed by histological analysis for transplanted islets using standard histological techniques to stain C-peptide, insulin, glucagon, etc. and to assess for cell viability as well as other measures. The efficacy of naked islets and Conformal Coated islets within the Cell Pouch is compared to assess the effect of Conformal Coated islets on protecting islets from immune system attack. Efficacy is measured as the ability of Conformal Coated islets in the Cell Pouch to reverse diabetes (BG<200 mg/dL) following engraftment and to maintain graft function with detectable c-peptide, as well as a positive glucose tolerance (AUC during GTT) of syngeneic diabetic recipient rats. In addition, surviving hormone producing grafts are identified through histological analysis to confirm islet survival in Conformal Coated cells verses naked cells transplanted into the Cell Pouch.

Evaluation of Conformal Coated Islets Transplanted into a Subcutaneous Implanted Prevascularized Device (Cell Pouch™) to Reverse Diabetes in an Allograft Rat Model of Diabetes Lewis female rats (up to 200 g) are used as islet recipients. Wistar Furth (WF) (RT1u) male rats (250 g) are purchased as islet donors. The Cell Pouch (1-plug or 2-plug) Sernova Corp, London Ontario) is implanted subcutaneously of Lewis female rats on the ventral side according to Sernova Corp specifications and left for a minimum of 4 weeks to develop the vascularized tissue chambers suitable for cell transplant. At 4 weeks post implant, diabetes is induced in recipient rats by administration of streptozotocin. Rats with two non-fasting glycemic values >300 mg/dL on blood samples obtained from tail pricking (OneTouch Ultra glucometers) are considered diabetic. Islets from donor Wistar Furth (WF) (RT1u) male rats are isolated by enzymatic digestion, followed by purification on density gradients using standard protocols. These Wistar Furth rat islets are then conformally coated. Approximately four days after coating, naked or Conformal Coated Wistar isolated islets are be transplanted into the vascularized Cell Pouch. To transplant the islets the Cell Pouch is surgically exposed, and the plug(s) removed to expose the vascularized tissue void space and Conformal Coated or naked islets are transplanted into the Cell Pouch chambers using a Micro-Pipette, at a dose of approximately 3000-5000 IEQ per diabetic recipient. It is anticipated that several doses in different groups will be assessed. Blood glucose of the islet recipient rats are monitored at least three times per week by tail pricking using portable glucometers. Graft function will be defined as non-fasting BG<200 mg/dL and positive rat C-peptide measured by standard techniques. At selected time points after transplantation, a glucose tolerance test is performed in the islet recipient rats to assess graft efficacy. Following overnight fasting, an oral (oral glucose tolerance test [OGTT]; 2.5 g/kg) or intravenous (intravenous glucose tolerance test [IVGTT]; 0.5 g/kg) glucose bolus administered. Glycemic values are monitored and the area under the curve (AUC) of glucose calculated. Rats blood samples are taken before (t=0 min) and 30 min after administering the glucose bolus and fasting and stimulated c-peptide is assessed. Transplanted Cell Pouches are retrieved at intervals in different dosing groups between 60 and 300 days to confirm efficacy in establishing glucose control. Explanted Cell Pouches are processed by histological analysis for transplanted islets using standard histological techniques to stain C-peptide, insulin, glucagon, etc. and to assess for cell viability as well as other measures. The efficacy of naked islets and Conformal Coated islets within the Cell Pouch is compared to assess the effect of Conformal Coated islets on protecting islets from immune system attack. Efficacy is measured as the ability of Conformal Coated islets in the Cell Pouch to reverse diabetes (BG<200 mg/dL) following engraftment and to maintain graft function with detectable C-peptide, as well as a positive glucose tolerance (AUC during GTT) of the diabetic recipient rats relative to the naked islets. In the case of allogeneic islet transplants, graft rejection is defined simply as return to non-fasting hyperglycemic state which is expected in the naked islets relative to the Conformal Coated islet groups. In addition, surviving hormone producing grafts are identified through histological analysis to confirm islet survival in Conformal Coated cells verses naked cells transplanted into the Cell Pouch in this allograft experimental model testing the immune protection abilities of the Conformal Coating.

Evaluation of Conformal Coated Human Stem Cell Derived Islets Transplanted into a Subcutaneous Implanted Prevascularized Device (Cell Pouch™) to Reverse Diabetes in a Xenograft Rat Model of Diabetes Lewis female rats (up to 200 g) are used as islet recipients. Human stem cell derived islet clusters (iPSC or ESC) are generated through a differentiation protocol to produce the insulin producing cells for transplant into the Cell Pouch in this Xenograft model. The Cell Pouch (1-plug or 2-plug) Sernova Corp, London Ontario) is implanted subcutaneously of Lewis female rats on the ventral side according to Sernova Corp specifications and left for a minimum of 4 weeks to develop the vascularized tissue chambers suitable for cell transplant. At 4 weeks post implant, diabetes is induced in recipient rats by administration of streptozotocin. Rats with two non-fasting glycemic values >300 mg/dL on blood samples obtained from tail pricking (OneTouch Ultra glucometers) are considered diabetic. The human stem cell derived islet clusters are produced using standard protocols. The stem cell derived human islet clusters are then conformally coated. Approximately four days after coating, naked or Conformal Coated stem cell derived clusters are be transplanted into the vascularized Cell Pouch. To transplant the islets the Cell Pouch is surgically exposed, and the plug(s) removed to expose the vascularized tissue void space and Conformal Coated or naked islets are transplanted into the Cell Pouch chambers using a Micro-Pipette, at a dose of approximately 3000-5000 IEQ per diabetic recipient (or equivalent). It is anticipated that several doses of stem cell derived islet clusters in different groups will be assessed. Blood glucose of the islet recipient rats are monitored at least three times per week by tail pricking using portable glucometers. Graft function will be defined as non-fasting BG<200 mg/dL and positive rat C-peptide measured by standard techniques. At selected time points after transplantation, a glucose tolerance test is performed in the islet recipient rats to assess graft efficacy. Following overnight fasting, an oral (oral glucose tolerance test [OGTT]; 2.5 g/kg) or intravenous (intravenous glucose tolerance test [IVGTT]; 0.5 g/kg) glucose bolus administered. Glycemic values are monitored and the area under the curve (AUC) of glucose calculated. Rats blood samples are taken before (t=0 min) and 30 min after administering the glucose bolus and fasting and stimulated c-peptide is assessed. Transplanted Cell Pouches are retrieved at intervals in different dosing groups between 60 and 300 days to confirm efficacy in establishing glucose control. Explanted Cell Pouches are processed by histological analysis for transplanted islets using standard histological techniques to stain C-peptide, insulin, glucagon, etc. and to assess for cell viability as well as other measures. The xenograft efficacy of naked islets and Conformal Coated islets within the Cell Pouch is compared to assess the effect of Conformal Coated islets on protecting islets from immune system attack. Efficacy is measured as the ability of Conformal Coated islets in the Cell Pouch to reverse diabetes (BG<200 mg/dL) following engraftment and to maintain graft function with detectable C-peptide, as well as a positive glucose tolerance (AUC during GTT) of the diabetic recipient rats relative to the naked islets. In the case of xenogeneic stem cell islet cluster transplants, graft rejection is defined simply as return to non-fasting hyperglycemic state which is expected in the naked islets relative to the Conformal Coated islet groups. In addition, surviving hormone producing grafts are identified through histological analysis to confirm islet survival in Conformal Coated cells verses naked cells transplanted into the Cell Pouch in this xenograft experimental model testing the immune protection abilities of the Conformal Coating using human stem cell derived insulin producing clusters.

Evaluation of Conformal Coated Cells for Additional Cell Types and Clinical Indications Using the examples above, it should be noted that cells (donor cells, stem cell derived technologies) appropriate for different clinical indications may be assessed to treat disease in the xenograft, allograft and xengeneic animal models. The animal models used can be found in the scientific literature and the efficacy measures determined to test the specific cell type and clinical indication.

NUMBERED EMBODIMENTS

Particular embodiments of the disclosure are set forth in the following numbered paragraphs:

1. A method of conformally coating a biomaterial with a coating material, comprising the steps of:
   (a) injecting a water phase within a coaxial oil phase in a coating device configured to permit a transition from dripping to jetting and flow elongation of the water phase within the oil phase;
   (b) adding the biomaterial and the coating material to the water phase, wherein polymerization of the coating material occurs downstream of breakup of the water phase jet into particles, resulting in the conformal coating of the biomaterial with the coating material;
   (c) adding a component of the coating material downstream of breakup of the water phase jet into particles, wherein the component is a gelling emulsion that promotes/catalyzes polymerization of the coating material;
   (d) optionally collecting the outflow of the coating device;
   (e) optionally purifying the conformally coated biomaterial and biomaterial-free coating material from the oil phase; and
   (f) optionally separating the conformally coated biomaterial from the biomaterial-free coating material.
2. The method of paragraph 1, wherein the biomaterial comprises one or more of cells, cell clusters, biomaterial-coated cells or cell-clusters, subcellular organelles, biologic molecules and non-biologic drugs.
3. The method of paragraph 2, wherein the biomaterial comprises cells or cell clusters.
4. The method of paragraph 3, wherein the biomaterial comprises islet cells.
5. The method of any one of paragraphs 1-3, wherein the coating material is selected from the group consisting of one or more of polyethylene glycol (PEG), polyethylene oxide (PEO), poly(N-vinyl pyrrolidinone) (PVP), polyethyl oxazoline, polyvinyl alcohol (PVA), polythyloxazoline (PEOX), and poly(amino acids).
6. The method of paragraph 5, wherein the coating material is one or more of polyethylene glycol (PEG), PEG-maleimide, PEG-acrylate, PEG-vinyl sulfone, or modified derivatives thereof.
7. The method of paragraph 6, wherein the coating material is 5-10% PEG.
8. The method of any one of paragraphs 1-7, wherein the water phase comprises
   (a) serum-free media at pH 6-7.4; or
   (b) Hank's Balanced Salt Solution (HBSS) at pH 6-7.4.
9. The method of paragraph 8, wherein the water phase comprises 500-750,000 islet cells or cell clusters/mL.
10. The method of paragraph 9, wherein the water phase comprises about 2,500-250,000 islet cells or cell clusters/mL.
11. The method of any one of paragraphs 1-10, wherein the water phase optionally comprises one or more of a thiolated or reducing reagent and/or a surfactant.
12. The method of paragraph 11, wherein the surfactant is polyoxyethylene-polyoxypropylene block copolymer or poly(ethylene glycol-bl-propylene sulfide).
13. The method of paragraph 12, wherein the surfactant is 2% polyoxyethylene-polyoxypropylene block copolymer.
14. The method of paragraph 11, wherein the thiolated or reducing reagent is dithiothreitol (DTT) or PEGdiThiol.
15. The method of paragraph 14, wherein the thiolated or reducing reagent is 0.01-0.62% dithiothreitol (DTT).
16. The method of any one of paragraphs 1-15, wherein the oil phase comprises polypropylene glycol (PPG).
17. The method of paragraph 16, wherein the oil phase comprises polypropylene glycol (PPG) with 10% sorbitan mono oleate, wherein the oil phase optionally comprises triethanolamine.
18. The method of paragraph 17, wherein the oil phase comprises 0-0.2% triethanolamine.
19. A biomaterial conformally coated by the method of any one of paragraphs 1-18.
20. A method of treating a disorder in a patient, comprising the step of implanting into the patient the conformally coated biomaterial of paragraph 19.
21. The method of paragraph 20, wherein the disorder is diabetes and the conformally coated biomaterial comprises islet cells and cell clusters.
22. The method of paragraph 11, wherein the water phase is multi-arm polyethylene glycol (PEG) minimally crosslinked (5-50%) with PEGdiThiol.
23. The method of any one of paragraphs 1-18, 21 or 22, wherein the gelling emulsion added downstream of breakup of the water phase jet into particles is solution of dithiothreitol (DTT) dissolved in Hank's Balanced Salt Solution (HBSS) and emulsified in polypropylene glycol (PPG) with 10% sorbitan mono oleate (Span80).
24. The method of any one of paragraphs 1-18 and 21-23, wherein purification of the conformally coated biomaterial and biomaterial-free coating material from the oil phase is conducted by pouring the product from the coating product into mineral oil while stirring.
25. The method of paragraph 24, wherein during purification with the mineral oil while stirring, Hank's Balanced Salt Solution (HBSS) is added while continuing to stir the gelling emulsion comprising a solution of dithiothreitol (DTT) dissolved in Hank's Balanced Salt Solution (HBSS) and emulsified in polypropylene glycol (PPG) with 10% sorbitan mono oleate (Span80) in mineral oil.
26. The method of paragraph 25, wherein after purification with the mineral oil and Hank's Balanced Salt Solution (HBSS), the product is centrifuged and washed with HBSS.
27. The method of paragraph 26, wherein after purification and wash with Hank's Balanced Salt Solution (HBSS), the product is incubated with a solution of PEGdithiol.

28. A conformal coating device comprising:
- an encapsulation chamber formed by assembly of three parts illustrated in FIG. 1A, Panels (ii), (iii), and (iv);
- a catheter connected to a precision flow syringe pump configured to inject a coating material and the biomaterial to be coated to a first inlet on the encapsulation chamber (internal phase), wherein this aqueous phase comprises a pH level at or between 6-7.4;
- a first peristaltic pump configured to inject an oil phase containing surfactant to a second inlet on the encapsulation chamber, wherein injection of the oil phase (external phase) is configured to flow coaxially to the internal water phase;
- a capillary coupled to an end of the encapsulation chamber, wherein the capillary is downstream of the point where the internal water phase flow elongates within the external oil phase (biphasic fluid) such that the biphasic fluid is configured to flow into the capillary from the encapsulation chamber, and wherein the internal aqueous phase (containing the coating material and the biomaterial to be coated) and the external oil phase are configured to coaxially flow through the capillary; and
- a second peristaltic pump configured to inject a gelling emulsion coaxially to the capillary, wherein the emulsion comprises a catalyst for polymerization of the coating material, wherein the emulsion is configured to coaxially contact with the coating material and the biomaterial to be coated.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description can be made without departing from the spirit or scope of the present invention, as defined in the following claims.

What is claimed:

1. A method of conformally coating a biomaterial with a coating material, comprising the steps of:
   (a) preparing an aqueous phase comprising a minimally crosslinked coating material and a biomaterial, and having a pH of about 6 to about 7.4; wherein the aqueous phase does not comprise a viscosity-enhancing agent;
   (b) coaxially injecting the aqueous phase and an oil phase through a coating device, thereby forming an aqueous phase jet surrounded by the oil phase; wherein the aqueous phase jet breaks up into particles of biomaterial surrounded by the coating material as it moves downstream through the coating device;
   (c) coaxially injecting a gelling emulsion into the coating device external to the oil phase and downstream of breakup of the aqueous phase jet into particles; wherein the gelling emulsion promotes or catalyzes polymerization of the coating material surrounding the biomaterial, thereby resulting in conformally coated biomaterial.

2. The method of claim 1, further comprising, after step (c):
   (1) collecting the outflow of the coating device;
   (2) purifying the conformally coated biomaterial and biomaterial-free coating material from the oil phase; and/or
   (3) separating the conformally coated biomaterial from the biomaterial-free coating material.

3. The method of claim 1, wherein the biomaterial comprises cells, cell clusters, biomaterial-coated cells or cell-clusters, subcellular organelles, biologic molecules, non-biologic drugs, or a combination thereof.

4. The method of claim 1, wherein the coating material comprises an agent selected from the group consisting of polyethylene glycol (PEG), polyethylene oxide (PEO), poly(N-vinyl pyrrolidinone) (PVP), polyethyl oxazoline, polyvinyl alcohol (PVA), polythyloxazoline (PEOX), poly(amino acids), derivatives thereof and combinations thereof.

5. The method of claim 4, wherein the coating material comprises an agent selected from the group consisting of polyethylene glycol (PEG), PEG-maleimide, PEG-acrylate, and PEG-vinyl sulfone.

6. The method of claim 5, wherein the coating material comprises 5-10% PEG.

7. The method of claim 1, wherein the aqueous phase comprises;
   (a) serum-free media at pH 6-7.4; or
   (b) Hanks' Balanced Salt Solution (HBSS) at pH 6-7.4.

8. The method of claim 7, wherein the aqueous phase comprises;
   (1) about 200,000,000 islet cells/mL; or
   (2) about 100,000 cell clusters/mL.

9. The method of claim 1, wherein the aqueous phase comprises a thiolated reagent, a reducing reagent, a surfactant, or a combination thereof.

10. The method of claim 9, wherein the surfactant is polyoxyethylenepolyoxypropylene block copolymer or poly(ethylene glycol-bl-propylene sulfide).

11. The method of claim 9, wherein the reducing reagent is dithiothreitol (DTT) or PEGdiThiol.

12. The method of claim 1, wherein the gelling emulsion comprises dithiothreitol (DTT) dissolved in Hanks' Balanced Salt Solution (HBSS) and emulsified in polypropylene glycol (PPG) with 10% sorbitan mono oleate (Span80).

13. The method of claim 1, wherein the oil phase comprises polypropylene glycol (PPG).

14. The method of claim 2, wherein purification of the conformally coated biomaterial and the biomaterial-free coating material from the oil phase comprises pouring the product from step (c) into mineral oil while stirring the resultant mixture.

15. The method of claim 1, wherein the minimally cross-linked coating material is 1-30% crosslinked.

16. A biomaterial conformally coated by the method of claim 1.

17. A method of cell therapy, the method comprising implanting the conformally coated biomaterial of claim 16 into a patient.

18. A conformal coating device comprising:
   (1) an encapsulation chamber comprising:
      (a) a housing portion comprising a first inlet coupled to a catheter at a first end of the housing portion, wherein the catheter is connected to a first pump;
      (b) an attachment portion comprising a first end coupled to a second end of the housing portion; and
      (c) a coating portion comprising a first end coupled to a second end of the attachment portion, a chamber, a second inlet coupled to a second pump, and a second end;
      wherein the catheter connected to the first pump is configured to inject an aqueous phase comprising a minimally crosslinked coating material and a biomaterial into the chamber, wherein the aqueous phase has a pH of about 6 to about 7.4 and does not comprise a viscosity-enhancing agent; wherein the second pump is configured to coaxially inject an oil phase external to the aqueous phase into the chamber through the second inlet;

(2) a capillary coupled to the second end of the coating portion, wherein the aqueous phase forms an aqueous jet phase which breaks up into particles of biomaterial surrounded by the coating material as it moves downstream through the capillary; and (3) a third pump coupled to the capillary downstream of breakup of the aqueous phase jet into particles and configured to coaxially inject a gelling emulsion into the capillary external to the oil phase, wherein the gelling emulsion promotes or catalyzes polymerization of the coating material surrounding the biomaterial, thereby resulting in conformally coated biomaterial.

19. The device of claim 18, wherein the first end of the coating portion substantially surrounds the second end of the attachment portion, thereby forming the chamber.

20. The device of claim 18, wherein the second end of the attachment portion is tapered, thereby forming a tapered portion of the chamber configured to flow to the capillary, and wherein the second inlet is positioned at the tapered portion of the chamber.

* * * * *